(12) United States Patent
Stuhler et al.

(10) Patent No.: US 10,500,563 B2
(45) Date of Patent: Dec. 10, 2019

(54) EMISSIONS CONTROL SYSTEM INCLUDING CAPABILITY TO CLEAN AND/OR REJUVENATE CARBON-BASED SORBENTS AND METHOD OF USE

(71) Applicant: Chemical and Metal Technologies LLC, Tuscaloosa, AL (US)

(72) Inventors: Hal Stuhler, San Mateo, FL (US); Lori Stuhler, San Mateo, FL (US); Van T. Walworth, Rockwood, TN (US); Scott Drummond, Tuscaloosa, AL (US)

(73) Assignee: Chemical and Metal Technologies LLC, Tuscaloosa, AL (US)

( * ) Notice: Subject to any disclaimer, the term of this patent is extended or adjusted under 35 U.S.C. 154(b) by 0 days.

(21) Appl. No.: 16/042,692

(22) Filed: Jul. 23, 2018

(65) Prior Publication Data

US 2018/0326396 A1 Nov. 15, 2018

Related U.S. Application Data

(63) Continuation-in-part of application No. 15/606,704, filed on May 26, 2017, now Pat. No. 10,035,094, (Continued)

(51) Int. Cl.
*B01J 20/20* (2006.01)
*B01J 8/36* (2006.01)
(Continued)

(52) U.S. Cl.
CPC ............ *B01J 20/205* (2013.01); *B01D 53/64* (2013.01); *B01D 53/8665* (2013.01);
(Continued)

(58) Field of Classification Search
CPC .. B01D 53/94; B01D 53/96; B01D 2253/102; B01D 2257/602; B01D 53/8665;
(Continued)

(56) References Cited

U.S. PATENT DOCUMENTS 2,702,434 A * 2/1955 Richardson ................ B01J 8/36
34/588
6,136,072 A 10/2000 Sjostrom et al.
(Continued)

FOREIGN PATENT DOCUMENTS

CN 101472661 A * 7/2009 ............ B01D 53/64
WO WO-0062906 A1 10/2000

*Primary Examiner* — Timothy C Vanoy
(74) *Attorney, Agent, or Firm* — Harness, Dickey & Pierce, P.L.C.

(57) ABSTRACT

A system and method for cleaning, conditioning, and/or rejuvenating carbon-based sorbents is disclosed where a chemical cleaning process is used to separate contaminants from the sorbent. The contaminants can be disposed of or recycled for industrial uses. The cleaned and/or rejuvenated carbon-based sorbent is recycled back into a reverse venturi shaped fluidized bed apparatus for later use. Spent carbon-based sorbent can be routed for appropriate disposal. The carbon-based sorbents include, but are not limited to, activated carbon sorbent and biochar sorbent. Optionally, the sorbents can be processed through the system prior to exposure to contaminated emissions to enhance and increase the porosity of the outer surface of the sorbents.

26 Claims, 38 Drawing Sheets

Related U.S. Application Data which is a continuation-in-part of application No. 14/808,563, filed on Jul. 24, 2015, now Pat. No. 9,675,933.

(60) Provisional application No. 62/029,041, filed on Jul. 25, 2014, provisional application No. 62/133,791, filed on Mar. 16, 2015.

(51) Int. Cl.

| | | |
|---|---|---|
| *B01D 53/86* | (2006.01) | |
| *B01J 19/00* | (2006.01) | |
| *B01J 19/24* | (2006.01) | |
| *B01D 53/64* | (2006.01) | |
| *B01D 53/96* | (2006.01) | |
| *B01J 20/04* | (2006.01) | |
| *B01J 20/06* | (2006.01) | |
| *B01J 20/18* | (2006.01) | |
| *B01J 20/32* | (2006.01) | |
| *B01J 20/02* | (2006.01) | |

(52) U.S. Cl.
CPC ............... *B01D 53/96* (2013.01); *B01J 8/36* (2013.01); *B01J 19/006* (2013.01); *B01J 19/2425* (2013.01); *B01J 20/0237* (2013.01); *B01J 20/0244* (2013.01); *B01J 20/0251* (2013.01); *B01J 20/0266* (2013.01); *B01J 20/041* (2013.01); *B01J 20/06* (2013.01); *B01J 20/18* (2013.01); *B01J 20/20* (2013.01); *B01J 20/324* (2013.01); *B01J 20/3236* (2013.01); *B01D 53/8609* (2013.01); *B01D 53/8625* (2013.01); *B01D 2253/102* (2013.01); *B01D 2257/602* (2013.01); *B01J 2219/00768* (2013.01); *B01J 2219/00772* (2013.01); *B01J 2219/30242* (2013.01); *B01J 2220/42* (2013.01)

(58) Field of Classification Search
CPC .... B01D 53/64; B01D 2219/19; B01J 20/205; B01J 8/36; B01J 20/20; B01J 20/324; B01J 2220/42; B01J 19/2425; B01J 19/2515

See application file for complete search history.

(56) References Cited

U.S. PATENT DOCUMENTS

| | | | |
|---|---|---|---|
| 6,451,094 B1 | 9/2002 | Chang et al. | |
| 6,558,454 B1 | 5/2003 | Chang et al. | |
| 6,695,894 B2 | 2/2004 | Chang et al. | |
| 6,712,878 B2 | 3/2004 | Chang et al. | |
| 6,905,534 B2 | 6/2005 | Chang et al. | |
| 7,014,682 B2* | 3/2006 | Hickerson | B01D 53/0415 |
| | | | 55/315.1 |
| 7,141,091 B2 | 11/2006 | Chang | |
| 7,214,254 B2 | 5/2007 | Tranquilla | |
| 7,275,644 B2 | 10/2007 | Ness et al. | |
| 7,306,774 B2 | 12/2007 | DeBerry | |
| 7,494,632 B1 | 2/2009 | Klunder | |
| 7,540,384 B2 | 6/2009 | Ness et al. | |
| 7,575,629 B2 | 8/2009 | Yang et al. | |
| 7,578,869 B2 | 8/2009 | Yang et al. | |
| 7,618,603 B2 | 11/2009 | Seames et al. | |
| 7,704,920 B2 | 4/2010 | Yang et al. | |
| 7,731,781 B2 | 6/2010 | Berry et al. | |
| 7,753,992 B2 | 7/2010 | Yang et al. | |
| 7,850,764 B2 | 12/2010 | DeBerry | |
| 7,987,613 B2 | 8/2011 | Ness et al. | |
| 8,029,600 B2 | 10/2011 | Chang | |
| 8,062,410 B2 | 11/2011 | Bullinger et al. | |
| 8,241,398 B2 | 8/2012 | Berry et al. | |
| 8,480,791 B2 | 7/2013 | Yang et al. | |
| 8,523,963 B2 | 9/2013 | Bullinger et al. | |
| 8,579,999 B2 | 11/2013 | Bullinger et al. | |
| 8,651,282 B2 | 2/2014 | Ness et al. | |
| 8,685,351 B2 | 4/2014 | Yang et al. | |
| 8,721,777 B2 | 5/2014 | Velpari et al. | |
| 8,728,217 B2 | 5/2014 | Velpari et al. | |
| 8,728,974 B2 | 5/2014 | Yang et al. | |
| 8,747,676 B2 | 6/2014 | Hughes et al. | |
| 9,675,933 B2* | 6/2017 | Stuhler | B01D 53/82 |
| 9,962,650 B2* | 5/2018 | Stuhler | B01D 53/82 |
| 9,968,884 B2* | 5/2018 | Stuhler | B01D 53/83 |
| 10,035,094 B2* | 7/2018 | Stuhler | B01D 53/83 |
| 2005/0028672 A1* | 2/2005 | Hickerson | B01D 53/0415 |
| | | | 95/90 |
| 2006/0120935 A1 | 6/2006 | Stuhler et al. | |
| 2011/0256029 A1 | 10/2011 | Comrie | |
| 2018/0257031 A1* | 9/2018 | Olson | B01J 20/3416 |

* cited by examiner

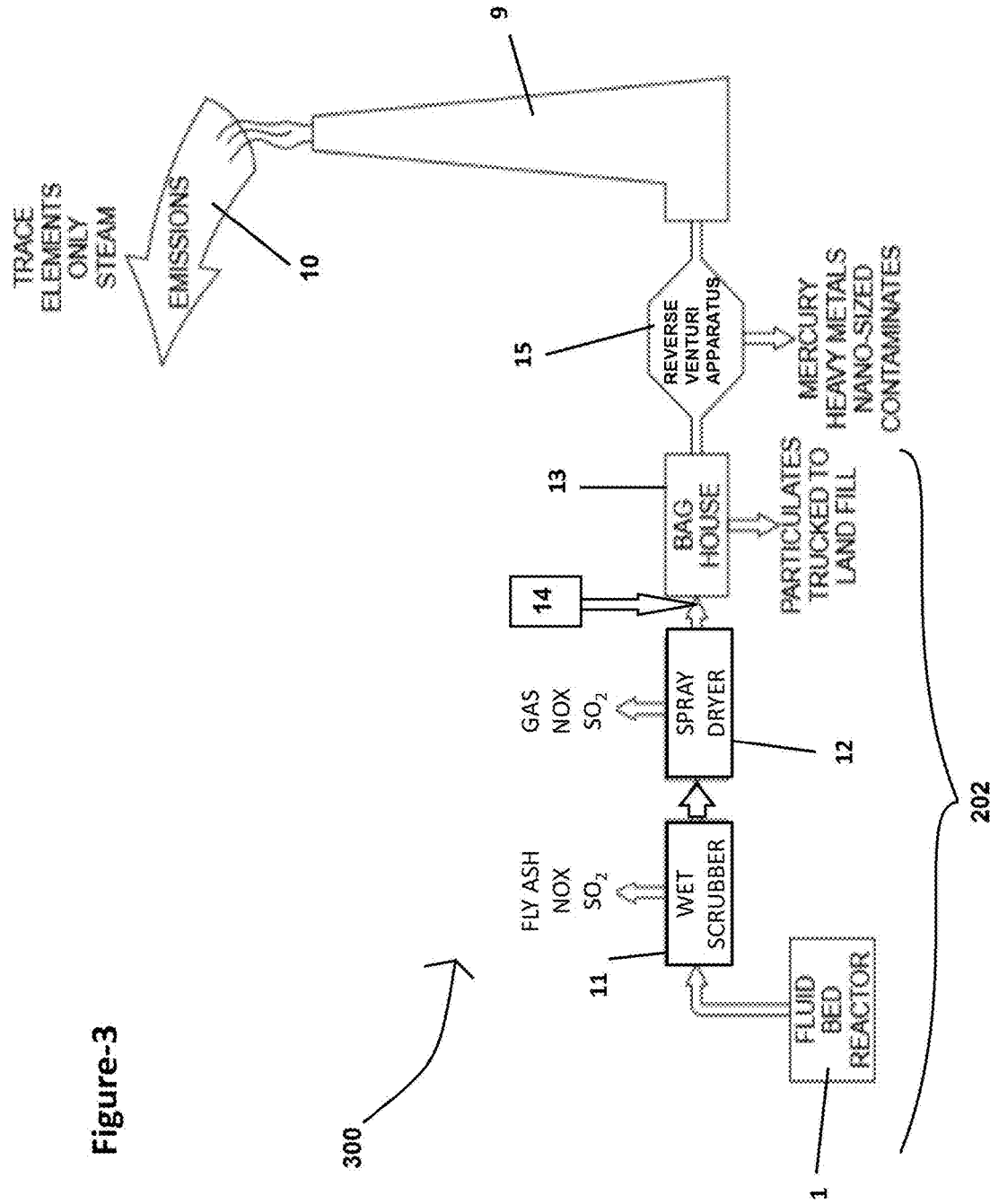

Figure-4B
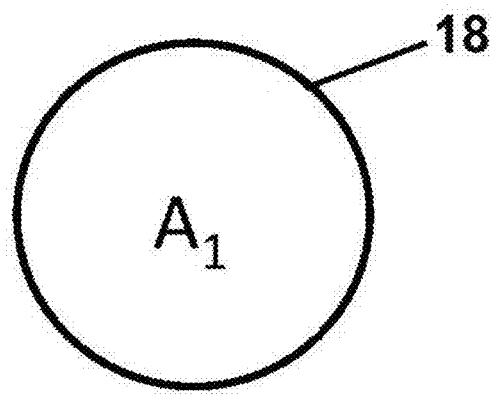
Figure-4C
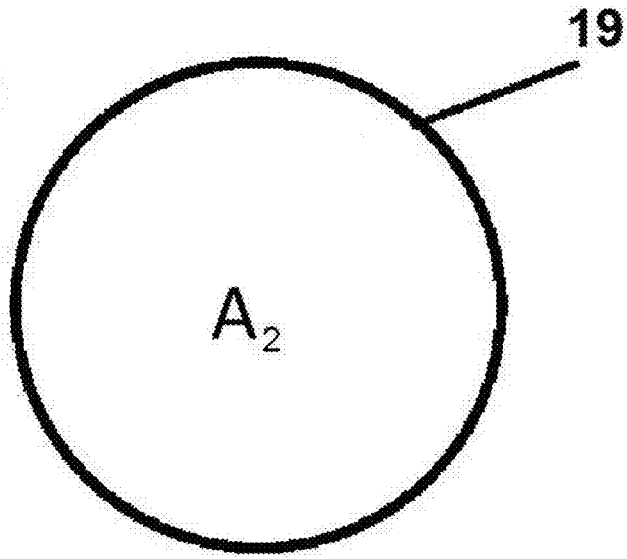
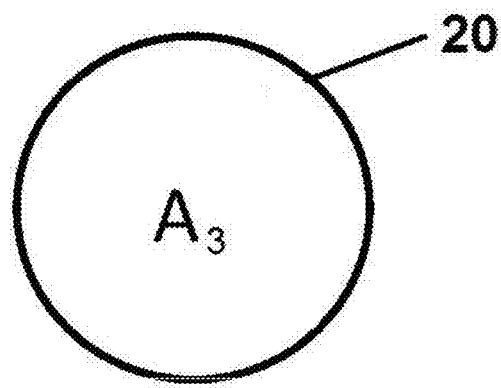
Figure-4D

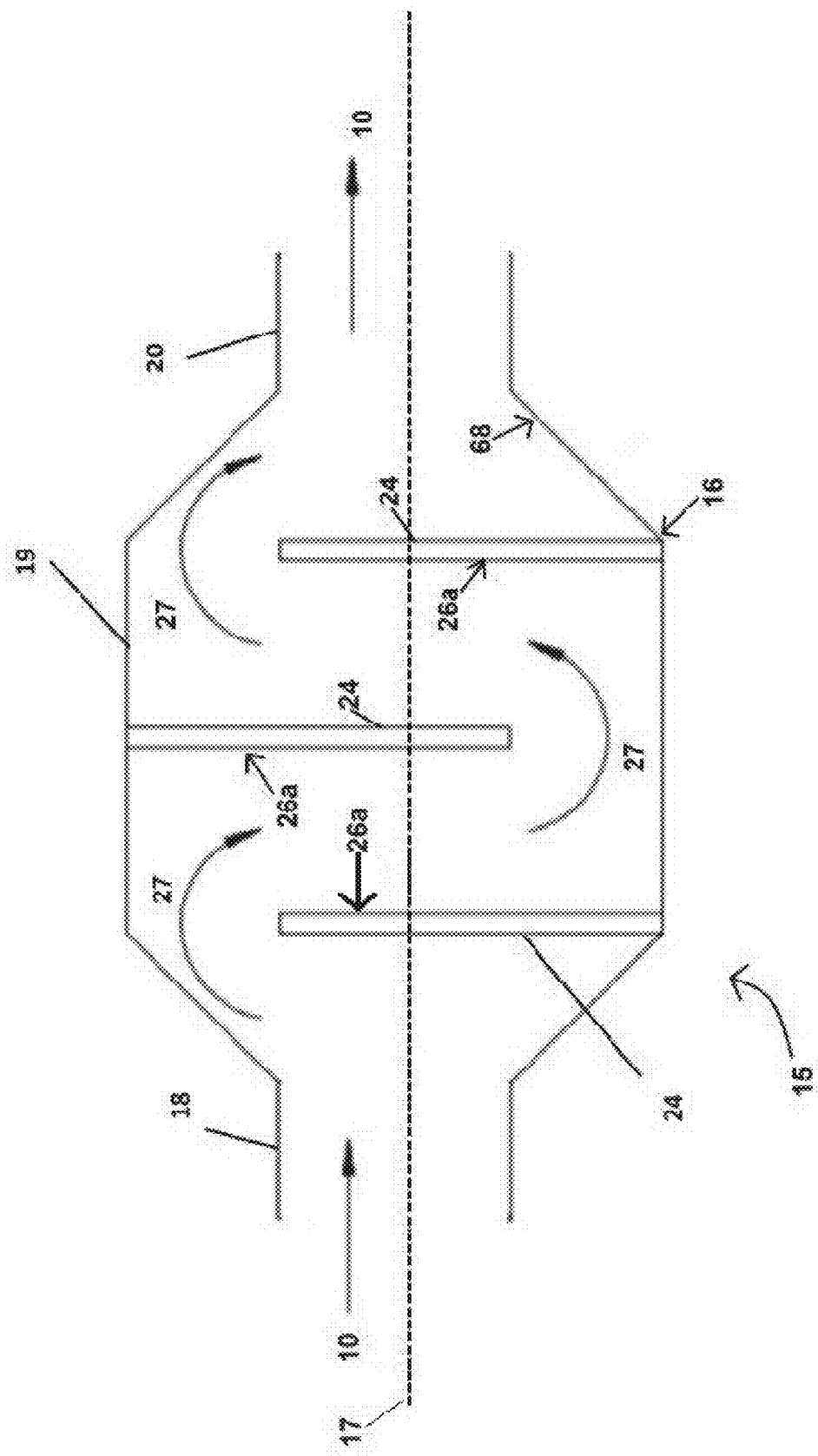

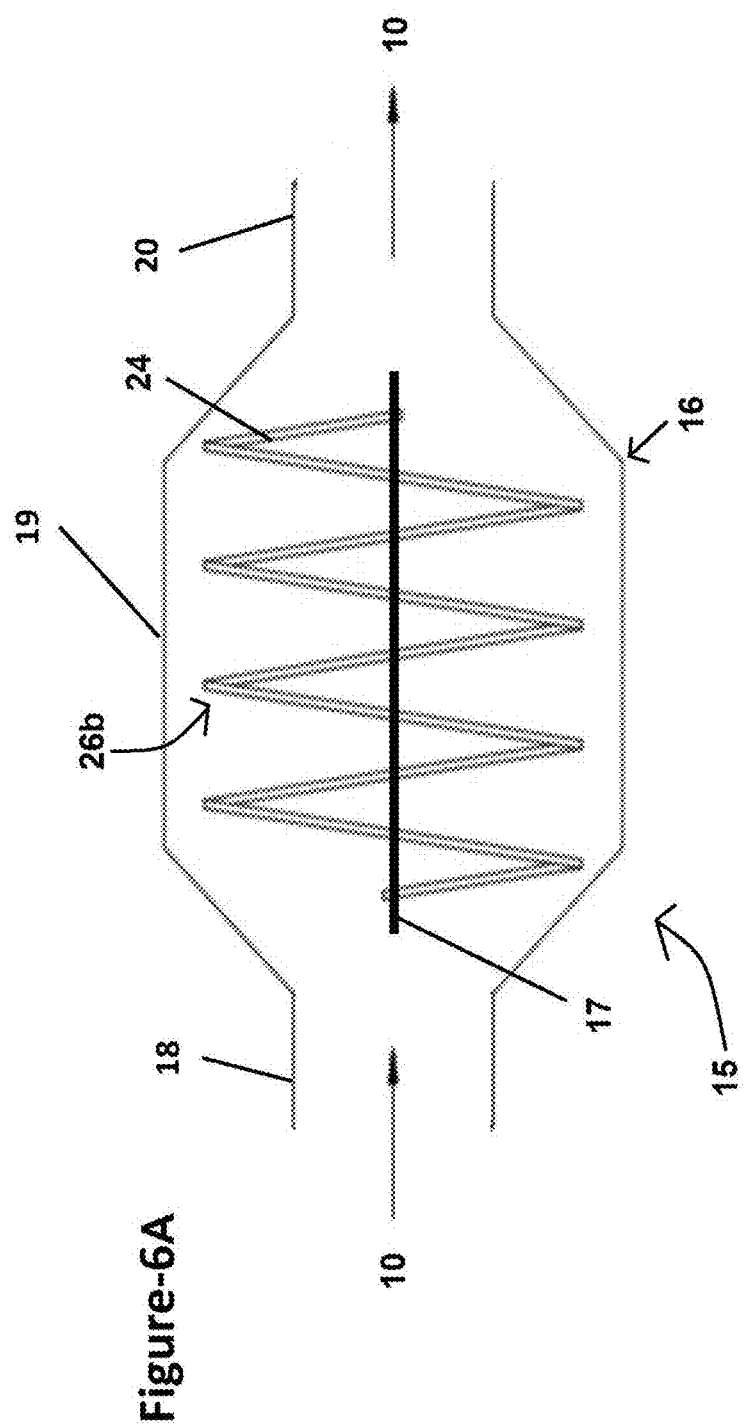

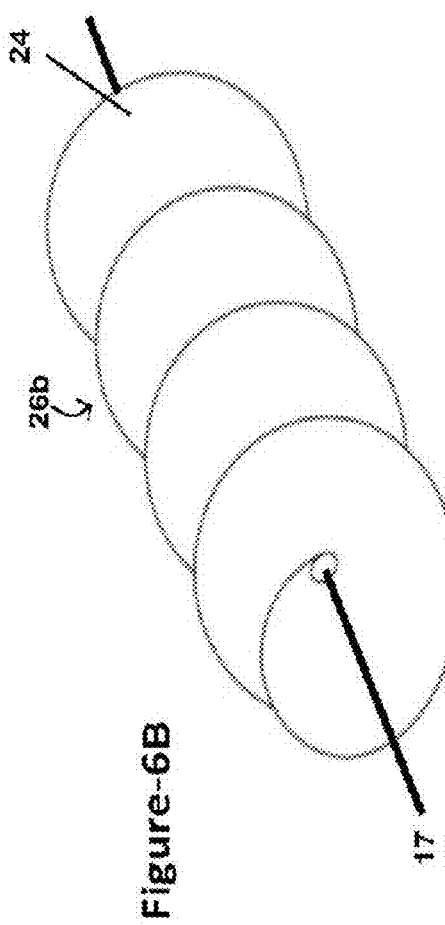

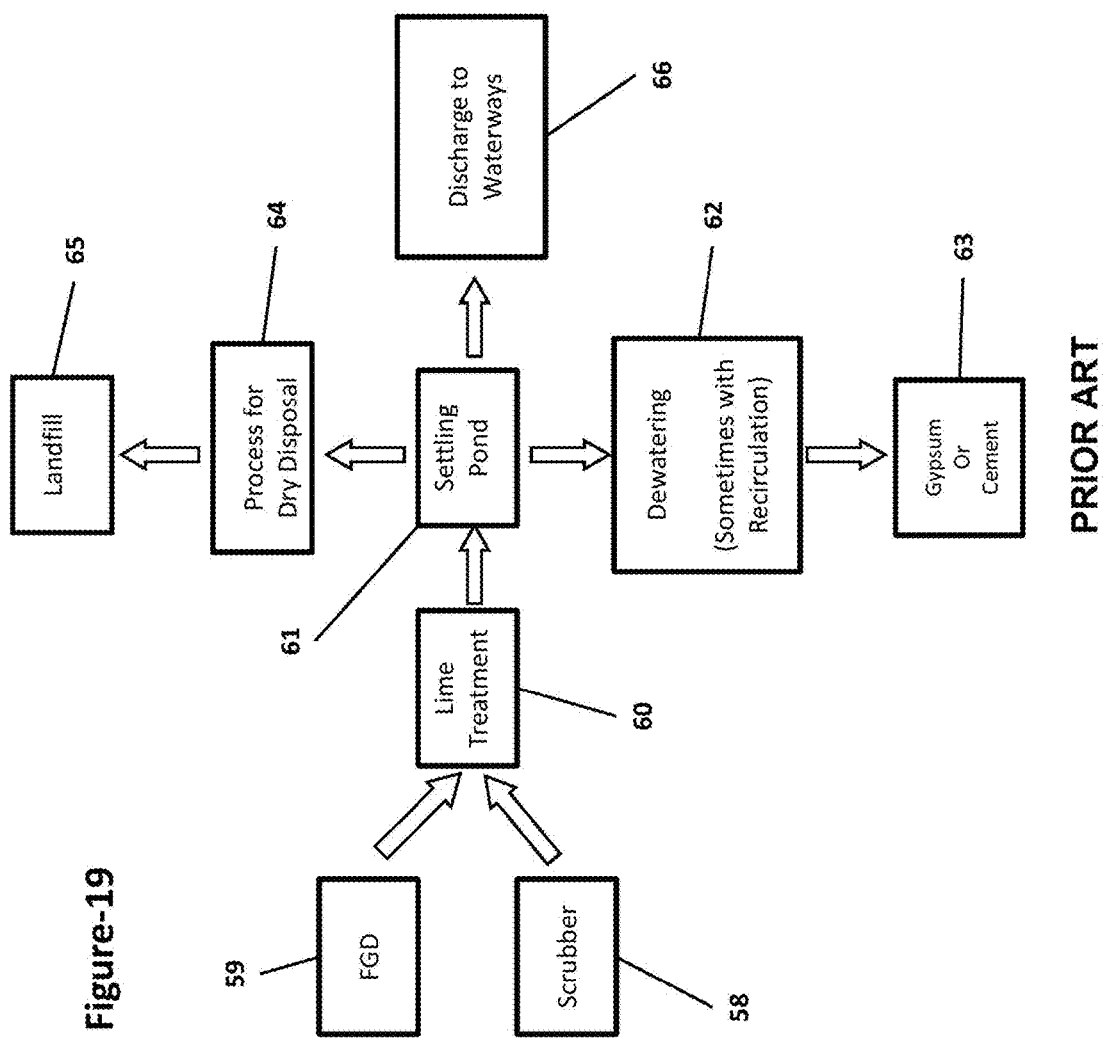

Figure-27

| Contaminates | CZTS Alloys | | Activated Carbon | | Zeolite | |
| --- | --- | --- | --- | --- | --- | --- |
| | Gaseous | Non Gaseous | Gaseous | Non Gaseous | Gaseous | Non Gaseous |
| Nitrogens | Effective | Effective | Effective | Effective | N/A | Effective |
| Phosphates | Effective | Effective | Effective | Effective | Effective | Effective |
| Heavy Metals | Effective | Effective | Effective | N/A | N/A | Effective |
| Sulfur | Effective | Effective | Effective | N/A | N/A | Effective |
| Mercury | Effective | Effective | Effective | Effective | N/A | Effective |
| Selenate | Effective | Effective | N/A | N/A | N/A | N/A |

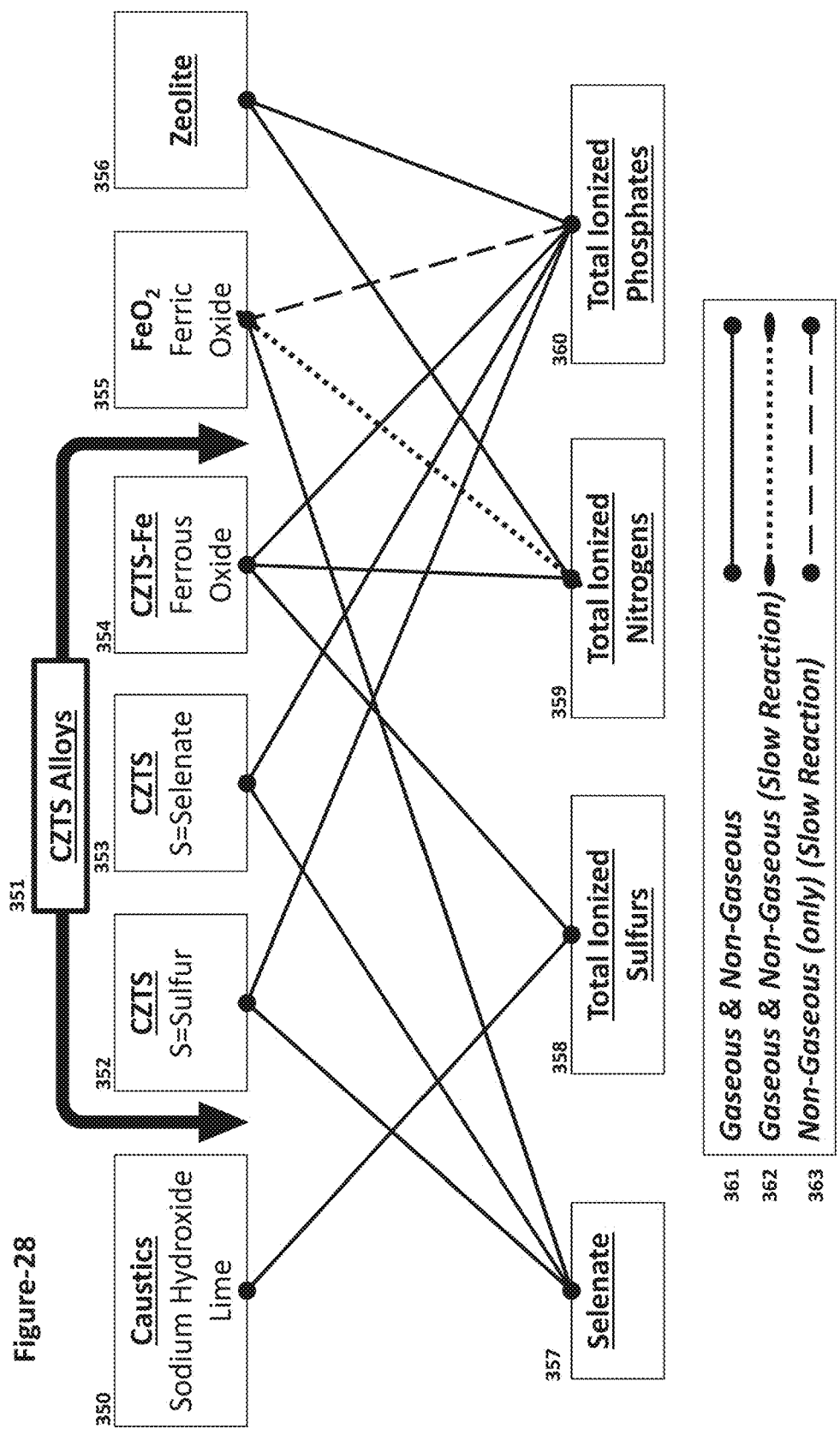

Figure-29

| Contaminates | Prior Art Filter Media / Sorbents | | | | |
|---|---|---|---|---|---|
| | Separate Contaminates from Filter Media / Sorbents | | Reuse Filter Media / Sorbents After Separation of Contaminates | | |
| | Gaseous | Non-Gaseous | Gaseous | Non-Gaseous | |
| Nitrogens | Yes | No | Yes | No | |
| Sulfurs | No | No | No | No | |
| Phosphorous | No | No | No | No | |
| Heavy Metals | No | No | No | No | |
| Mercury | No | No | No | No | |
| Selenates | No | No | No | No | |

Figure-30

| Contaminates 367 | CZTS Alloy Filter Media / Sorbents 378 | | | |
|---|---|---|---|---|
| | Separate Contaminates from Filter Media / Sorbents 339 | | Reuse Filter Media / Sorbents After Separation of Contaminates 340 | |
| | Gaseous 374 | Non-Gaseous 375 | Gaseous 376 | Non-Gaseous 377 |
| Nitrogens 368 | Yes | Yes | Yes | Yes |
| Sulfurs 371 | Yes | Yes | Yes | Yes |
| Phosphorous 369 | Yes | Yes | Yes | Yes |
| Heavy Metals 370 | Yes | Yes | Yes | Yes |
| Mercury 372 | Yes | Yes | Yes | Yes |
| Selenate 373 | Yes | Yes | Yes | Yes |

EMISSIONS CONTROL SYSTEM INCLUDING CAPABILITY TO CLEAN AND/OR REJUVENATE CARBON-BASED SORBENTS AND METHOD OF USE

CROSS-REFERENCE TO RELATED APPLICATIONS

This application is a continuation-in-part of U.S. patent application Ser. No. 15/606,704, filed on May 26, 2017, which is a continuation-in-part of U.S. patent application Ser. No. 14/808,563, filed on Jul. 24, 2015, which claims the benefit of U.S. Provisional Application No. 62/029,041, filed Jul. 25, 2014 and U.S. Provisional Application No. 62/133,791, filed Mar. 16, 2015. The entire disclosures of the above applications are incorporated herein by reference.

FIELD

The subject disclosure generally relates to industrial emission control systems and methods, the devices used in such systems, and methods to remove contaminants from gaseous and non-gaseous emissions.

BACKGROUND

This section provides background information related to the present disclosure which is not necessarily prior art.

Many industries from numerous sectors of the economy have emissions of one kind or another. Such emissions can be separated into two basic groups, one being gaseous and the other being non-gaseous. It is common for emissions in the gaseous group and emissions in the non-gaseous group to contain hazardous contaminants. Emissions in the gaseous group may be in the form of exhaust gases generated by a coal fired plant or from a natural gas burning facility. Emissions in the non-gaseous group may be in the form of liquid-like, sludge-like, or slurry-like substances. When the level of hazardous contaminants in emissions meets and/or exceeds allowable limits, the contaminants must either be neutralized, captured, collected, removed, disposed of, and/or properly contained by one means or another.

Many industries rely upon burning a fuel material as a means to accomplish some aspect of their respective process. For instance, in a first example, steel mills burn and/or smelt metal in the process of making metal shapes, extrusions, and other metal castings. The processes used in the metal industry include operations in which particulates are emitted in metallic vapor and ionized metal. Hazardous contaminants to the environment, plants, animals, and/or humans are released into the air via the metallic vapor. To one degree or another, the hazardous contaminants in the metallic vapor and/or the metallic vapor compounds must be collected and disposed of properly. In a second example, the industry of mining precious heavy metals such as gold, silver, and platinum includes metals and metallic vapor emissions containing heavy metal contaminants and particulates that are considered hazardous if not captured, collected, and disposed of properly. In a third example, industries burning natural gas have emissions that often contain elevated levels of contaminants that are considered to be hazardous if not captured, collected, and disposed of properly. In a fourth example, the producers of energy who use coal as a burnable consumable to create steam in boilers for turning generators have considerable emissions containing metallic vapor and metallic compounds that are considered hazardous to the environment, plants, animals, and humans. Among other hazardous contaminants, metallic vapor emissions often contain mercury (Hg).

Because of the pattern of global jet streams, airborne metallic vapor emissions may be carried from one country and deposited in another. For instance, it is possible that much of the emissions of mercury generated in China and/or India may actually end up being deposited in the USA and/or the ocean waters in between. In a similar fashion, much of the mercury laden emissions generated in the USA may actually be deposited in Europe and/or in the ocean waters in between. To complete this circle, much of the mercury laden emissions generated in Europe may actually be deposited in China and/or India. Therefore, the containment of mercury and other hazardous contaminants in emissions generated by industrial processes is a global problem with global implications requiring a global effort to resolve it.

National and international regulations, rules, restrictions, fees, monitoring, and a long line of ever evolving and increasingly stringent laws are proposed and/or enforced upon those generating such emissions. For example, one of the most egregious and regulated contaminants in metallic vapor emissions is mercury. Human industrial processes have greatly increased the accumulation of mercury and/or mercury deposits in concentrations that are well above naturally occurring levels. On a global basis, it is estimated that the total quantity of mercury released by human-based activities is as much as 1,960 metric tons per year. This figure was calculated from data analyzed in 2010. Worldwide, the largest contributors to this particular type of emission are coal burning (24%) and gold mining (37%) activities. In the USA, coal burning accounts for a higher percentage of emissions than gold mining activities.

The primary problem with exposure to mercury for animals and humans is that it is a bioaccumulation substance. Therefore, any amount of mercury ingested by fish or other animals remains in the animal (i.e. accumulates) and is passed on to humans or other animals when the former is ingested by the later. Furthermore, the mercury is never excreted from the body of the ingesting host. In the food chain, larger predators, which either live the longest and/or eat large quantities of other animals, are at the greatest risk of having excessive mercury accumulations. Humans, who eat too much mercury-laden animals, especially fish, are subject to a wide range of well-known medical issues including nervous system maladies and/or reproductive problems.

There are three primary types of mercury emissions: anthropogenic emissions, re-emission, and naturally occurring emissions. Anthropogenic emissions are mostly the result of industrial activity. Anthropogenic emission sources include industrial coal burning plants, natural gas burning facilities, cement production plants, oil refining facilities, the chlor-alkali industry, vinyl chloride industry, mining operations, and smelting operations. Re-emissions occur when mercury deposited in soils is re-dispersed via floods or forest fires. Mercury absorbed in soil and/or deposited in soil can be released back into the water via rain runoff and/or flooding. As such, soil erosion contributes to this problem. Forest fires, whether they are acts of nature, arson, or deliberate deforestation burning, re-emit mercury back into the air and/or water sources only to be deposited again elsewhere. Naturally occurring emissions include volcanoes and geothermal vents. It is estimated that about half of all mercury released into the atmosphere is from naturally occurring events such as volcanoes and thermal vents.

As noted above, coal burning plants release a large quantity of mercury and other contaminants into the environment each year. Accordingly, there are many ongoing efforts to reduce the amount of hazardous contaminants in the flue gas emissions produced by coal burning plants. Many coal burning plants in the USA are equipped with emissions control systems which capture, contain, and/or recover hazardous elements such as mercury. In coal burning plants, coal is burned to boil water, turning the water into steam, which is used to run electric generators. The flue gas emissions from the burning of coal are often conveyed through a conduit system to a fluid gas desulfurization unit and/or a spray dryer system, which remove some emissions and some of the noxious fumes such as sulfur dioxide ($SO_2$) and hydrogen chloride (HCl) from the flue gases. A typical conduit system then routes the flow of flue gases to a wet or dry scrubber where more sulfur dioxide, hydrogen chloride, and fly ash are removed. The flow of flue gases is routed through a bag house where particulates are separated from the airflow in the flue gases, similar to the way a household vacuum cleaner bag works. The flue gases pass through the filter-like bags, which have a porosity allowing airflow but not the larger particulates traveling in the airflow. The surfaces of the filter bags are shaken and/or cleaned to collect the captured particulates so that they can be disposed of. Usually, these deposits are hazardous emissions themselves and must be disposed of accordingly. The balance of flue gasses that make it through this type of emissions control system is then allowed to escape through a tall smoke stack and released into the atmosphere.

The problem with this type of emissions control system is that it is virtually ineffective to capture and/or collect the heavy metals such as mercury contained in a metallic vapor and metallic compound vapor form. Since the coal fired burning systems burn coal at relatively elevated temperatures near 1,500 degrees Fahrenheit, the mercury is converted into nano-sized vapor particles that are able to slip through even the most capable filter systems. As a result, significant emissions of air borne mercury and other hazardous contaminants are released into the atmosphere.

In an effort to capture and collect mercury from coal fired systems and/or other emission sources of mercury, several known systems have been developed to address the problem, which generally fall into one of three categories.

The first category is a group of methods and/or systems that capture mercury by injecting a sorbent into the flue gas stream. Other than a noble metal, the most common sorbent material used is activated carbon and/or biochar. Activated carbon is often halogenated with bromine. Biochar is a form of charcoal that is rich in carbon. The injection of sorbents into the flue gas helps to capture contaminants in one and/or any combination of the following typical emissions control devices: an electrostatic precipitator, a fluidized gas desulfurization system, scrubber systems, or fabric filter systems. There are several variations of these systems, requiring the injection of activated carbon at various points of the emission control system after combustion of the coal. Some exemplary methods and/or systems of the first category are disclosed in U.S. Pat. Nos. 7,578,869, 7,575,629, 7,494,632, 7,306,774, 7,850,764, 7,704,920, 7,141,091, 6,905,534, 6,712,878, 6,695,894, 6,558,454, 6,451,094, 6,136,072, 7,618,603, 7,494,632, 8,747,676, 8,241,398, 8,728,974, 8,728,217, 8,721,777, 8,685,351, and 8,029,600.

The second category is a group of methods and/or systems that pretreat the coal fuel before combustion in an effort to reduce the levels of mercury in the coal fuel. Some exemplary methods and/or systems of the second category are described in U.S. Pat. Nos. 7,540,384, 7,275,644, 8,651,282, 8,523,963, 8,579,999, 8,062,410, and 7,987,613. All of the methods and/or systems set forth in these exemplary patents generate large volumes of unusable coal, which is also considered a hazardous waste. As a result, the methods and/or systems of the second category of known solutions are inefficient and expensive to operate. Furthermore, substantial capital and physical space is often required for the pretreatment of coal, making it impractical to retrofit many existing emission control systems with the necessary equipment.

The third category is a group of methods and/or systems that inject a catalyst into the emissions control equipment upstream of the activated carbon injection system. The catalyst in these methods and/or systems ionize the mercury making it easier to collect and remove the mercury from the flue gasses. However, the efficiency of such methods and/or systems is poor and operating costs are high, such that the methods and/or systems of the third category of known solutions are not cost effective. Examples of the third category are described in U.S. Pat. Nos. 8,480,791, 8,241, 398, 7,753,992, and 7,731,781. In addition to these examples, U.S. Pat. No. 7,214,254 discloses a method and apparatus for regenerating expensive sorbent materials by using a microwave and a fluid bed reactor. The method selectively vaporizes mercury from the sorbent, at which point the mercury can be caught in a specialized filter or condensed and collected. The use of microwave generation renders this method impractical for large scale commercial applications and is therefore only useful for the regeneration of expensive sorbents. Another example is found in U.S. Patent Application Publication No. 2006/0120935, which discloses a method for the removal of mercury from flue gasses using any one of several substrate materials to form chemical attractions to the mercury as the flue gasses pass through the emissions control equipment. This method is also impractical for large scale commercial use. Therefore, current emissions control systems and methods generally operate by transferring the hazardous contaminants from a gaseous emission to a non-gaseous emission, which creates another set of emission control problems.

While many laws and regulations focus on metallic vapor emissions, other forms of emissions containing hazardous contaminants such as slurry and/or slurry-like emissions, sludge and/or sludge-like emissions, liquid and/or liquid-like emissions, and other emission variations should not be overlooked. All of the emission types listed may also require processing where the hazardous contaminants they contain can be neutralized, captured, collected, removed, disposed of, and/or properly contained by one means or another. Historically, the most cost effective and most widely used process for removing hazardous contaminants utilizes activated carbon (in one form or another), through which the emissions pass. Accordingly, the demand for activated carbon in the USA is expected to grow each year through 2017 with over one billion pounds required each and every year at a cost to industries of over $1-$1.50/pound. This equates to about $1 billion annually. Most of the projected increase in demand for activated carbon is driven by the implementation of EPA promulgated regulations, which require utilities and industrial manufacturers to upgrade coal-fired power plants to comply with ever more stringent requirements.

In addition to the ever more stringent gaseous emissions regulations, the EPA has implemented tougher regulations for non-gaseous emissions through The Clean Water Act, which must be fully complied with by 2016. The combination of increasing regulations on all types of emissions impacts multiple types of emissions that are produced by a variety of different industries. Some industries, such as electrical power producers, who burn fuel to generate power, produce primary gaseous emissions containing hazardous contaminants. Per industry standards, these gaseous emissions are exposed to activated carbon materials in an effort to capture enough volume of hazardous contaminants so as to render the gaseous emission at or below allowable limits for contaminants. The process of removing the hazardous contaminants from the gaseous emissions generated from burning these fuels results in and/or generates secondary non-gaseous emissions in the form of liquid-like or slurry-like substances containing the hazardous contaminants. The hazardous contaminants in the second non-gaseous emissions must also be captured and/or contained appropriately to prevent the hazardous contaminants from being discharged into the environment. Both the primary gaseous emissions and the secondary non-gaseous emissions require a means of properly capturing and/or reclaiming and/or confining enough of the hazardous contaminants to comply with environmental regulations. The industrial costs associated with known available processes capable of accomplishing the removal of the hazardous contaminants from the secondary non-gaseous emissions are almost so cost prohibitive that some industries are forced to shut down facilities if they cannot pass the costs along to consumers.

In accordance with some practices, non-gaseous emissions, which are considered to be hazardous because they contain elevated levels of contaminants, are consigned and contained for long-term storage in ponds, piles, or drying beds. While such practices isolate the hazardous contaminants, they are expensive and consume land area without neutralizing the hazardous contaminants themselves, which can result in environmental hazards at the containment sites. One example of a non-gaseous emission is fly ash, which is a naturally-occurring product from the combustion of coal. Fly ash is basically identical in composition to volcanic ash. Fly ash contains trace concentrations (i.e. amounts) of many heavy metals and other known hazardous and toxic contaminants including mercury, beryllium, cadmium, barium, chromium, copper, lead, molybdenum, nickel, radium, selenium, thorium, uranium, vanadium, and zinc. Some estimates suggest that as much as 10% of the coal burned in the USA consists of unburnable material, which becomes ash. As a result, the concentrations of hazardous trace elements in coal ash are as much as 10 times higher than the concentration of such elements in the original coal.

Fly ash is considered to be a pozzolan material with a long history of being used in the production of concrete because when it is mixed with calcium hydroxide a cementitious material is formed that aggregates with water and other compounds to produce a concrete mix well suited for roads, airport runways, and bridges. The fly ash produced in coal burning plants is flue-ash that is comprised of very fine particles which rise with the flue gases. Ash that does not rise is often called bottom ash. In the early days of coal burning plants, fly ash was simply released into the atmosphere. In recent decades, environmental regulations have required emission controls to be installed to prevent the release of fly ash into the atmosphere. In many plants the use of electrostatic precipitators capture the fly ash before it can reach the chimneys and exit to atmosphere. Typically the bottom ash is mixed with the captured fly ash to form what is known as coal ash. Usually, the fly ash contains higher levels of hazardous contaminants than the bottom ash, which is why mixing bottom ash with fly ash brings the proportional levels of hazardous contaminants within compliance of most standards for non-gaseous emissions. However, future standards may reclassify fly ash as a hazardous material. If fly ash is reclassified as a hazardous material it will be prevented from being utilized in the production of cement, asphalt, and many other widely used applications. It has been estimated by some studies that the cost increase of concrete in the USA alone would exceed $5 billion per year as a result of a ban on the usage of fly ash in concrete production. The increase in cost is a direct result of more expensive alternative materials being used in place of fly ash. In addition, no other known material is suitable as a direct replacement for fly ash in cement due to its unique physical properties.

Reports indicate that in the USA over 130 million tons of fly ash is produced annually by over 450 coal-fired power plants. Some reports estimate that barely 40% of this fly ash is re-used, indicating that as much as 52 million annual tons of fly ash is reused leaving as much as 78 million annual tons stored in bulk in slurry ponds and piles. Fly ash is typically stored in wet slurry ponds to minimize the potential of fugitive particulates becoming airborne, which could convey contaminants out of bulk storage and into the atmosphere and surrounding environment. In addition to airborne releases of bulk storage fly ash, there is a threat of breach and/or failure of the containment systems required for the long term containment of fly ash. One famous example of a breach occurred in 2008 in Tennessee, where an embankment of a wet storage fly ash pond collapsed, spilling 5.4 million cubic yards of fly ash. The spill damaged several homes and contaminated a nearby river. Cleanup costs are still ongoing at the time of this application and could exceed $1.2 billion.

In another example, non-gaseous emissions may be found as byproducts in typical wastewater generation systems of coal burning facilities. In typical wastewater generation systems, large volumes of water come from boiler blow down and cooling water processes. These large volumes of wastewater contain relatively low levels of contaminants and are used to dilute other waste streams containing much higher levels of contamination. The contaminated wastewater streams typically discharged from scrubber systems is diluted with the large volumes of wastewater from the boiler blow down and/or cooling water processes and then treated in large continuous mix tanks with lime to form gypsum, which is then pumped into settling ponds. During this process certain amounts of mercury and other heavy metals are entrained with the gypsum and stabilized for use in wallboard and cement. This gypsum is generally considered to be non-leaching and is not considered a pollution hazard. However, the water from the settling ponds is generally discharged into the waterways. Current regulations allow this ongoing discharge, but looming regulations propose that certain contaminants and/or levels of those contaminants be mandated as a hazardous pollution.

With regard to removing mercury and heavy metals from non-gaseous industrial wastewater streams, the use of carbonate, phosphate, or sulfur is often employed in an effort to reduce hazardous contaminants to low residual levels. One known method for removing mercury and other hazardous contaminants from industrial wastewater streams is chemical precipitation reaction. Another known method utilizes ion exchange. One of the primary problems with the chemical precipitation reaction and ion exchange methods is that these methods are not sufficient to fully comply with the ever more stringent EPA regulations for non-gaseous emissions when the amount of contaminants is high, such as for treating fly ash slurry emissions.

Another source of contaminated non-gaseous emissions is from maritime vessels waste discharge and/or ballast discharge. Commercial ships such as cargo ships and tankers have both waste and ballast discharge. Entertainment cruise liners also have discharge effluents to deal with at port stops. Additionally, military and defense vessels have significant discharge effluents.

Another significant discharge effluent is generated by offshore drilling operations. Treatment of effluent waste on-site at the offshore rig is much less expensive than transportation of waste to land for treatment. Therefore, efficient filtering of offshore waste prior to discharge into the sea is necessary to maintain appropriate and acceptable ecology requirements. Virtually all contaminated emissions applications vary in the types and/or specific concentrations of contaminates in the emissions. Therefore, a one-size-fits-all approach for a suitable sorbent which is optimized for all possible contaminated emissions applications is not possible. There is a need for providing application specific sorbent solutions for optimizing effective emissions control based on specific contaminates resident in emissions. A further need exists to be able to adjust the sorbent application during use to correspond to changing levels and/or types of contaminates resident in the emissions.

There are also various known commercial emissions control methods and systems sold under different tradenames for treating secondary non-gaseous emissions. One treatment method known by the tradename Blue PRO is a reactive filtration process that removes mercury from secondary non-gaseous emissions using co-precipitation and absorption. Another treatment method known by the tradename MERSORB-LW uses a granular coal based absorbent to remove mercury from secondary non-gaseous emissions by co-precipitation and absorption. Another treatment method known as Chloralkali Electrolysis Wastewater removes mercury from secondary non-gaseous emissions during the electrolytic production of chlorine. Another treatment method uses absorption kinetics and activated carbon derived from fertilizer waste to remove mercury from secondary non-gaseous emissions. Another treatment method uses a porous cellulose carrier modified with polyethyleneimine as an absorbent to remove mercury from secondary non-gaseous emissions. Another treatment method uses microorganisms in an enzymatic reduction to remove mercury from secondary non-gaseous emissions. Yet another treatment method known by the tradename MerCUR$_x$E uses chemical precipitation reactions to treat contaminated liquid-like non-gaseous emissions.

A common treatment method by some of the emissions control systems is to dilute contaminates instead of removing them from the emissions. As a result, if the PPM levels of a contaminate in an emission exceeds the allowable levels, then rather than removing the contaminate to reduce the level, additional non-contaminated volume is added to the emission so that the resulting PPM levels are reduced to allowable levels, even though the actual amount of contaminate being allowed remains unchanged. There is a serious need to overcome this practice of dilution by providing an effective emissions control method which not only reduces the PPM level of contaminates, but removes the contaminates from the emissions.

SUMMARY

This section provides a general summary of the disclosure, and is not a comprehensive disclosure of its full scope or all of its features.

In accordance with one aspect of the subject disclosure, an apparatus for removing contaminants from emissions is disclosed. The apparatus includes a housing that is shaped as a reverse venturi. The housing includes an entry portion for receiving the emissions at a pre-determined entry flow rate, an exit portion for expelling the emissions at a pre-determined exit flow rate, and an enlarged portion disposed between the entry portion and the exit portion of the housing for trapping the contaminants in the emissions. The entry portion, the exit portion, and the enlarged portion of the housing are arranged in fluid communication with each other. In addition, the entry portion of the housing has an entry portion cross-sectional area, the exit portion of said housing has an exit portion cross-sectional area, and the enlarged portion of the housing has an enlarged portion cross-sectional area. In accordance with the reverse venturi shape of the housing, the enlarged portion cross-sectional area is larger than the entry portion cross-sectional area and the exit portion cross-sectional area. Due to this geometry of the housing, the emissions entering the enlarged portion of the housing slow down and pass through the enlarged portion of the housing at a slower velocity relative to a velocity of the emissions passing through the entry portion and the exit portion of the housing. Because the flow of the emissions slows down in the enlarged portion of the housing, a dwell time of the emissions in the enlarged portion of the housing is increased.

The apparatus also includes a mass of reactive material including one or more carbon-based sorbents that are disposed within the enlarged portion of the housing. The mass of reactive material has a reactive outer surface that is disposed in contact with the emissions. Furthermore, the mass of reactive material contains an amalgam forming metal at the reactive outer surface. The amalgam forming metal in the mass of reactive material chemically binds at least some of the contaminants in the emissions that are passing through the enlarged portion of the housing to the reactive outer surface of the mass of reactive material. One or more sorbent treatment subsystems are disposed in fluid communication with the housing. Each sorbent treatment subsystem receives the carbon-based sorbent from the housing via a sorbent discharge port and returns clean carbon-based sorbent to the housing via a sorbent return port. The sorbent treatment subsystem(s) include a solvent for separating contaminants from the carbon-based sorbent in a cleaning and conditioning process before the cleaned carbon-based sorbent is returned to the housing of the fluidized bed apparatus.

In accordance with another aspect of the subject disclosure, an emissions control method is disclosed for removing contaminants from emissions. The method includes the steps of: routing the emissions through one or more pre-filters containing a pre-filter sorbent and routing the emissions away from the pre-filter(s) and into a treatment system. The treatment system has a reverse venturi shaped fluidized bed apparatus containing a reactive material that chemically binds with the contaminants carried in the emissions. The reactive material in the reverse venturi shaped fluidized bed apparatus is selected from a group of carbon-based sorbents. For example and without limitation, the carbon-based sorbent(s) in the reverse venturi shaped fluidized bed apparatus may be activated carbon and/or biochar. The method further includes the steps of trapping the contaminants in the reactive material contained in the reverse venturi shaped fluidized bed apparatus and routing the carbon-based sorbent through one or more sorbent treatment subsystems. The sorbent treatment subsystem(s) contain a solvent that cleans and conditions the carbon-based sorbent before it is routed back into the reverse venturi shaped fluidized bed apparatus.

It is important to maintain optimum process conditions of the carbon-based sorbents being used to remove contaminated emissions from the reverse venturi shaped fluidized bed apparatus. Therefore, the carbon-based sorbent is routed from the reverse venturi shaped fluidized bed apparatus and into a sorbent treatment subsystem. The sorbent treatment subsystem is designed to clean, condition, and/or rejuvenate the carbon-based sorbent to optimum conditions before returning the carbon-based sorbent back into the reverse venturi shaped fluidized bed apparatus. The sorbent treatment subsystem is also designed to separate, and route for disposal, spent and exhausted sorbent from the rest of the carbon-based sorbent that can be cleaned and/or rejuvenated. The sorbent treatment subsystem is further designed to separate captured contaminates from the carbon-based sorbent for recycled use in various industries or for proper disposal if there is not a viable recycling option. The sorbent treatment subsystem is further designed to supplement and/or replace carbon-based sorbent that has been separated for disposal and/or carbon-based sorbent that has been consumed during the normal operation of removing contaminants from contaminated emissions. The sorbent treatment subsystem is also designed to condition carbon-based sorbent before it is exposed to contaminated emissions. In accordance with this aspect of the subject disclosure, the solvent in the sorbent treatment subsystem increases a porosity of the outer surface of the carbon-based sorbent to increase its ability to bind with contaminants in the emissions passing through the reverse venturi shaped fluidized bed apparatus.

In addition to the advantage of significant savings, the subject apparatus and method are more effective at removing hazardous contaminants from gaseous and non-gaseous emissions compared to known emissions control systems and methods. It is estimated that these improvements are significant enough to enable industries to meet and/or exceed the projected regulation requirements, which is not economically viable with current technology. Therefore, the subject apparatus and methods have the potential of allowing the continued use of fly ash, even if regulatory requirements reclassify fly ash as a hazardous material, thus avoiding significant increased cost to the construction industry, utility power generation industry, and other industries producing non-gaseous ash-type byproducts.

The reverse venturi shaped fluidized bed apparatus may be specifically sized with a certain length to diameter ratio to provide optimum restrictive residence time of the emissions as they pass through the specialized sorbent housed in the device. Through testing and trials, it has been determined that an optimum length to diameter ratio for the housing of the fluidized bed apparatus is between 2.9:1 and 9.8:1 with an exemplary preference of 4.4:1. Therefore, in one exemplary preferred embodiment the diameter is 4.5 feet with a length of 19.8 feet in length, which gives a length to diameter ratio of 4.4:1.

Another feature of the exemplary reverse venturi shaped fluidized bed device is to have predominately rounded outwardly projecting convex ends when viewed from either end outside the vessel. Testing of exemplary examples of the system with a fluidized bed apparatus constructed in this fashion have demonstrated that residence time (the time in which the emissions are in contact with the sorbent) is maximized because the flow of the emissions is randomly turned back on itself with minimized cavitation turbulence, therefore increasing maximized intimate contact. The predominately rounded outwardly projecting convex ends provide a relatively smooth return flow at both ends of the fluidized bed apparatus with minimal cavitation turbulence of the emissions. Turbulent flow with cavitation through a filter is known to impede and/or disrupt flow. Extended residence time in and through the fluidized bed apparatus is desired for optimized contaminate capture and removal from the emissions; however, extended residence time is not optimized if the flow is turbulent flow with cavitation. Various baffles and/or other application specific flow restriction obstacles can be incorporated into the housing of the fluidized bed apparatus.

In accordance with another aspect of the subject disclosure, an exemplary contaminate removal system is provided with reconfigurable segmental components. Each system component can be isolated, bypassed, incorporated, and/or reconfigured for application specific requirements. The exemplary emissions control system may further include one or more pre-filters and/or post-filters that contain a mass of reactive sorbent. The pre-filters and post-filters may be plumbed in parallel or series with the fluidized bed apparatus, depending upon applications specific requirements.

Emissions contaminates from industrial applications include: Hg (Mercury), As (Arsenic), Ba (Barium), Cd (Cadmium), Cr (Chromium), Cu (Copper), Pb (Lead), Sn (Tin), P (Phosphorous), $NO_2$ (Nitrogen Dioxide), $NO_3$ (Nitrate), $NH_3$ (Ammonia). The long list of contaminates precludes the ability to have a one-size-fits-all emissions control solution. Furthermore, emissions control solutions which may work for one contaminate in a gaseous emission might not be effective for the same contaminate in a non-gaseous emission, and vice versa.

International standards and regulations, Federal standards and regulations, State standards and regulations, as well as local standards and regulations all set various levels for allowable parts per million (PPM) of each contaminate in gaseous and/or non-gaseous emissions. Many of these standards and regulations set different allowable levels for contaminates depending upon whether the contaminate is resident in a gaseous emission compared to a non-gaseous emission.

Testing contaminated emissions can be spot checked and/or using continuous in-line monitoring equipment to determine types and levels of contaminates resident in the emissions. Based upon the testing results, specific pre-filters and/or post-filters can be selected for routing contaminated emissions. Each of the pre-filters and/or post-filters contain a specific mass of reactive sorbent as a broad-spectrum of treatment options targeting a specific contaminate resident in the emissions.

The types and/or levels of contaminates resident in emissions changes and/or fluctuates during emissions discharge. Frequent monitoring of contaminates and/or continuous in-line monitoring provides capability to adjust selections of specific pre-filters and/or post-filters to best correspond with the specific contaminates resident in the emissions at any given time during discharge flow.

The present disclosure provides a broad-spectrum matrix, which matches specific types of contaminates resident in gaseous and non-gaseous emissions with a specific reactive sorbent that is effective in the capture and removal of the corresponding contaminate. The matrix also matches the ability for a specific reactive sorbent to be separated from specific captured contaminates so that the contaminate can be either recycled or disposed, as well as whether the sorbent can be rejuvenated and re-used in the emissions control system.

In addition to permanently installed systems for application specific use, the subject system can be configured as a transportable system. Transportable system examples include, but are not limited to, truck mounted systems, barge mounted systems, trailer mounted systems, and rail-car systems. Transportable system applications are useful for providing a bypass to site-built systems by providing a temporary bypass for emissions so that permanent site-built system can be serviced, inspected, and/or repaired. Transportable systems are also useful to provide excess filter capabilities to permanent site-built installations during times when contaminated emissions flow rates exceed the capacity of the permanent site-built system.

There are also a number of advantages attendant to the specialized sorbent described herein in connection with the disclosed apparatus and methods. Generally, the carbon-based sorbent improves the capabilities of the disclosed emissions equipment to better capture, contain, and/or recycle mercury and other hazardous materials with an efficiency not previously possible using known emission control systems and methods. Another significant benefit of the carbon-based sorbent disclosed herein is that the carbon-based sorbent can be used to treat both gaseous and non-gaseous emissions, thus overcoming many of the shortcomings of known methods for treating contaminated non-gaseous emissions, including the secondary emissions generated from primary emissions control processes that are used to treat gaseous emissions. In addition, the carbon-based sorbent described herein provides improved capabilities to treat gaseous emissions effectively enough to prevent the need for the secondary treatment of non-gaseous emissions that are produced as a by-product of the primary gaseous emissions treatment process. The carbon-based sorbent disclosed herein is also beneficial because it is reusable. Through a rejuvenation process, the solvent in the sorbent treatment subsystem(s) separates (i.e., removes) the hazardous contaminants that chemically bind with the amalgam forming metal in the carbon-based sorbent, thus restoring the capacity of the carbon-based sorbent to remove contaminants from the gaseous and/or non-gaseous emissions.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Other advantages of the present invention will be readily appreciated, as the same becomes better understood by reference to the following detailed description when considered in connection with the accompanying drawings wherein:

FIG. 3 is a schematic diagram of the emissions control system shown in FIG. 2 where the emissions control system has been modified by adding an exemplary reverse venturi apparatus that is constructed in accordance with the subject disclosure;

FIG. 4B is a front cross-sectional view of the entry portion of the housing of the exemplary reverse venturi apparatus illustrated in FIG. 4A;

FIG. 4C is a front cross-sectional view of the enlarged portion of the housing of the exemplary reverse venturi apparatus illustrated in FIG. 4A;

FIG. 4D is a front cross-sectional view of the exit portion of the housing of the exemplary reverse venturi apparatus illustrated in FIG. 4A;

FIG. 5 is a side cross-sectional view of another exemplary reverse venturi apparatus constructed in accordance with the subject disclosure where a series of staggered baffles are disposed in the enlarged portion of the housing creating a serpentine shaped flow path for the emissions;

FIG. 6A is a side cross-sectional view of another exemplary reverse venturi apparatus constructed in accordance with the subject disclosure where an auger-shaped baffle is disposed in the enlarged portion of the housing creating a helically shaped flow path for the emissions;

FIG. 6B is a front perspective view of the auger-shaped baffle illustrated in the exemplary reverse venturi apparatus shown in FIG. 6A;

FIG. 19 is a block diagram illustrating a known method for removing contaminants from non-gaseous emissions that calls for depositing the non-gaseous emissions in a settling pond;

FIG. 27 is a matrix showing specific types of contaminates matched against the effectiveness of the disclosed CZTS Alloy sorbents compared to activated carbon and zeolite sorbents for gaseous and non-gaseous emissions;

FIG. 28 is a schematic diagram showing specific CZTS Alloy sorbents compared to other specific types of sorbents for gaseous and non-gaseous emissions;

FIG. 29 is a matrix showing prior art sorbents and their ability to separate from contaminates in gaseous and non-gaseous emissions and be reused;

FIG. 30 is a matrix showing the disclosed broad-spectrum CZTS Alloy sorbents and their ability to separate from contaminates in gaseous and non-gaseous emissions and be reused;

DETAILED DESCRIPTION

Figure 1:
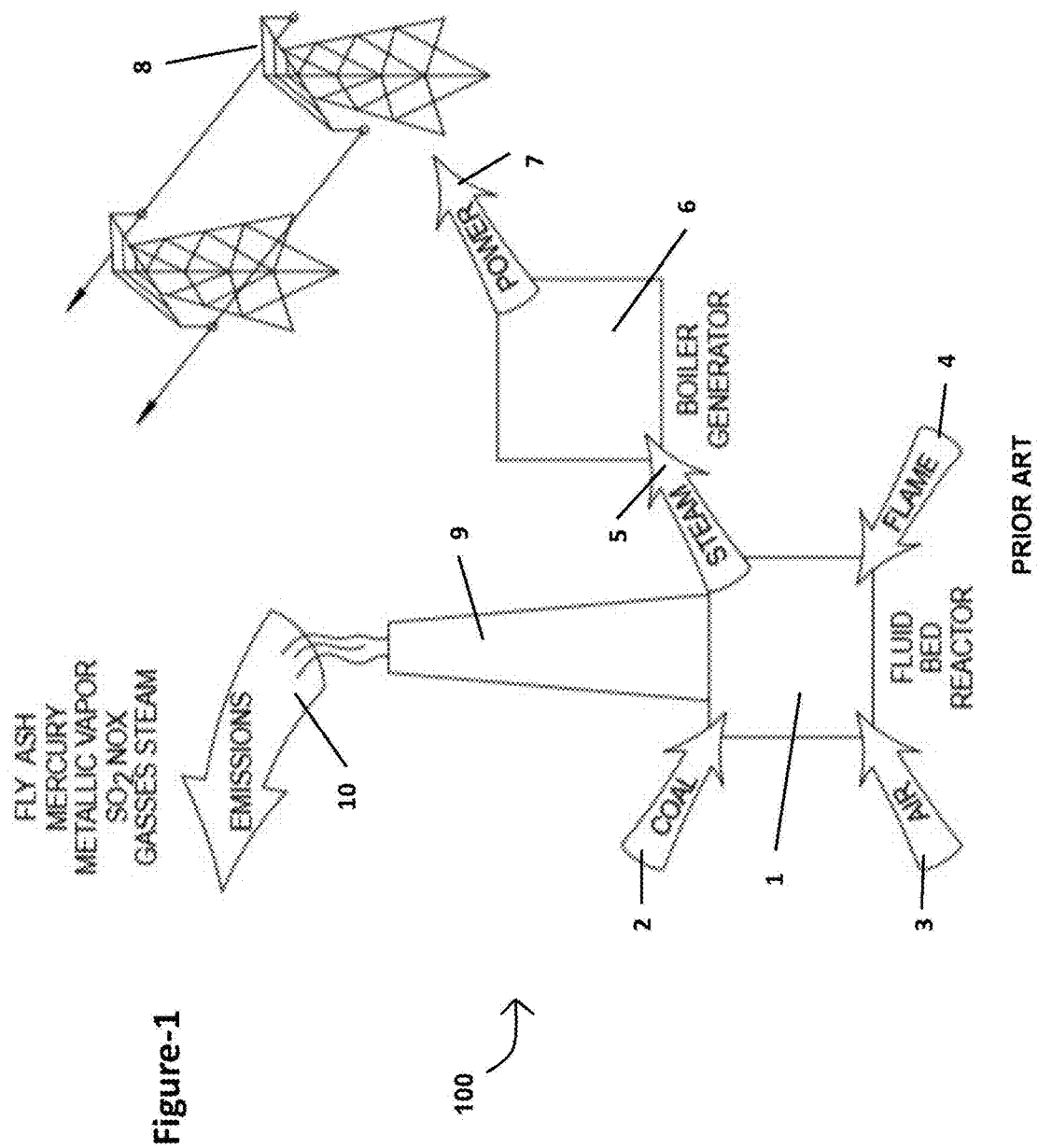
FIG. 1 is a schematic diagram illustrating a known layout for a coal burning power plant.

Referring to the Figures, wherein like numerals indicate corresponding parts throughout the several views, an apparatus and methods for removing contaminants from industrial emissions are illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "conduit", as used herein, is intended to cover all references to pipe as may be normally used in conveying liquid, and/or liquid-like emissions and gaseous and/or gaseous-like emissions. No preference is given or implied concerning the actual method of conveyance of emissions regardless of the type of emissions. The term "ambient temperature" as used herein refers to the temperature of the surrounding environment (e.g., standard temperature and pressure "STP"). Additionally, it should be understood that the terms "contaminate(s)" and "contaminant(s)" are used interchangeably in the present disclosure.

Referring to FIG. 1, a schematic diagram of a typical coal burning power plant 100 is shown. The coal burning power plant 100 includes an industrial facility fluid bed reactor 1 that burns one or more types of coal fuel 2 to produce electrical power 7. The electrical power 7 may then be distributed through power lines 8 to an electrical grid. Combustion within the fluid bed reactor 1 is driven by air 3, flame 4, and the coal fuel 2. The combustion process is used to heat water and produce steam 5. The steam is then used for turning a generator 6, which produces the electrical power 7. Gaseous emissions 10 from the combustion process are released into the environment through stack 9. When the coal burning power plant 100 is not equipped with any emissions control systems (FIG. 1), the emissions 10 include many hazardous contaminants such as fly ash, mercury (Hg), metallic vapors, sulfur dioxide ($SO_2$), hydrogen chloride (HCl), and other noxious fumes.

Figure 2:
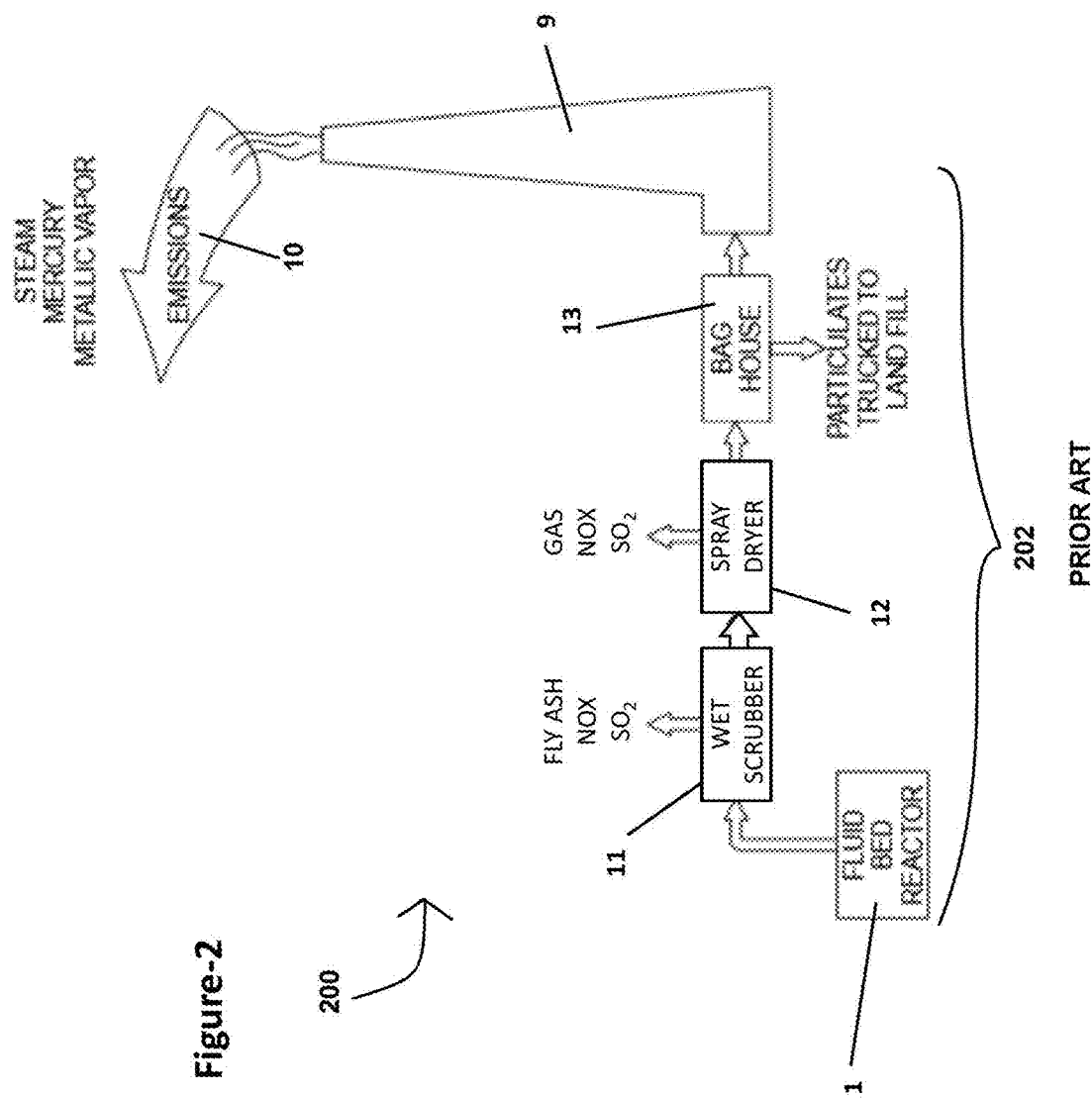
FIG. 2 is a schematic diagram illustrating a known layout for an emissions control system used to remove contaminants from emissions produced by coal burning power plants of the type shown in FIG. 1.

Referring to FIG. 2, a schematic of an updated coal burning power plant 200 is shown, which includes a typical emissions control system 202. The emission control system 202 helps to capture and collect some of the hazardous contaminants in the gaseous emissions 10. The emissions control system 202 conveys the gaseous emissions 10 from a fluid bed reactor 1 where combustion occurs into a wet or dry scrubber 11 that removes some of the sulfur dioxide and fly ash contaminants from the gaseous emissions 10. Alternatively or in addition to the conveying the gaseous emissions 10 to the wet or dry scrubber 11, the emissions control system 202 may convey the gaseous emissions 10 into a spray dryer 12 where some sulfur dioxide, noxious fumes, and other contaminants are captured and collected. The emissions may also be routed through a fabric filter unit 13 (i.e. a bag house), which uses filter bags to remove particulates from the flow of gaseous emissions 10. This system collects and removes many contaminants from the gaseous emissions 10 before the gaseous emissions 10 are released into the surrounding atmosphere (i.e. the environment) through the stack 9. The problem with the typical emissions control system 202 illustrated in FIG. 2 is that the nano-sized contaminants, such as mercury, which is contained in metallic vapor emissions, easily passes through the wet or dry scrubber 11, spray dryer 12, and the fabric filter unit 13 of the emissions control system 202.

With reference to FIG. 3, a schematic of a modified coal burning power plant 300 is shown, which includes a sorbent injector 14 and a reverse venturi apparatus 15 in addition to the emissions control system 202 shown in FIG. 2. The sorbent injector 14 operates to add a sorbent into the gaseous emissions 10 and may optionally be disposed upstream of the reverse venturi apparatus 15. More particularly, in the example shown in FIG. 3, the sorbent injector is positioned between the spray dryer 12 and the fabric filter unit 13. Although alternative locations for the reverse venturi apparatus 15 are possible, in FIG. 3, the reverse venturi apparatus is positioned between the fabric filter unit 13 and the stack 9. One primary advantage of this location is that an existing facility would be able to install the reverse venturi apparatus 15 and simply apply for a "Modification to Existing Permit", saving both time and money compared to applying for a new permit for an entirely new emissions control system. In operation, the gaseous emissions 10 are routed from the fabric filter unit 13 and to the reverse venturi apparatus 15. As will be explained in greater detail below, the reverse venturi apparatus 15 is constructed with internal features that are suitable for collecting and capturing significant amounts of mercury, heavy metals, nano-sized particles, and other contaminants. Therefore, the resulting gaseous emissions 10 exiting the stack 9 are virtually stripped clean of all hazardous contaminants.

With reference to FIGS. 4A-D, the reverse venturi apparatus 15 includes a housing 16 that is shaped as a reverse venturi. It should be appreciated that a venturi may generally be described as a conduit that first narrows from a larger cross-section down to a smaller cross-section and then expands from the smaller cross-section back to a larger cross-section. Therefore, the term "reverse venturi", as used herein, describes the opposite—a conduit that first expands from a smaller cross-section to a larger cross-section and then narrows back down from the larger cross-section to a smaller cross-section. Specifically, the housing 16 of the disclosed reverse venturi apparatus 15 extends along a central axis 17 and has an entry portion 18, an enlarged portion 19, and an exit portion 20. The entry portion 18 of the housing 16 is sized to receive the gaseous emissions 10 at a pre-determined entry flow rate, which is characterized by an entry velocity $V_1$ and pressure $P_1$. The exit portion 20 of the housing 16 is sized to expel the gaseous emissions 10 at a pre-determined exit flow rate, which is characterized by an exit $V_3$ and pressure $P_3$. The enlarged portion 19 is disposed between the entry portion 18 and the exit portion 20 of the housing 16 and defines an enlarged chamber 21 therein for trapping the contaminants in the gaseous emissions 10. The enlarged portion 19 of the housing 16 has an interior surface 68 that generally faces the central axis 17. The entry portion 18, the enlarged portion 19, and the exit portion 20 of the housing 16 are arranged sequentially along the central axis 17 such that the entry portion 18, the enlarged portion 19, and the exit portion 20 of the housing 16 are in fluid communication with each other. In other words, the entry portion 18, the enlarged portion 19, and the exit portion 20 of the housing 16 cooperate to form a conduit extending along the central axis 17.

The entry portion 18 of the housing 16 has an entry portion cross-sectional area $A_1$ that is transverse to the central axis 17 and the exit portion 20 of the housing 16 has an exit portion cross-sectional area $A_3$ that is transverse to the central axis 17. The entry portion cross-sectional area $A_1$ may equal (i.e. may be the same as) the exit portion cross-sectional area $A_3$ such that the pre-determined entry flow rate equals (i.e. is the same as) the pre-determined exit portion flow rate. Alternatively, the entry portion cross-sectional area $A_1$ may be different (i.e. may be larger or smaller) than the exit portion cross-section area $A_3$ such that the pre-determined entry flow rate is different than (i.e. is less than or is greater than) the pre-determined exit flow rate. It should be appreciated that the term "flow rate", as used herein, refers to a volumetric flow rate of the emissions.

The enlarged portion 19 of the housing 16 has an enlarged portion cross-sectional area $A_2$ that is transverse to the central axis 17 and that is larger than the entry portion cross-sectional area $A_1$ and the exit portion cross-sectional area $A_3$. Accordingly, the enlarged portion 19 is sized such that a flow velocity $V_2$ of the gaseous emissions 10 within the enlarged portion 19 of the housing 16 is less than the flow velocity $V_1$ of the gaseous emissions 10 in the entry portion 18 of the housing 16 and is less than the flow velocity $V_3$ of the gaseous emissions 10 in the exit portion 20 of the housing 16. This decreased flow velocity in turn increases a dwell time of the gaseous emissions 10 within the enlarged portion 19 of the housing 16. It should be appreciated that the term "dwell time", as used herein, refers to the average amount of time required for a molecule in the gaseous emissions 10 to travel through the enlarged portion 19 of the housing 16. In other words, the "dwell time" of the enlarged portion 19 of the housing 16 equals the amount of time it takes for all of the emissions in the enlarged chamber 21 to be renewed. It should also be appreciated that the term "cross-sectional area", as used herein, refers to the internal cross-sectional area (i.e. the space inside the housing 16), which remains the same irrespective of changes to a thickness of the housing 16. Therefore, the enlarged portion cross-sectional area $A_2$ reflects the size of the enlarged chamber 21 and is bounded by the interior surface 68.

Due to the geometry of the housing 16, the internal pressure $P_1$ of the gaseous emissions 10 passing through the entry portion 18 of the housing 16 and the internal pressure $P_3$ of the gaseous emissions 10 passing through the exit portion 20 of the housing 16 are greater than an internal pressure $P_2$ of the gaseous emissions 10 passing through the enlarged portion 19 of the housing 16. This pressure differential in combination with the fact that the flow velocity $V_2$ of the gaseous emissions 10 within the enlarged portion 19 of the housing 16 is less than the flow velocity $V_1$ of the gaseous emissions 10 in the entry portion 18 of the housing 16 and is less than the flow velocity $V_3$ of the gaseous emissions 10 in the exit portion 20 of the housing 16 causes the gaseous emissions 10 to dwell in the enlarged portion 19 of the housing 16. As a result of the pressure and velocity differentials noted above and because the gaseous emissions 10 will naturally expand to occupy the entire volume of the enlarged chamber 21, an expansion force is thus imparted on the gaseous emissions 10 in the enlarged portion 19 of the housing 16. This in combination with the effects of laminar flow, pneumatic dynamics, and gas behavior physics, the resultant increase in dwell time improves the ability of the reverse venturi apparatus 15 to efficiently capture and thereby remove contaminants from the gaseous emissions 10.

The housing 16 may have a variety of different shapes and configurations. For example and without limitation, the entry portion 18, the enlarged portion 19, and the exit portion 20 of the housing 16 illustrated in FIGS. 4A-D all have circular shaped cross-sectional areas $A_1$, $A_2$, $A_3$. Alternatively, the cross-sectional areas $A_1$, $A_2$, $A_3$ of one or more of the entry portion 18, the enlarged portion 19, and the exit portion 20 of the housing 16 may have a non-circular shape, where various combinations of circular and non-circular shaped cross-sectional areas are possible and are considered to be within the scope of the subject disclosure. In some configurations, the enlarged portion 19 of the housing 16 may have a divergent end 22 and a convergent end 23. In accordance with these configurations, the enlarged portion 19 of the housing 16 gradually tapers outwardly from the entry portion cross-sectional area $A_1$ to the enlarged portion cross-sectional area $A_2$ at the divergent end 22. In other words, the cross-section of the enlarged portion 19 of the housing 16 increases at the divergent end 22 moving in a direction away from the entry portion 18 of the housing 16. By contrast, the enlarged portion 19 of the housing 16 gradually tapers inwardly from the enlarged portion cross-sectional area $A_2$ to the exit portion cross-sectional area $A_3$ at the convergent end 23. In other words, the cross-section of the enlarged portion 19 of the housing 16 decreases at the convergent end 23 moving in a direction towards the exit portion 20 of the housing 16. Therefore, it should be appreciated that the gaseous emissions 10 in the enlarged portion 19 of the housing 16 generally flow from the divergent end 22 to the convergent end 23. In embodiments where the entry portion 18, the enlarged portion 19, and the exit portion 20 of the housing 16 all have circular shaped cross-sectional areas $A_1$, $A_2$, $A_3$, the divergent and convergent ends 22, 23 of the housing 16 may generally have a conical shape. Notwithstanding, alternative shapes for the divergent and convergent ends 22, 23 of the enlarged portion 19 of the housing 16 are possible. By way of example and without limitation, the divergent and convergent ends 22, 23 may have a polygonal shape for improved manufacture ease while avoiding any significant detrimental effects to the flow of the gaseous emissions 10 through the housing 16 of the reverse venturi apparatus 15. In another alternative configuration, the enlarged portion 19 of the housing 16 may have a shape resembling a sausage with relatively abrupt transitions between the entry portion 18 and the divergent end 22 and the convergent end 23 and the exit portion 20. It is presumed that a smooth transition is preferred to an abrupt transition because laminar flow behavior of the gaseous emissions 10 may be preferred. However, minor disturbances to the laminar flow of the gaseous emissions 10 at abrupt transitions are not perceived to be an overwhelming penalty, but rather may provide enhanced flow in areas where increased dwell time is not necessary.

With continued reference to FIGS. 4A-D and with additional reference to FIGS. 5-11, a mass of reactive material 24 is disposed within the enlarged portion 19 of the housing 16. The mass of reactive material 24 has a reactive outer surface 25 that is disposed in contact with the gaseous emissions 10. In addition, the mass of reactive material 24 contains an amalgam forming metal at the reactive outer surface 25 that chemically binds at least some of the contaminants in the gaseous emissions 10 that are passing through the enlarged portion 19 of the housing 16 to the reactive outer surface 25 of the mass of reactive material 24. In this way, the contaminants bound to the reactive outer surface 25 of the mass of reactive material 24 remain trapped in the enlarged portion 19 of the housing 16 and are thus removed from the flow of the gaseous emissions 10 exiting the enlarged portion 19 of the housing 16 and entering the exit portion 20 of the housing 16. It should be appreciated that the term "amalgam forming metal", as used herein, describes a material, selected from a group of metals, that is capable of forming a compound with one or more of the contaminants in the gaseous emissions 10. By way of non-limiting example, the amalgam forming metal may be zinc and the contaminant in the gaseous emissions 10 may be mercury such that an amalgam of zinc and mercury is formed when the gaseous emissions 10 come into contact with the reactive outer surface 25 of the mass of reactive material 24.

It should be appreciated that the enlarged portion 19 of the housing 16 must be sized to accommodate the pre-determined entry flow rate of the gaseous emissions 10 while providing a long enough dwell time to enable the amalgam forming metal in the mass of reactive material 24 to chemically bind with the contaminants in the gaseous emissions 10. Accordingly, to achieve this balance, the enlarged portion cross-sectional area $A_2$ may range from 3 square feet to 330 square feet in order to achieve a dwell time ranging from 1 second to 2.5 seconds. The specified dwell time is necessary to allow sufficient time for the contaminants in the gaseous emissions 10 to chemically bind to the amalgam forming metal in the mass of reactive material 24. Thus, the range for the enlarged portion cross-sectional area $A_2$ was calculated to achieve this residence time for coal burning power plants 100 with outputs ranging from 1 Mega Watt (MW) to 6,000 Mega Watts (MW). As is known in the chemical arts, the amalgam forming metal may be a variety of different materials. By way of non-limiting example, the amalgam forming metal may be selected from a group consisting of zinc, iron, and aluminum. It should also be appreciated that the housing 16 is made from a material that is different from the mass of reactive material 24. By way of non-limiting example, the housing 16 may be made from steel, plastic, or fiberglass.

Figure 4A:
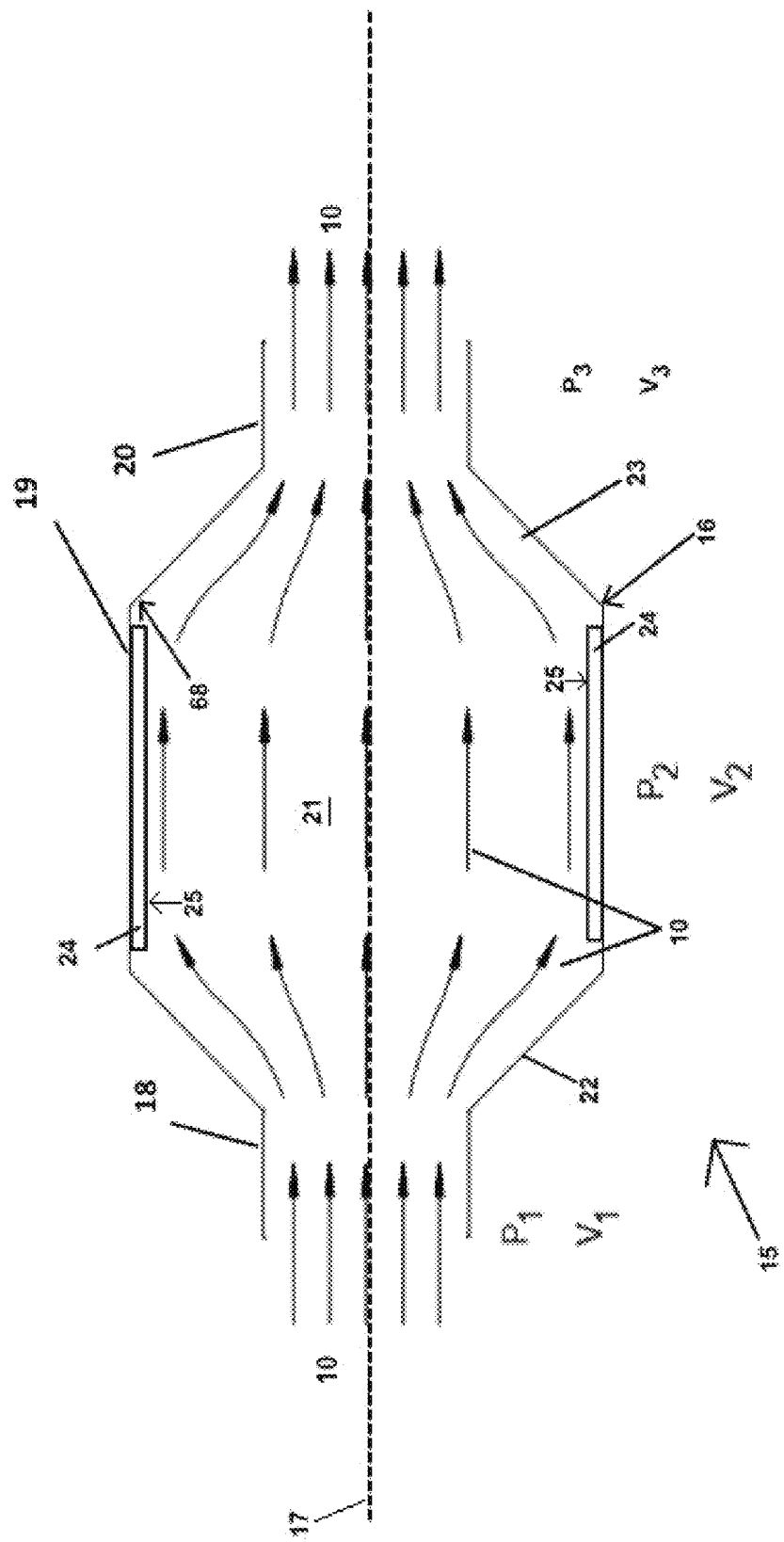
FIG. 4A is a side cross-sectional view of an exemplary reverse venturi apparatus constructed in accordance with the subject disclosure, which includes a housing having an entry portion, an enlarged portion, and an exit portion.

The mass of reactive material 24 may be provided in a variety of different, non-limiting configurations. With reference to FIG. 4A, the mass of reactive material 24 is shown coating the interior surface 68 of the housing 16. Alternatively, with reference to FIGS. 5-11, the mass of reactive material 24 may form one or more obstruction elements 26a-j that are disposed within the enlarged portion 19 of the housing 16. As such, the obstruction element(s) 26a-j create a tortuous flow path 27 for the gaseous emissions 10 passing through the enlarged portion 19 of the housing 16. Accordingly, the obstruction element(s) 26a-j increase the dwell time for the gaseous emissions 10 passing through the enlarged portion 19 of the housing 16. Several of the embodiments discussed below break up the flow of the gaseous emissions 10 passing through the enlarged portion 19 of the housing 16 so completely that the tortuous flow path 27 created is completely random, which greatly enhances the opportunity for chemical reactions between the contaminants in the gaseous emissions 10 and the amalgam forming metal in the mass of reactive material 24.

The obstruction element(s) 26a-j in each of the configurations shown in FIGS. 5-11 present a large surface area, such that the reactive outer surface 25 of the mass of reactive material 24 is large. This is advantageous because chemical reactions between the amalgam forming metal in the reactive outer surface 25 of the mass of reactive material 24 and contaminants in the gaseous emissions 10 allow the enlarged portion 19 of the housing 16 to trap, capture, and/or collect the contaminants, thereby removing/eliminating them from the gaseous emissions 10. Accordingly, the amount of contaminants that the enlarged portion 19 of the housing 16 can remove from the gaseous emissions 10 passing through the enlarged chamber 21 is proportional to the size of the reactive outer surface 25 of the mass of reactive material 24 in the enlarged portion 19 of the housing 16. In addition, the complex surface shapes and/or texture of the obstruction(s) 26a-j can provide additional surface area to facilitate the physical capture of contaminants whether the capture is the result of a chemical reaction between the contaminants and the amalgam forming metal or not.

Referring again to FIG. 3, the sorbent that is added to the emissions by the sorbent injector 14 contains the amalgam forming metal. As such, the amalgam forming metal in the sorbent chemically binds with at least some of the contaminants in the gaseous emissions 10 before the gaseous emissions 10 enter the enlarged portion 19 of the housing 16. Although the sorbent may have a number of different compositions, the sorbent may be, for example, a zinc (Zn) powder or a copper, zinc, tin, sulfur (CZTS) compound. Because the sorbent chemically binds with at least some of the contaminants in the gaseous emissions 10 before the gaseous emissions 10 enter the enlarged portion 19 of the housing 16, the sorbent helps the mass of reactive material 24 remove the contaminants from the gaseous emissions 10.

With reference to FIG. 5, the obstruction elements 26a-j are provided in the form of a series of staggered baffles 26a that extend from the interior surface 68 of the enlarged portion 19 of the housing 16. The series of staggered baffles 26a are transverse to the central axis 17 and give the tortuous flow path 27 a serpentine shape. The serpentine shape of the tortuous flow path 27 increases the dwell time of the gaseous emissions 10 in the enlarged portion 19 of the housing 16, which in turn improves the capture and removal of the contaminants in the gaseous emissions 10 by the mass of reactive material 24 forming the series of staggered baffles 26a. In one variation, the series of staggered baffles 26a are made of zinc. In another variation, the series of staggered baffles 26a are made of a non-zinc material that is zinc coated. It should be appreciated that the placement of the staggered baffles 26a need not be equally or symmetrically oriented along a length of the central axis 17 because some applications may benefit from larger spaces between adjacent baffles 26a while other applications may benefit from smaller spaces between adjacent baffles 26a. It should also be appreciated that the series of staggered baffles 26a can be replaced and/or cleaned as necessary if they become saturated during operation of the reverse venturi apparatus 15.

With reference to FIGS. 6A-B, the at least one obstruction element 26a-j is alternatively in the form of an auger-shaped baffle 26b. The auger-shaped baffle 26b extends helically within the enlarged portion 19 of the housing 16 along and about the central axis 17. Accordingly, the auger-shaped baffle 26b gives the tortuous flow path 27 a spiraling shape. The spiraling shape of the tortuous flow path 27 increases the dwell time of the gaseous emissions 10 in the enlarged portion 19 of the housing 16, which in turn improves the capture and removal of the contaminants from the gaseous emissions 10 by the mass of reactive material 24 forming the auger-shaped baffle 26b. In one variation, the auger-shaped baffle 26b is made of zinc. In another variation, the auger-shaped baffle 26b is made of a non-zinc material that is zinc coated. In yet another variation, the auger-shaped baffle 26b is mechanically driven such that the auger-shaped baffle 26b rotates within the enlarged portion 19 of the housing 16 about the central axis 17. Rotation of the auger-shaped baffle 26b can either artificially accelerate or artificially slow the flow of the gaseous emissions 10 through the enlarged portion 19 of the housing 16, depending upon which direction the auger-shaped baffle rotates. It should be appreciated that the auger-shaped baffle 26b can be replaced and/or cleaned as necessary if the auger-shaped baffle 26b becomes saturated during operation of the reverse venturi apparatus 15.

Figure 7A:
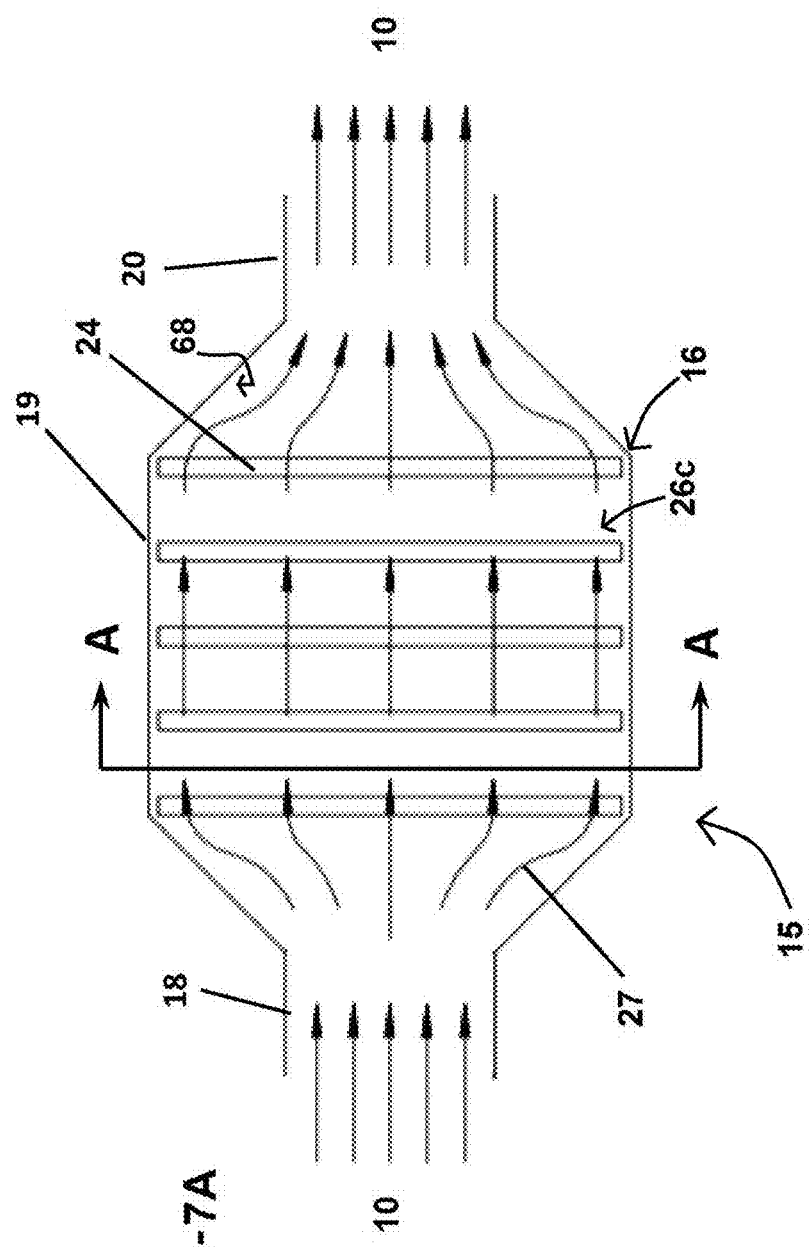
FIG. 7A is a side cross-sectional view of another exemplary reverse venturi apparatus constructed in accordance with the subject disclosure where a plurality of spaced apart baffles are disposed in the enlarged portion of the housing.
Figure 7B:
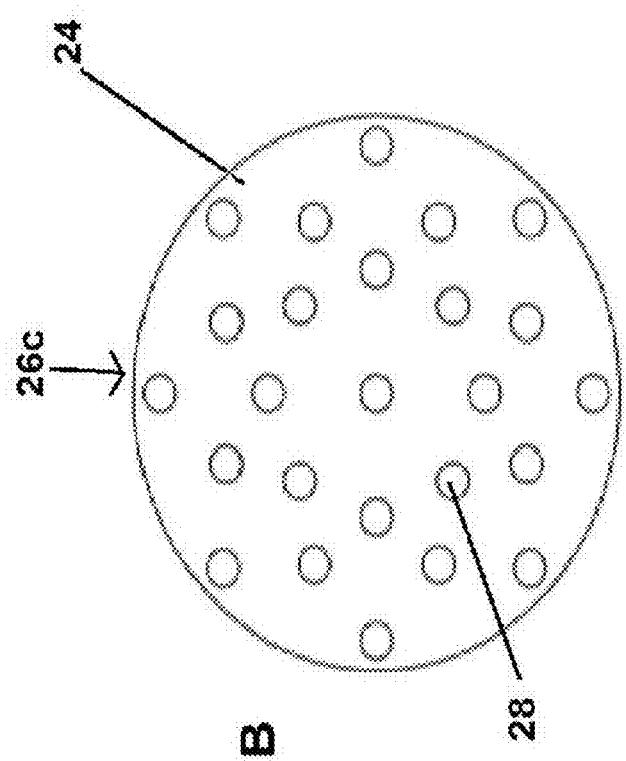
FIG. 7B is a front cross-sectional view of the exemplary reverse venturi apparatus illustrated in FIG. 7A taken along section line A-A where orifices in one of the baffles are shown.

With reference to FIGS. 7A-B, the at least one obstruction element 26a-j is a plurality of baffles 26c. Each baffle 26c extends transversely across the enlarged portion 19 of the housing 16 from the interior surface 68 of the enlarged portion 19 of the housing 16. The baffles 26c are spaced apart from one another along the central axis 17 and each baffle 26c includes orifices 28 that permit the flow of the gaseous emissions 10 through the baffles 26c. Of course it should be appreciated that any number of baffles 26c are possible, including a configuration containing only a single baffle 26c. It should also be appreciated that the size, shape, and number of orifices 28 in each baffle 26c may vary. For example, the baffles 26c may be provided in the form of a screen, where the orifices 28 are formed between the crossing wires of the screen. The orifices 28 in the baffles 26c restrict the flow of the gaseous emissions 10 in the enlarged portion 19 of the housing 16 and thus increase the dwell time of the gaseous emissions 10 in the enlarged portion 19 of the housing 16. This improves the capture and removal of the contaminants from the gaseous emissions 10 by the mass of reactive material 24 forming the baffles 26c. In one variation, the baffles 26c are made of zinc. Another variation, the baffles 26c are made of a non-zinc material that is zinc coated. It should be appreciated that the baffles 26c can be replaced and/or cleaned as necessary if they become saturated during operation of the reverse venturi apparatus 15. In yet another variation, the size(s) of the orifices 28 in one of the baffles 26c is different than the size(s) of the orifices 28 in an adjacent one of the baffles 26c. By using different sizes of orifices 28 in different baffles 26c, the flow of gaseous emissions 10 can be accelerated and/or restricted to improve the capture and removal of the contaminants in the gaseous emissions 10 by the mass of reactive material in the baffles 26c. In a similar way, the baffles 26c need not be equally spaced apart in the enlarged chamber 21, nor do the orifices 28 in one of the baffles 26c need to be the same size, shape, or in the same location as the orifices 28 in an adjacent baffle 26c. By taking advantage of different sizes, shapes, and locations of the orifices 28 from one of the baffles 26c to another and by taking advantage of different spacing of the baffles 26c, the dwell time of the gaseous emissions 10 in the enlarged portion 19 of the housing 16 can be increased so as to promote increased contact with the physical and chemical capture and collection sites along the mass of reactive material 24.

In other alternative configurations shown in FIGS. 8-11, the at least one obstruction element 26a-j may not be fixed to the housing 16 itself, but instead may be freely positioned inside the enlarged portion 19 of the housing 16. In such configurations, the at least one obstruction element 26a-j may include various forms of obstruction media 26d-j. Like obstruction elements 26a-c, the obstruction media 26d-j is capable of being made from zinc or from a non-zinc material that is zinc coated. Zinc is easily melted allowing complex shapes to be cast using normal molding methods, lost wax investment processes, centrifugal processes, and the like. Other construction methods will readily include machining, extrusion, sintering, stamping, hot forging and forming, laser cutting, and the like. Alternatively, steel may be used to create an underlying shape, which is then subsequently coated or plated in zinc as a surface cover. The obstruction media 26d-j can be used to completely fill the entire enlarged chamber 21, partially fill the enlarged chamber 21, or fill in between the baffles 26c previously described in connection with FIGS. 7A-B.

Figure 8:
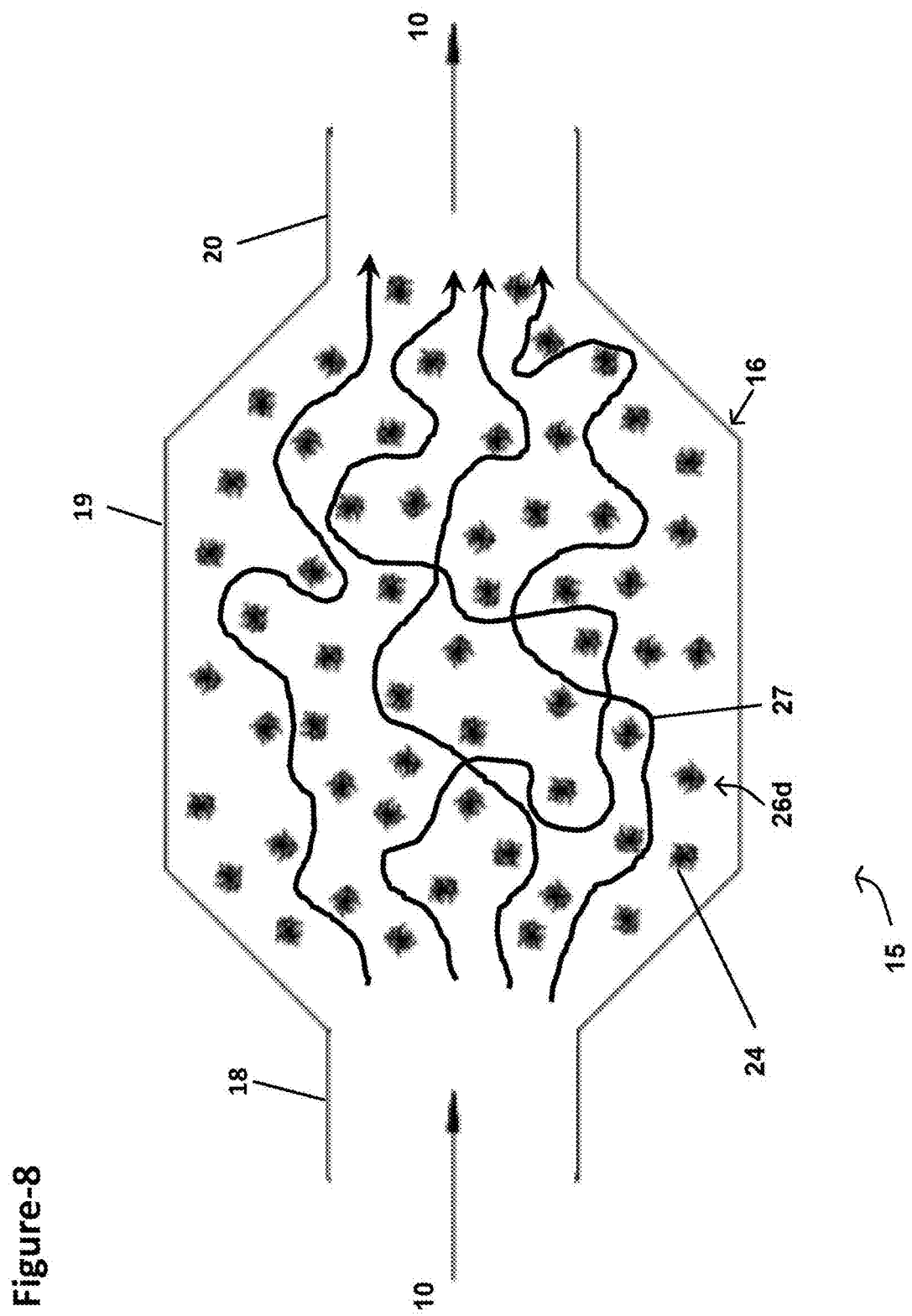
FIG. 8 is a side cross-sectional view of another exemplary reverse venturi apparatus constructed in accordance with the subject disclosure where a plurality of fragments are disposed in the enlarged portion of the housing.

FIG. 8 illustrates a configuration where the at least one obstruction element 26a-j is a plurality of fragments 26d that are contained in the enlarged portion 19 of the housing 16. In accordance with this configuration, the gaseous emissions 10 pass through the spaces between adjacent fragments 26d as the gaseous emissions 10 travel through the enlarged portion 19 of the housing 16 from the entry portion 18 to the exit portion 20 of the housing 16. To this end, the plurality of fragments 26d may be provided with an irregular shape such that the fragments 26d loosely pack with each other in the enlarged portion 19 of the housing 16. In one non-limiting example, the plurality of fragments 26d may be made of mossy zinc. Mossy zinc is popcorn shaped zinc construction that is produced by dipping molten zinc into a cooling liquid such as water. The resulting drip of molten zinc solidifies into a relatively small spheroidal structure with extremely high surface area to volume ratios. In addition, the surface area of the resultant structure has a moss-like surface texture. These structures can be produced in a range of sizes for application specific uses. Some steel processes can produce steel versions of complex spheroidal structures similar to mossy zinc, which may be zinc coated.

The loose pack nature of the plurality of fragments 26d in FIG. 8 gives the tortuous flow path 27 a random shape, which increases the dwell time of the gaseous emissions 10 in the enlarged portion 19 of the housing 16. This in turn improves the capture and removal of the contaminants from the gaseous emissions 10 by the mass of reactive material 24 forming the plurality of fragments 26d. The plurality of fragments 26d in FIG. 8 can be replaced and/or cleaned as necessary if they become saturated during the operation of the reverse venturi apparatus 15.

Figure 9:
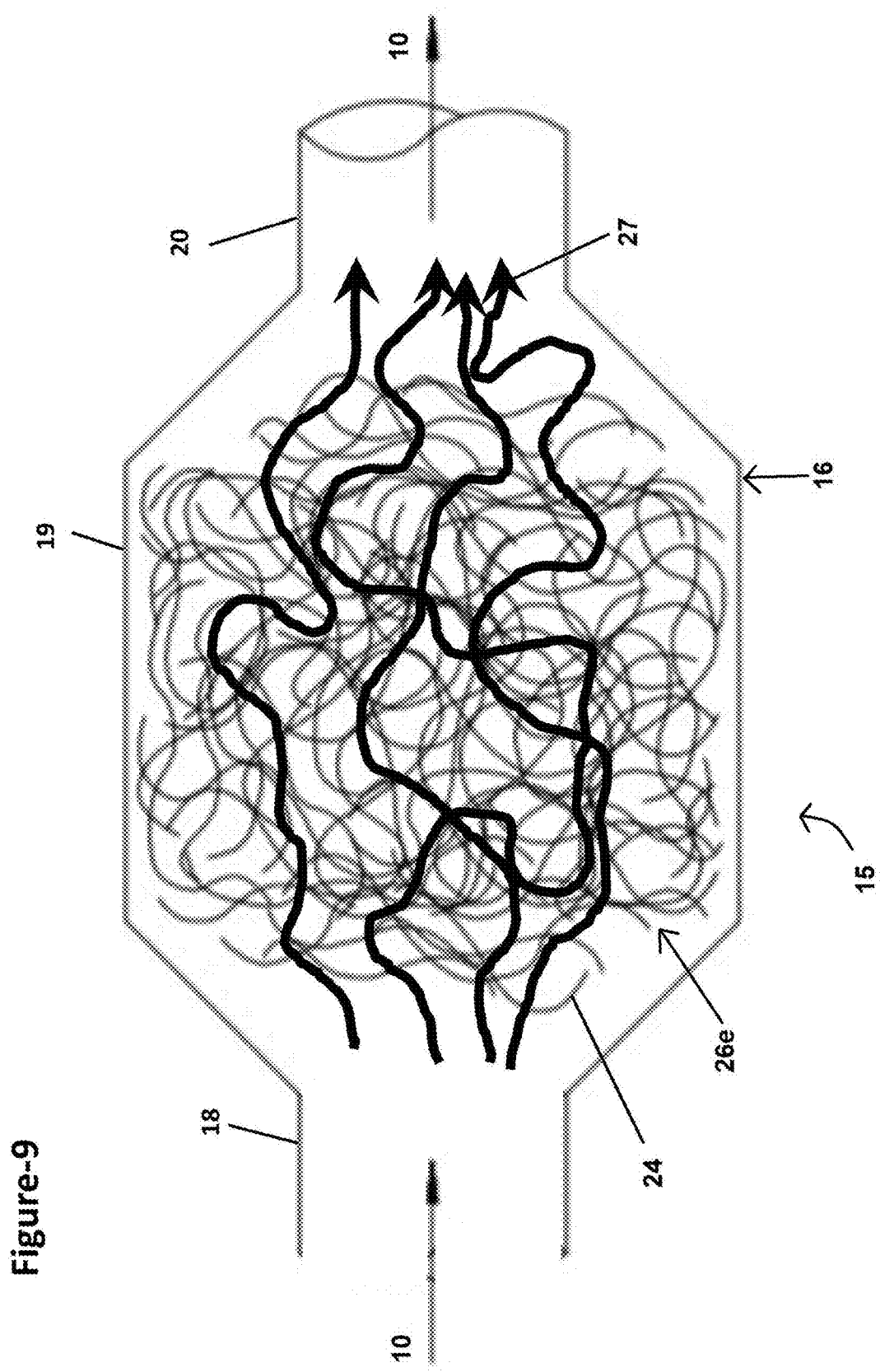
FIG. 9 is a side cross-sectional view of another exemplary reverse venturi apparatus constructed in accordance with the subject disclosure where a plurality of entangled strands are disposed in the enlarged portion of the housing forming a wool-like material therein.

In another alternative configuration shown in FIG. 9, the at least one obstruction element 26a-j is a plurality of entangled strands 26e that are disposed in the enlarged portion 19 of the housing 16. The plurality of entangled strands 26e thus form a wool-like material in the enlarged portion 19 of the housing 16. In accordance with one possible configuration, the plurality of entangled strands 26e are folded and crumpled like steel wool to form a mass with a very large surface area. The entangled strands 26e themselves may be of the same composition, thickness, and length or alternatively may be a mixture of different compositions, thicknesses, and/or lengths. In one variation, the plurality of entangled strands 26e are made from zinc wire and are randomly entangled to form a zinc wool. The zinc wool can be produced with varying levels of density and/or sizes of wire so as to provide specific flow restriction capabilities. In another variation, the plurality of entangled strands 26e are made from steel wire and are randomly entangled to form a steel wool. The steel wool may be zinc coated. The relatively loose packed nature of the plurality of entangled strands 26e in FIG. 9 gives the tortuous flow path 27 a random shape, which increases the dwell time of the gaseous emissions 10 passing through the enlarged portion 19 of the housing 16. This in turn improves the capture and removal of the contaminants in the gaseous emissions 10 by the mass of reactive material 24 forming the plurality of entangled strands 26e. It should be appreciated that the plurality of entangled strands 26e can be replaced and/or cleaned as necessary if they become saturated during operation of the reverse venturi apparatus 15.

Figure 10:
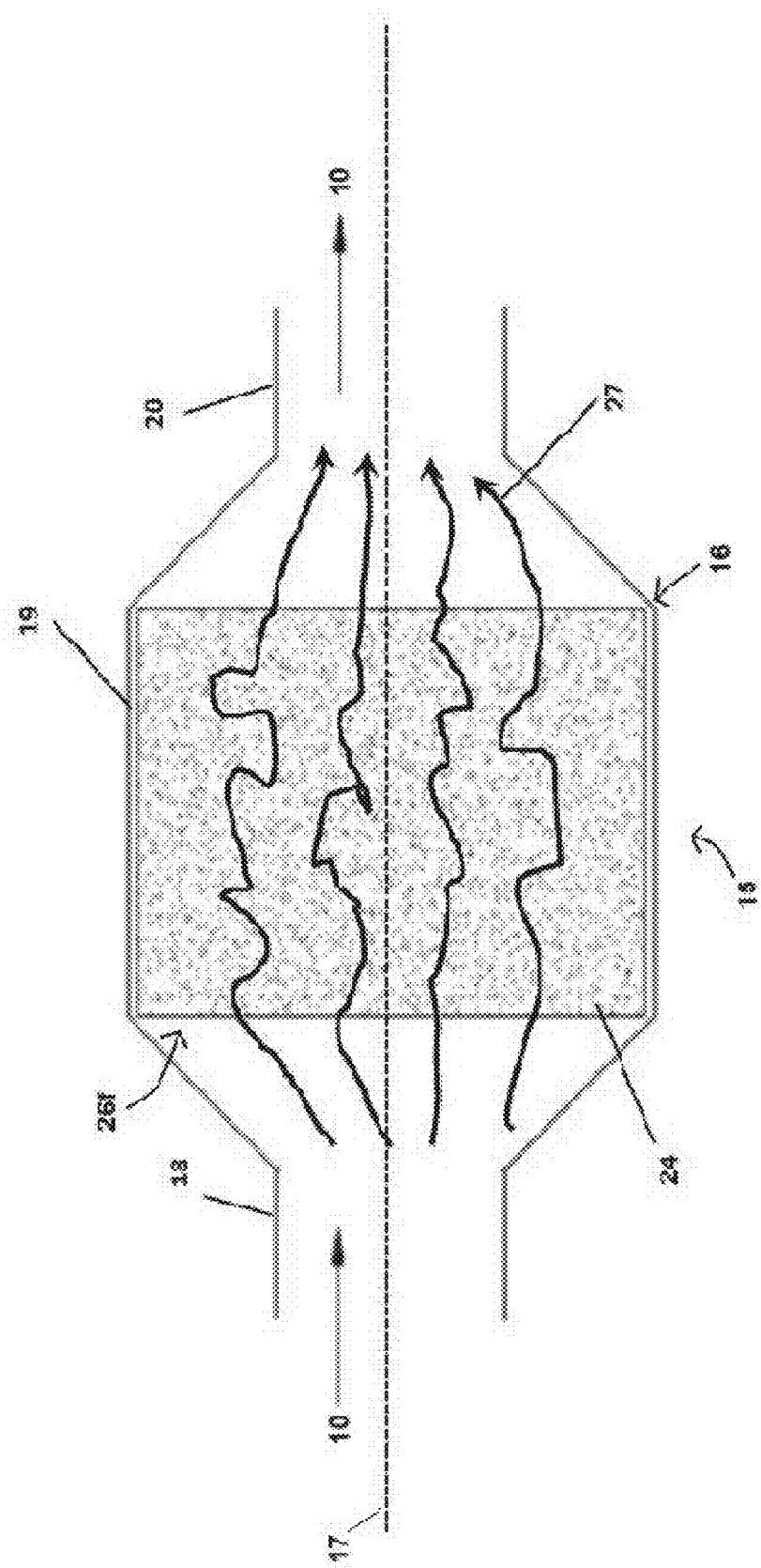
FIG. 10 is a side cross-sectional view of another exemplary reverse venturi apparatus constructed in accordance with the subject disclosure where a filter element is disposed in the enlarged portion of the housing.

With reference to FIG. 10, another alternative configuration is illustrated where the at least one obstruction element 26a-j is a filter element 26f. The filter element 26f extends transversely across the enlarged portion 19 of the housing 16 relative to the central axis 17. The filter element 26f is porous such that the pores in the filter element 26f allow the gaseous emissions 10 to pass through the filter element 26f as the gaseous emissions 10 flow through the enlarged portion 19 of the housing 16 from the entry portion 18 to the exit portion 20 of the housing 16. The arrangement of the filter element 26f which may be made of a sintered metal, gives the tortuous flow path 27 a random shape, which increases the dwell time of the gaseous emissions 10 passing through the enlarged portion 19 of the housing 16. This in turn improves the capture and removal of the contaminants in the gaseous emissions 10 by the mass of reactive material 24 forming the filter element 26f. The sintered metal of the filter element 26f is preferably made of zinc or a non-zinc material that is zinc coated. It should be appreciated that the filter element 26f can be replaced and/or cleaned as necessary if it becomes saturated during operation of the reverse venturi apparatus 15.

Figure 11:
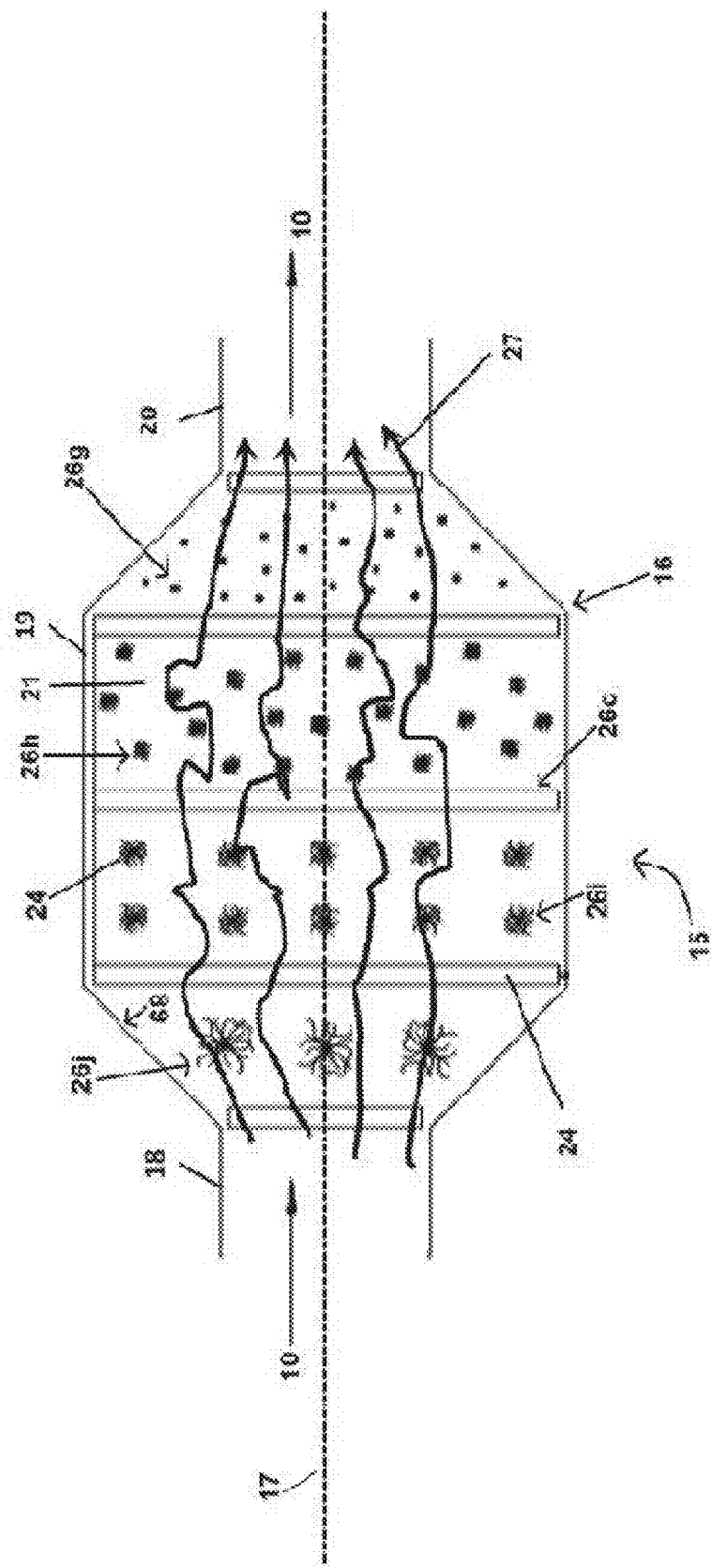
FIG. 11 is a side cross-sectional view of another exemplary reverse venturi apparatus constructed in accordance with the subject disclosure where the enlarged portion of the housing contains a plurality of baffles and a plurality of fragments of varying sizes that are disposed in between adjacent baffles.
Figure 12A:
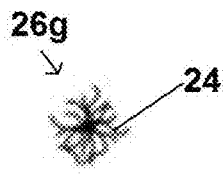
FIG. 12A is a front elevation view showing one exemplary size of the fragments contained in the enlarged portion of the housing of the exemplary reverse venturi apparatus illustrated in FIG. 11.
Figure 12B:
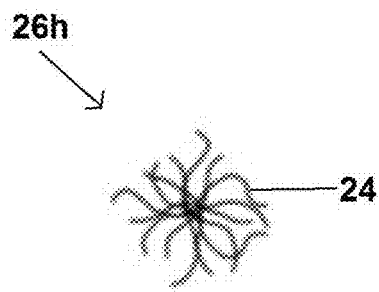
FIG. 12B is a front elevation view showing another exemplary size of the fragments contained in the enlarged portion of the housing of the exemplary reverse venturi apparatus illustrated in FIG. 11.
Figure 12C:
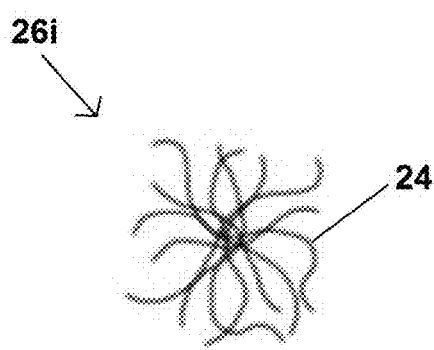
FIG. 12C is a front elevation view showing another exemplary size of the fragments contained in the enlarged portion of the housing of the exemplary reverse venturi apparatus illustrated in FIG. 11.
Figure 12D:
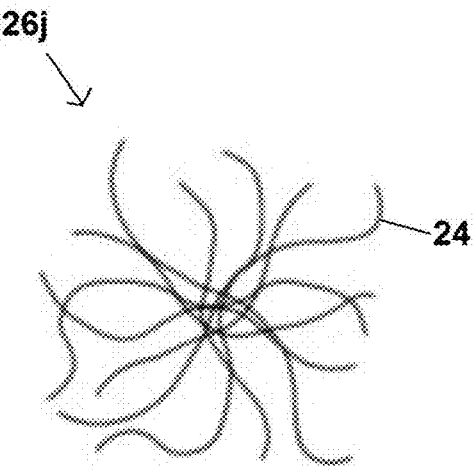
FIG. 12D is a front elevation view showing another exemplary size of the fragments contained in the enlarged portion of the housing of the exemplary reverse venturi apparatus illustrated in FIG. 11.

Referring to FIG. 11, the at least one obstruction element 26a-j is illustrated as a combination of the plurality of baffles 26c shown in FIGS. 7A-B and a plurality of fragments 26g-j, which have different sizes and which are similar to the plurality of fragments 26d shown in FIG. 8. In accordance with this alternative configuration, the plurality of baffles 26c and the plurality of fragments 26g-j are disposed in the enlarged portion 19 of the housing 16. Like in FIGS. 7A-B, the plurality of baffles 26c illustrated in FIG. 11 extend transversely across the enlarged portion 19 of the housing 16 from the interior surface 68 of the enlarged portion 19 of the housing 16. Additionally, the plurality of baffles 26c are spaced apart relative to one another along the central axis 17 such that the baffles 26c divide the enlarged chamber 21 into multiple sections. Orifices 28 in each of the baffles 26c permit the flow of the gaseous emissions 10 through the baffles 26c. The plurality of fragments 26g-j are disposed between adjacent baffles 26c (i.e. are disposed in the multiple sections of the enlarged chamber 21).

As illustrated in FIG. 11 and in FIGS. 12A-D, the plurality of fragments 26g-j form the mass of reactive material 24. The plurality of fragments 26g-j may be provided in different sizes where the plurality of fragments 26g-j are grouped by similar size (i.e. fragments 26g, 26h, 26i, and 26j are in separate groups) and are separated from fragments of another size by the baffles 26c. For example, the groups of fragments 26g-j may be arranged such that the size of the fragments 26g-j decreases moving away from the entry portion 18 of the housing 16 and toward the exit portion 20 of the housing 16. In other words, the size of the fragments 26g-j in the various groups may be graduated and may decrease moving in an overall flow direction of the gaseous emissions 10 in the enlarged portion 19 of the housing 16. In one variation, the fragments 26g-j are made of zinc. For example, the fragments 26g-j may be formed by dripping molten zinc into a cooling liquid to create a popcorn-like structure with an exceptionally large surface area and a random, moss-like surface texture. It should be appreciated that in another variation, different sized fragments 26g-j may be mixed together and therefore are not separated into groups based on size.

Figure 13A:
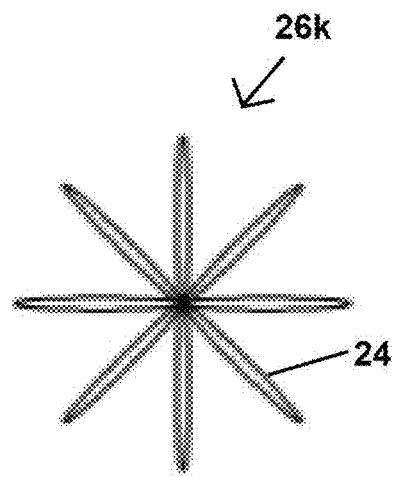
FIG. 13A is a front elevation view showing one exemplary piece of loose material with an asterisk-like shape that in combination with other pieces may be used to replace the fragments shown in the exemplary reverse venturi apparatus illustrated in FIGS. 8 and 11.
Figure 13B:
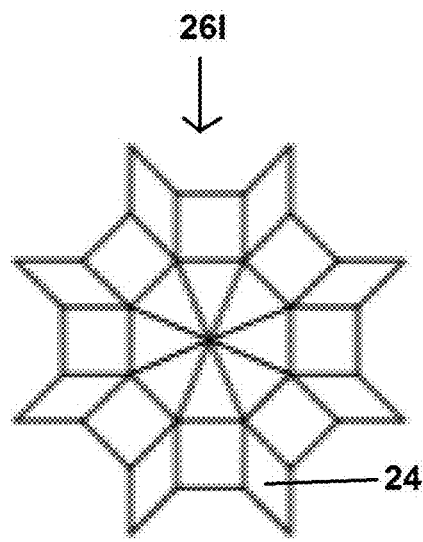
FIG. 13B is a front elevation view showing one exemplary crystalline flake that in combination with other crystalline flakes may be used to replace the fragments shown in the exemplary reverse venturi apparatus illustrated in FIGS. 8 and 11.
Figure 13C:
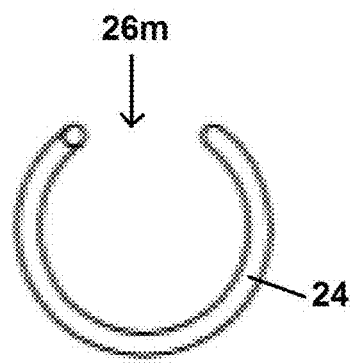
FIG. 13C is a front elevation view showing one exemplary wire coil that in combination with other wire coils may be used to replace the fragments shown in the exemplary reverse venturi apparatus illustrated in FIGS. 8 and 11.

As FIGS. 13A-C illustrate, several alternative shaped obstruction elements 26k-m are shown in the form of a loose material, which may be used in addition to or instead of the plurality of fragments 26d and 26g-j shown in FIGS. 8 and 11. FIG. 13A illustrates an example where the obstruction 26k forms the mass of reactive material 24 and has an asterisk-like shape, which is similar to the shape of the child's toy called "Jacks". FIG. 13B illustrates another example where the alternative shaped obstruction element 26k-m is a plurality of crystalline flakes 26l (one shown) that form the mass of reactive material 24 and that may be positioned in the enlarged portion 19 of the housing 16 like the fragments 26d and 26g-j shown in FIGS. 8 and 11. The crystalline flakes 26l have a shape that is similar to that of a snowflake. FIG. 13C illustrates yet another example where the alternative shaped obstruction element 26k-m is a plurality of wire coils 26m (one shown) that form the mass of reactive material 24 and that may be positioned in the enlarged portion 19 of the housing 16 like the fragments 26d and 26g-j shown in FIGS. 8 and 11. It should be appreciated that obstructions 26k and the plurality of crystalline flakes 26l may be made of zinc or a non-zinc material that is zinc coated using various processes, including without limitation, lost wax forging and 3D printing. The plurality of wire coils 26m may be made, for example, by wrapping zinc wire around a mandrel core similar to the shape of a spring, except after winding around the mandrel core the entire coil of wrapped wire is slit along the length of the mandrel core so that individual rings of coil are generated. It should also be appreciated that the alternative shaped obstruction elements 26*k-m* may or may not completely fill the enlarged chamber 21.

It should be appreciated that the various types of obstruction elements 26*a-k* described above can be mixed and matched to create various combinations. Examples of mixing and matching include combining one or more baffles 26*a-c* shown in FIGS. 5, 6A-B, and 7A-B with the plurality of fragments 26*d* and 26*g-j* shown in FIGS. 8 and 11. Other examples of mixing and matching include combining the plurality of entangled strands 26*e* shown in FIG. 9 with the plurality of fragments 26*d* and 26*g-j* shown in FIGS. 8 and 11. Other alternative configurations are possible that combine the various types of obstruction elements 26*a-k* described above with other filter materials such as activated carbon. Activated carbon collects contaminants like a sponge and by surface contact. Therefore, limited quantities of activated carbon can be introduced into the enlarged portion 19 of the housing 16 to act in conjunction with the various types of obstruction elements 26*a-k* described above. Advantageous, the obstruction elements 26*a-k* would hold the activated carbon in the enlarged portion 19 of the housing 16 so that the activated carbon is disposed relatively statically throughout the enlarged chamber 21. This scenario is opposite to typical emission control systems, which release activated carbon into the flow of gaseous emissions 10. Because the activated carbon is not free to flow with the gaseous emissions a more efficient use of activated carbon is possible. Those skilled in the art will readily appreciate that the disclosed variations of the reverse venturi apparatus 15 are merely exemplary and that many combinations well beyond the few examples disclosed herein are possible and desirable to address specific applications.

Figure 14:
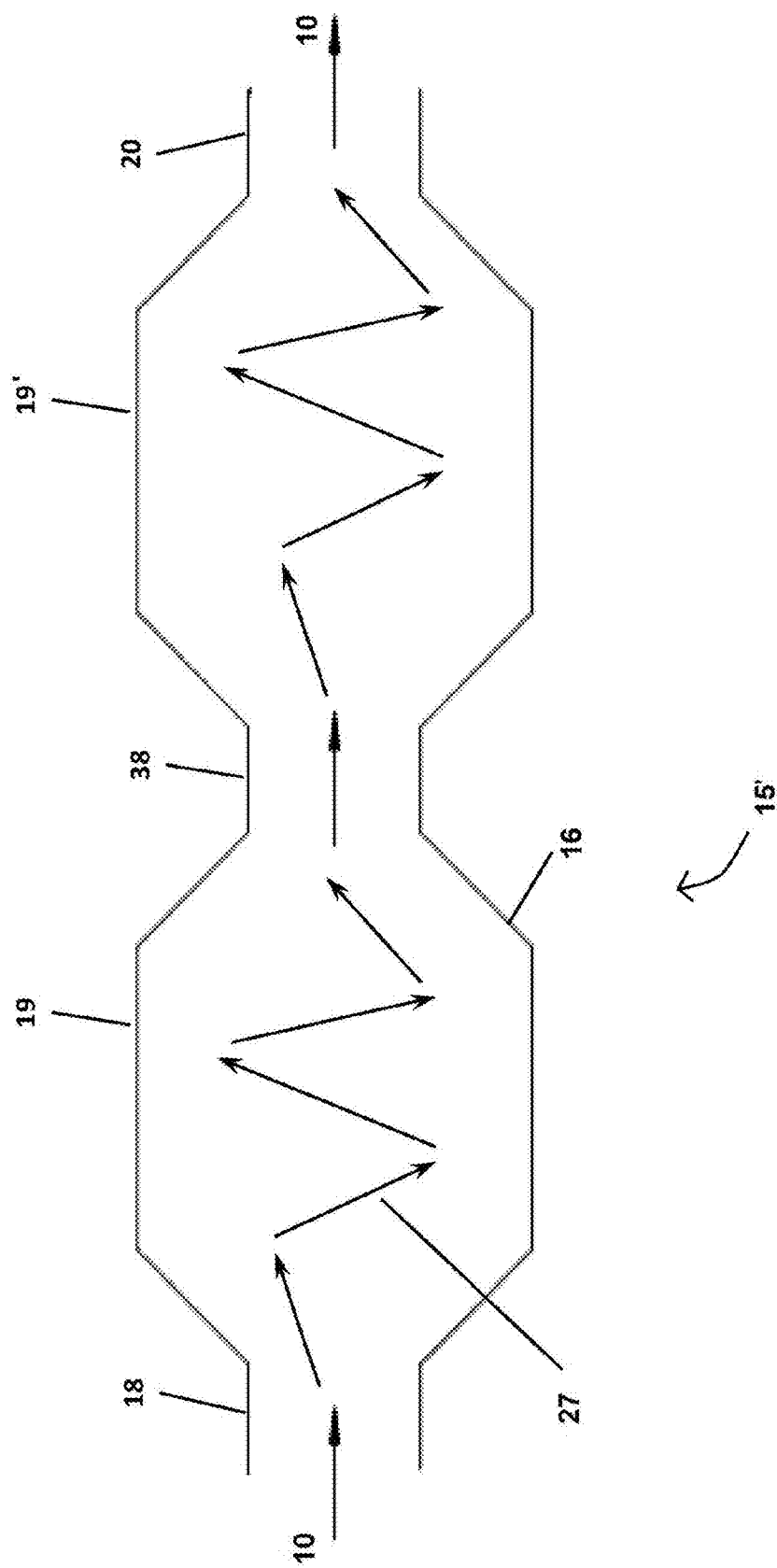
FIG. 14 is a side cross-sectional view showing another exemplary reverse venturi apparatus constructed in accordance with the subject disclosure that includes two separate enlarged portions that are joined together in series.

With reference to FIG. 14, another exemplary reverse venturi apparatus 15' is illustrated that includes two enlarged portions 19, 19' that are joined together in series by conduit 38. One enlarged portion 19 of the housing 16 extends between the entry portion 18 of the housing 16 and the conduit 38 while the other enlarged portion 19' extends between the conduit 38 and the exit portion 20 of the housing 16. Thus, the tortuous flow path 27 for the gaseous emissions 10 is elongated. In accordance with this configuration, the gaseous emissions 10 are routed from enlarged portion 19 through conduit 38 and to enlarged portion 19' where additional contaminants are collected and/or captured. It should also be appreciated that the subject disclosure is not limited to using just one or two enlarged portions 19, 19' in series, because some applications with an extensive volume of emissions and/or heavy contamination levels may require numerous enlarged portions connected together in series.

Figure 15:
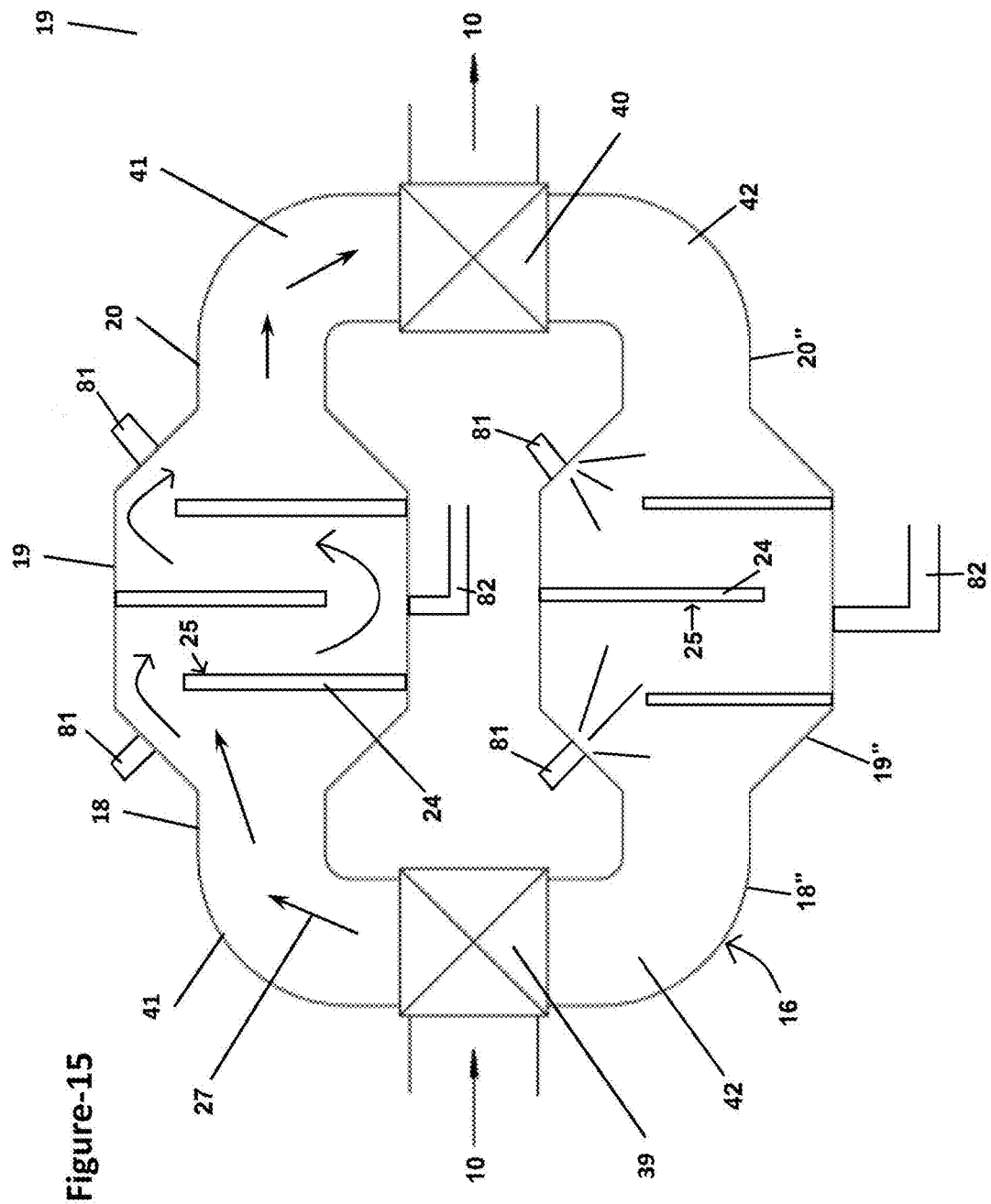
FIG. 15 is a side cross-sectional view showing another exemplary reverse venturi apparatus constructed in accordance with the subject disclosure that includes two separate enlarged portions that are joined together in parallel.

Referring to FIG. 15, another exemplary reverse venturi apparatus 15" is illustrated that includes two enlarged portions 19, 19" that are joined together in parallel. A 3-way inlet valve 39 controls the flow of gaseous emissions 10, directing the gaseous emissions 10 into and through either conduit 41 or conduit 42. A 3-way outlet valve 40 directs the gaseous emissions 10 to exit from either conduit 41 or conduit 42 without back-flowing directly from conduit 41 into conduit 42, or vice versa. The gaseous emissions 10 enter enlarged portion 19 through entry portion 18 and exit through exit portion 20 when the gaseous emissions 10 are routed through conduit 41. The gaseous emissions 10 enter enlarged portion 19" through entry portion 18" and exit through exit portion 20" when the gaseous emissions 10 are routed through conduit 42. One benefit of the reverse venturi apparatus 15" shown in FIG. 15 is that when one of the enlarged portions 19, 19" requires maintenance, servicing, or cleaning, it can be isolated and taken off-line without shutting down the entire system, because the other one of the enlarged portions 19, 19" can remain in service.

Over time, the chemical reactions occurring on the reactive outer surface 25 of the mass of reactive material 24 and/or the physical capture of contaminants may lead to a saturation point for the mass of reactive material 24 wherein the efficiency of the reverse venturi apparatus 15 is reduced. The arrangement shown in FIG. 15 therefore allows for the removal, replacement, and/or cleaning of the mass of reactive material 24 in the enlarged portions 19, 19" of the housing 16 to restore the reverse venturi apparatus to pre-saturation efficiency performance without requiring a complete shutdown.

The process of contaminant removal from the saturated mass of reactive material will specifically depend upon the type of contaminants and the type of amalgam forming metal being used. Access to the enlarged chambers 21, 21", which are disposed inside the enlarged portions 19, 19" of the housing 16 will be commensurate with the type of obstruction used. When relatively small loose obstructions are used, a pouring and/or draining type access will be required. If the obstructions are relatively large blocks, plates, baffles, or assemblies, then appropriate lifting and handling methods and access will be required.

Still referring to FIG. 15, the reverse venturi apparatus 15 may include one or more spray nozzles 81 that are disposed in fluid communication with the enlarged portions 19, 19" of the housing 16. The spray nozzles 81 are positioned to spray a deoxidizing acid over the mass of reactive material 24 in the enlarged portions 19, 19" of the housing 16. In operation, the deoxidizing acid washes the mass of reactive material 24 of the contaminants in order to rejuvenate the mass of reactive material 24. Optionally, drains 82 may be disposed in fluid communication with the enlarged portions 19, 19" of the housing 16 to transport the solution of used deoxidizing acid and contaminants away from the enlarged portions 19, 19" of the housing 16. Advantageously, saturated zinc, whether it is a coating on steel, or a solid zinc structure, can be recycled and reclaimed. Therefore, the material used in the obstructions can be reused and reclaimed. In addition, many of the contaminants which are captured, especially the heavy metals such as mercury, may be able to be reused and reclaimed in lighting and chlorine manufacture.

Figure 16:
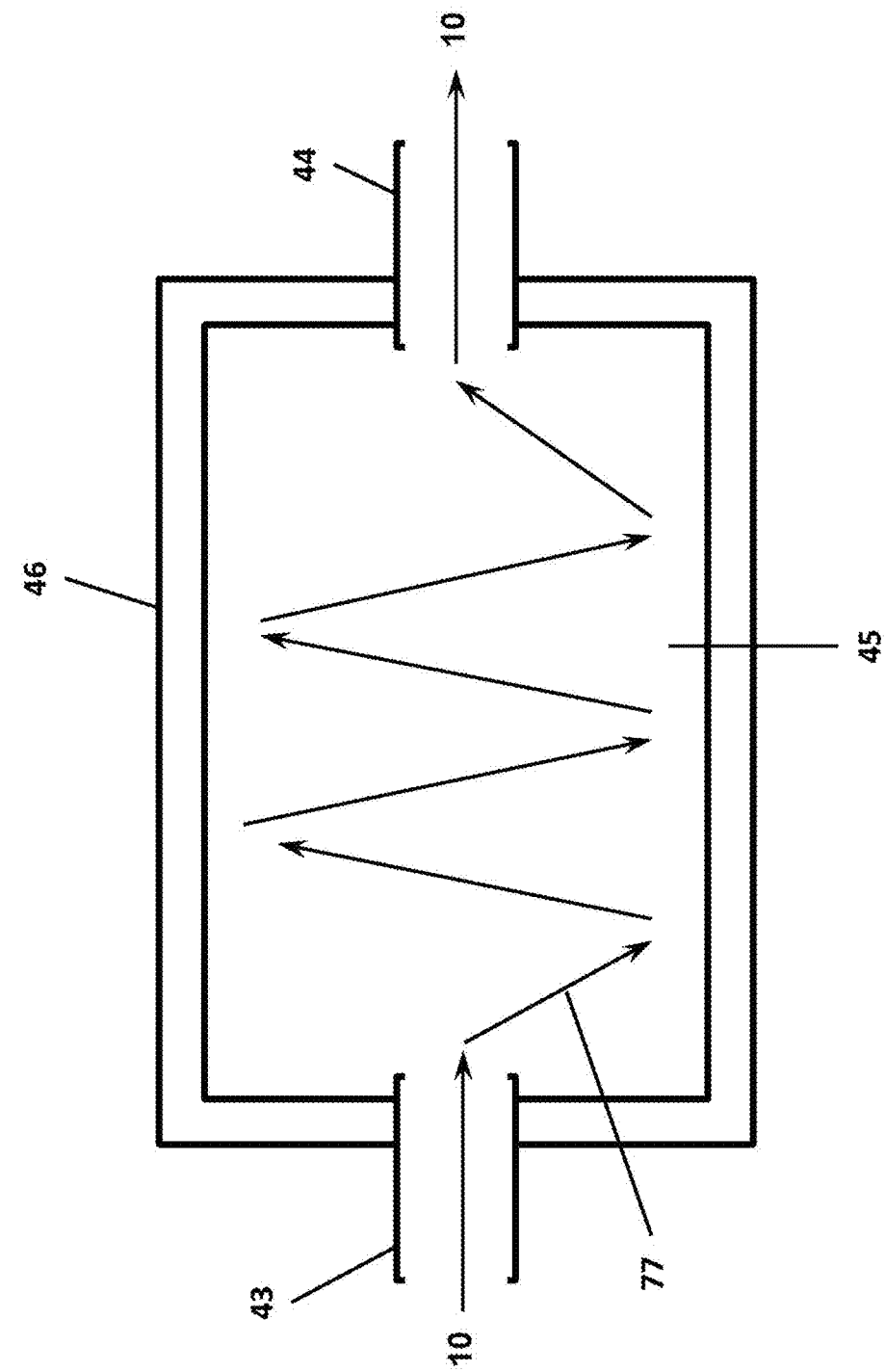
FIG. 16 is a side cross-sectional view showing another exemplary reverse venturi apparatus constructed in accordance with the subject disclosure.

With reference to FIG. 16, another exemplary reverse venturi apparatus 15 is illustrated where the enlarged chamber 45 has a significantly larger volume compared to the volume of entrance conduit 43 and exiting conduit 44. The enlarged portion 46 can be round, square, triangular, oval, or virtually any one of many shapes as may be desired (where a rectangular shape is shown), in order to achieve an enlarged tortuous flow path 77 for the gaseous emissions flowing through the enlarged portion 46.

Figure 17:
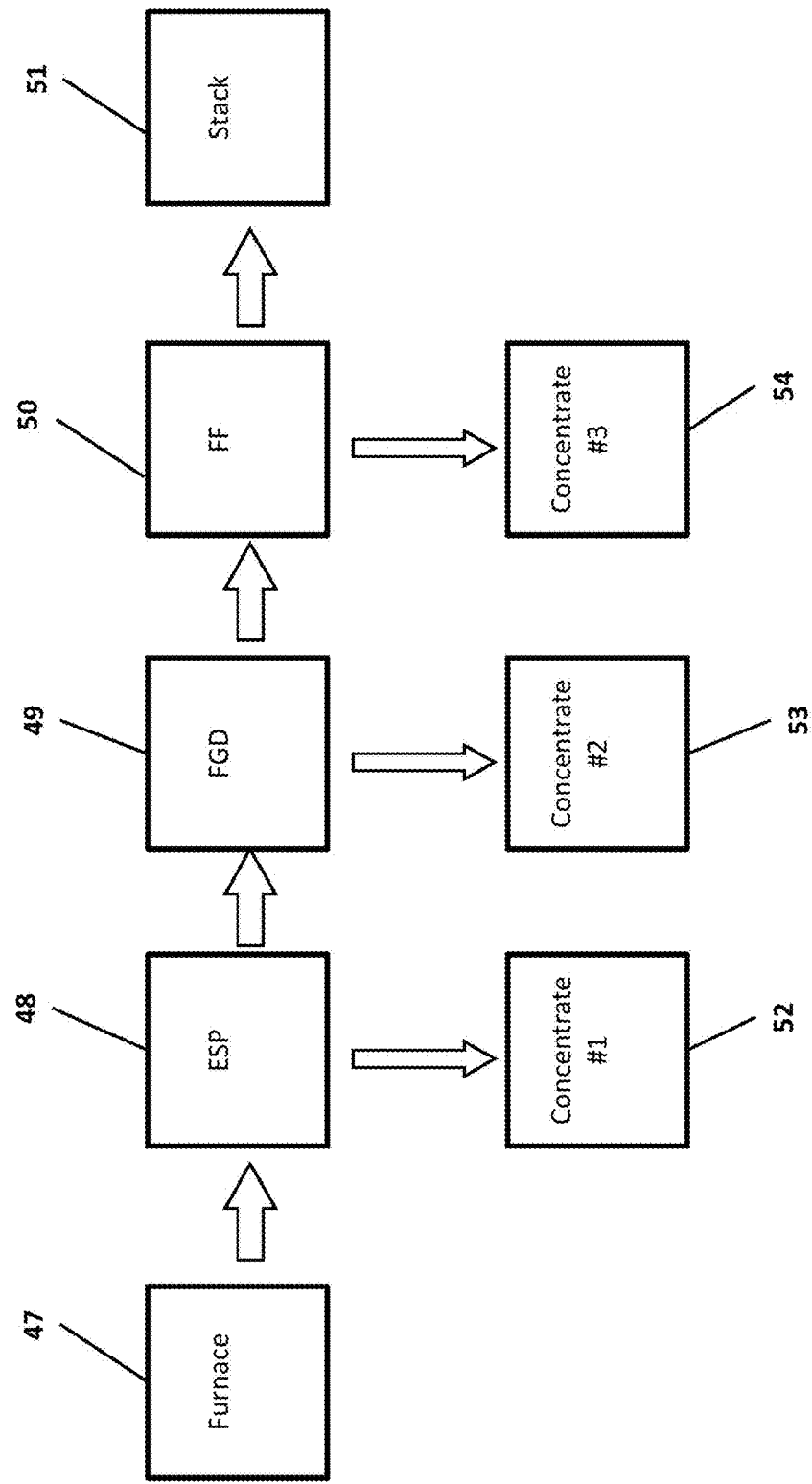
FIG. 17 is a block flow diagram illustrating a known method for removing contaminants from gaseous emissions.

With reference to FIG. 17, a block diagram of a typical gaseous emission control system is shown. Gaseous emissions are routed from a furnace 47 to an electrostatic precipitator (ESP) 48, and then to a fluidized gas desulfurization (FGD) unit 49, and then through a fabric filter (FF) unit 50, before being released to atmosphere through a stack 51. A first concentrate 52 of contaminants is removed from the gaseous emissions at the ESP 48. In a similar fashion, a second concentrate 53 of contaminants is removed from the gaseous emissions at the FGD unit 49. The second concentrate 53 produced by the FGD unit 49, which often contains mercury and other heavy metals, is typically diverted into wastewater. A third concentrate 54 of contaminants is removed from the gaseous emissions at the FF unit 50.

Figure 18A:
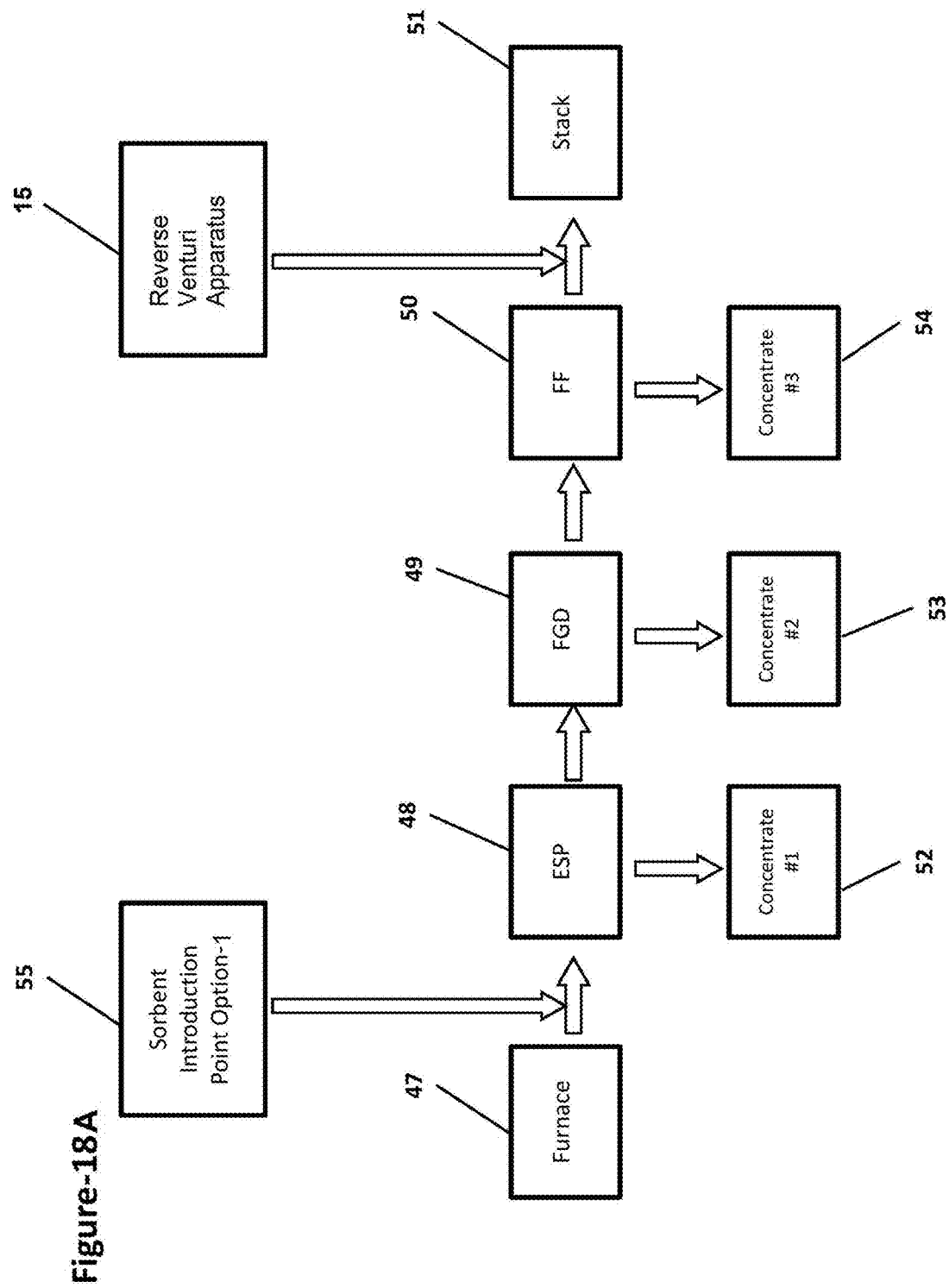
FIG. 18A is a block diagram illustrating the method for removing contaminants from gaseous emissions illustrated in FIG. 17 where the method has been modified by adding steps for injecting a sorbent into the gaseous emissions at a first introduction point and subsequently passing the gaseous emissions through a reverse venturi apparatus.
Figure 18B:
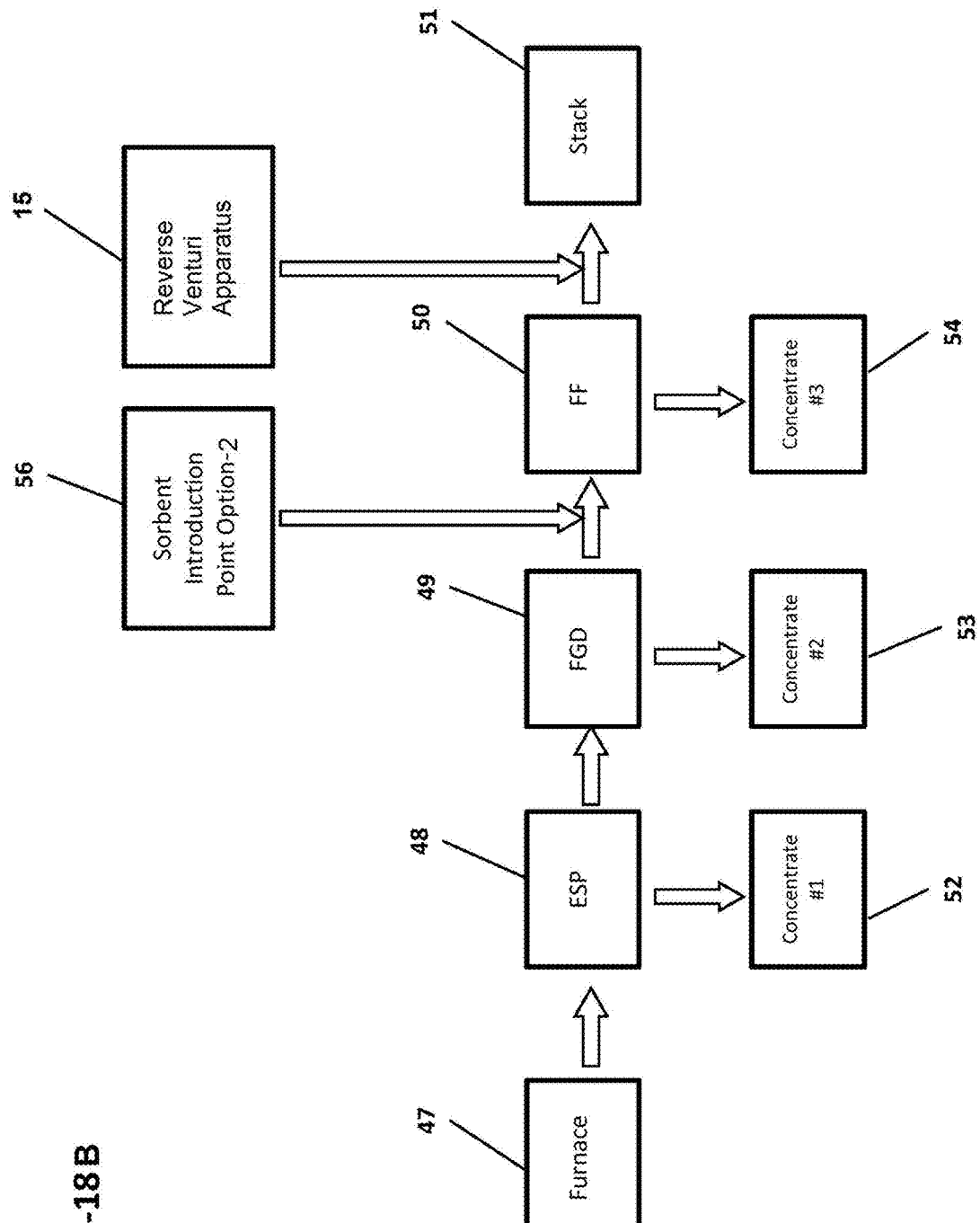
FIG. 18B is a block diagram illustrating the method for removing contaminants from gaseous emissions illustrated in FIG. 17 where the method has been modified by adding steps for injecting the sorbent into the gaseous emissions at a second introduction point and subsequently passing the gaseous emissions through the reverse venturi apparatus.

With reference to FIGS. 18A-B, the block diagram of FIG. 17 has been modified with introduction point options for sorbent injection and an additional step has been added where the gaseous emissions are passed through the reverse venturi apparatus 15 described above. In FIG. 18A, a first sorbent introduction point 55 is shown positioned between the furnace 47 and the ESP 48. Alternatively, in FIG. 18B, a second sorbent introduction point 56 is shown positioned between the FGD unit 49 and the FF unit 50. Which option is deemed to be best for sorbent will be dependent upon the existing configuration and condition of the plant. There are numerous other introduction points and/or combinations of introduction points where the sorbent can be introduced other than the two options depicted in FIGS. 18A-B, therefore these two options are illustrated for demonstrative purposes. The reverse venturi apparatus 15 in FIGS. 18A-B is located after the FF unit 50 and before the stack 51. The reverse venturi apparatus 15 can be constructed in accordance with any of the aforementioned examples described above, as may be appropriate for various applications. In the end, the final gaseous emissions released to atmosphere through the stack 51 after exiting the reverse venturi apparatus 15 will be capable of meeting and exceeding current and future EPA emissions regulations and requirements.

The method illustrated by FIGS. 18A-B includes the steps of burning a fuel in the furnace 47 to generate gaseous emissions that contain contaminants, routing the gaseous emissions from the furnace 47 to the ESP 48, and removing a first portion particulate contaminants in the gaseous emissions using the ESP 48. In accordance with the step of removing a first portion particulate contaminants in the gaseous emissions using the ESP 48, the first concentrate 52 is formed, which contains the first portion of particulate contaminants that have been removed from the gaseous emissions by the ESP 48. It should be understood that in operation, the ESP 48 utilizes an induced electrostatic charge to remove fine contaminant particles from the gaseous emissions. The method also includes the steps of routing the gaseous emissions from the ESP 48 to the FGD unit 49 and removing sulfur dioxide contaminants in the gaseous emissions using the FGD unit 49. In accordance with the step of removing sulfur dioxide contaminants in the gaseous emissions using the FGD unit 49, the second concentrate 53 is formed containing the sulfur dioxide contaminants that have been removed from the gaseous emissions by the FGD unit 49. The method further includes the steps of routing the gaseous emissions from the FGD unit 49 to the FF unit 50 (i.e. a bag house) and removing a second portion of particulate contaminants in the gaseous emissions using the FF unit 50. In accordance with the step of removing a second portion of particulate contaminants in the gaseous emissions using the FF unit 50, the third concentrate 54 is formed containing the second portion of particulate contaminants that have been removed from the gaseous emissions by the FF unit 50. It should be understood that in operation, contaminant particles are removed from the gaseous emissions when the gaseous emissions pass through the one or more fabric filters (not shown) of the FF unit 50.

In accordance with the subject disclosure, the method further includes the steps of routing the gaseous emissions from the FF unit 50 to the reverse venturi apparatus 15 and removing heavy metal contaminants in the gaseous emissions using the reverse venturi apparatus 15. In accordance with the step of removing heavy metal contaminants in the gaseous emissions using the reverse venturi apparatus 15, the gaseous emissions pass by (i.e. flow over) the mass of reactive material disposed in the reverse venturi apparatus 15. The amalgam forming metal in the mass of reactive material chemically binds with the heavy metal contaminants in the gaseous emissions. Accordingly, the mass of reactive material traps the heavy metal contaminants in the reverse venturi apparatus 15 when the heavy metal contaminants bind to the amalgam forming metal in the mass of reactive material. The method may then proceed with routing the gaseous emissions from the reverse venturi apparatus 15 to a stack 51 that vents the gaseous emissions to the surrounding atmosphere. It should also be appreciated that the reverse venturi apparatus 15 advantageously has a relatively small equipment footprint, allowing it to be easily installed as a retrofit in line between the emission control devices 48, 49, 50 of existing systems and the stack 51 to atmosphere.

Optionally, the method may include the step of injecting a sorbent into the gaseous emissions. In accordance with this step and as shown in FIG. 18A, the sorbent may be injected into the gaseous emissions at the first sorbent introduction point 55 that is disposed between the furnace 47 and the ESP 48. Alternatively, as shown in FIG. 18B, the sorbent may be injected into the gaseous emissions at the second sorbent introduction point 56 that is disposed between the FGD unit 49 and the FF unit 50. The sorbent contains the amalgam forming metal such that the sorbent binds with at least some of the heavy metal contaminants in the gaseous emissions before the gaseous emissions enter the reverse venturi apparatus 15. By injecting the sorbent into the gaseous emissions at the first sorbent introduction point 55 or the second sorbent introduction point 56, more mercury, heavy metals, and acid gasses can be collected in the FF unit 50 at levels that were previously impossible to achieve. As noted above, the amalgam forming metal may be selected from a group consisting of zinc, iron, and aluminum and the sorbent may be, for example, a CZTS compound. The sorbent is able to be regenerated and rejuvenated so that the hazardous contaminants can be harvested and recycled.

With reference to FIG. 19, a block diagram of a typical non-gaseous emission control system is shown. Liquid and/or liquid-like emissions can be routed from a fluidized gas desulfurization (FGD) unit 59 and/or routed from a wet scrubber unit 58 into a lime treatment unit 60 before being routed to a settling pond 61. After an appropriate period of time, the non-gaseous emissions will be routed out of the settling ponds 61 into either a process system for dry disposal preparation 64 or to a dewatering system 62. The non-gaseous emissions that are routed through the process for dry disposal 64 are prepared for disposal in a landfill 65. The non-gaseous emissions that are routed through the dewatering system 62, which sometimes may include a recirculation system, are prepared for use in a secondary industrial process 63, which for example, may involve the manufacture of gypsum and/or cement. The non-gaseous emissions that are not routed out the settling ponds 61 into the dewatering systems 62 or into the processes for dry disposal 64 are routed for discharge into waterways 66. The final non-gaseous emissions released into the waterways 66 are not as regulated as they will be in coming years. The proposed EPA water emissions regulations and requirements will be extraordinarily restrictive compared to the emissions allowed into waterways at the present time. The industries with contaminated liquid emissions requiring discharge into waterways have current emissions control technology which has virtually no possibility of meeting and/or complying with the coming EPA regulations.

Figure 20:
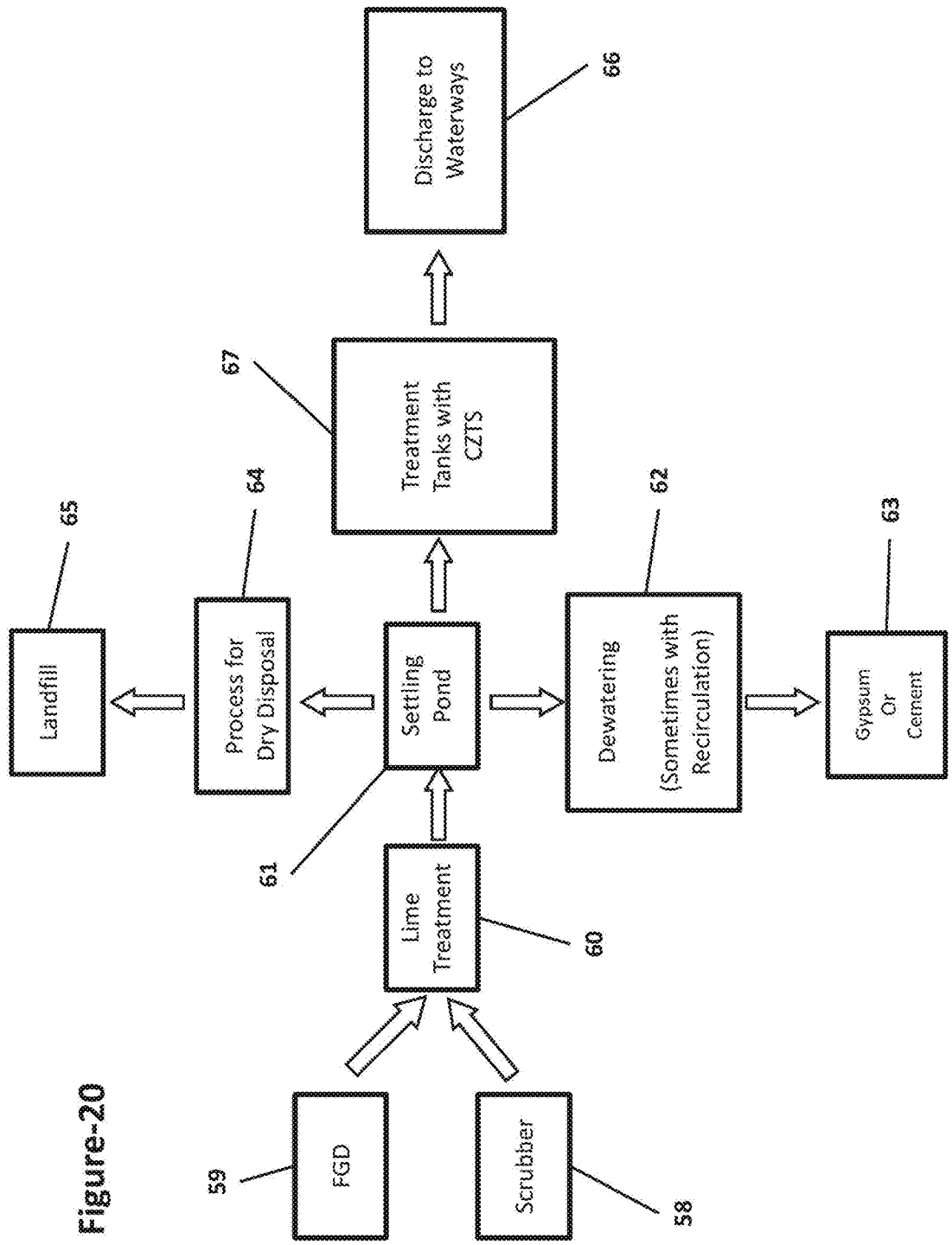
FIG. 20 is a block diagram illustrating the method for removing contaminants from non-gaseous emissions illustrated in FIG. 19 where the method has been modified by adding steps for treating a portion of the non-gaseous emissions extracted from the settling pond with a sorbent.

With reference to FIG. 20, the block diagram of FIG. 19 has been modified with one or more treatment tanks 67, which contain the sorbent described above. The treatment tanks 67 are located after the non-gaseous emissions are routed out of the settling pond 61 and before they are discharged into the waterways 66. The method illustrated by FIG. 20 includes the steps of collecting non-gaseous emissions that contain contaminants, passing the non-gaseous emissions through the FGD unit 59 and/or the wet scrubber 58 to remove some of the contaminants in the non-gaseous emissions, routing the non-gaseous emissions from the FGD unit 59 and/or the wet scrubber 58 to a lime treatment unit 60, and passing the non-gaseous emissions through the lime treatment unit 60 to soften the non-gaseous emissions through Clark's process. It should be understood that in operation, the lime treatment unit 60 removes certain ions (e.g. calcium (Ca) and magnesium (Mg)) from the non-gaseous emissions by precipitation. The method also includes the steps of routing the non-gaseous emissions from the lime treatment unit 60 to the settling pond 61 where some of the contaminants in the non-gaseous emissions are removed by sedimentation, dewatering a first portion of the non-gaseous emissions in the settling pond 61 and using the dewatered by-product in a secondary industrial process 63, and removing a second portion of the non-gaseous emissions from the settling pond 61 and subjecting the second portion of the non-gaseous emissions to a dry disposal process 64. In accordance with the step of dewatering the first portion of the non-gaseous emissions in the settling pond 61 and using the dewatered by-product in the secondary industrial process 63, dewatering process may include recirculation of the first portion of the non-gaseous emissions and the secondary industrial process 63 may involve, for example, the manufacture of gypsum or the manufacture of cement. In accordance with the step of removing the second portion of the non-gaseous emissions from the settling pond 61 and subjecting the second portion of the non-gaseous emissions to the dry disposal process 64, the dry disposal process 64 may include depositing the second portion of the non-gaseous emissions in the landfill 65.

In accordance with the subject disclosure, the method further includes the step of routing a third portion of the non-gaseous emissions in the settling pond 61 to the treatment tanks 67 containing the disclosed sorbent. The sorbent contains an amalgam forming metal that binds with heavy metal contaminants in the third portion of non-gaseous emissions. Accordingly, the sorbent traps the heavy metal contaminants in the treatment tanks 67 when the heavy metal contaminants bind with the sorbent and settle/precipitate out of the non-gaseous emissions. The method may then proceed with routing the non-gaseous emissions from the treatment tanks 67 to the waterway 66 for discharge. It should be appreciated that the design of the treatment tanks 67 may allow the continuous passage of the non-gaseous emissions (i.e. the wastewater stream) through the treatment tanks 67.

With respect to the sorbent of the subject disclosure, several exemplary embodiments are disclosed. These exemplary embodiments are just a few examples and do not represent an exhaustive list of potential variations on the theme.

As noted above, one exemplary sorbent is elemental zinc powder. Zinc powder is made from elemental zinc. Zinc can come in the form of powders or in the form of granules. One method that can be used to extend the effective life of the zinc powder and/or granules at elevated temperatures for some gaseous emission applications and reduce and/or prevent premature oxidation is to mix or coat the granules and/or powder with a solid acid such as sulfamic acid, citric acid, or other organic acids. The powder/acid mixture can be injected into gaseous emissions (e.g. flue gas streams) and/or placed in an appropriate exemplary embodiment of the reverse venturi apparatus 15.

Optimal particle size for the zinc powder ranges from 0.5 nanometers to 7,500 microns. In addition, it has been found that a powder mixture with a range of different size particles is beneficial, especially if the particle sizes range from 0.5 nanometers to 7,500 microns. Similarly, the optimal particle size for zinc granules ranges from 7,500 microns to 3.0 inches. In addition, it has been found that a granule mixture with a range of different size granules is beneficial, especially if the granule sizes range from 7,500 microns to 3.0 inches.

In another exemplary embodiment, the sorbent is CZTS, which has the elemental formula of $Cu_2ZnSnS_4$. CZTS may also being comprised of other phases of copper, zinc, tin, and sulfur, which are also beneficial. CZTS and/or the associated phases of copper, zinc, tin, and sulfur may be blended in stoichiometric proportions and then mechanochemical compounding may be performed in a mill. Further still, the CZTS may be blended with equal proportions of any one of several clays such as bentonite or zeolite and calcium hydroxide (CaOH). The optimal particle size for CZTS powder ranges from 0.5 nanometers to 7,500 microns. It has been found in testing and development that CZTS powder mixtures with a range of different size particles is beneficial, especially if the particle sizes ranges from 0.5 nanometers to 7,500 microns. In applications where specialized CZTS granules are preferred, the optimal granule size has been found to range from 7,500 microns to 3.0 inches. In addition, it has been found that CZTS granule mixtures with a range of different size granules is beneficial, especially if the size of the granules ranges from 7,500 microns to 3.0 inches.

For most contaminants, the CZTS is most efficient at the smallest particle size within the above stated ranges and when the highest amount of CZTS in the metallic phase is present. It should be appreciated that during the manufacture of CZTS, a complete transformation of the mixture of copper, zinc, tin, and sulfur to CZTS does not take place, but is a mixture of phases (e.g. danbaite ($CuZn_2$) and tin sulfur (SnS)).

In one exemplary manufacturing method for CZTS, copper, zinc, tin, and sulfur are added to a mill in no particular order. Milling is accomplished using either a ball mill or some type of attrition mill or a combination of milling equipment which in sequential combination achieve the desired particle size. Exemplary starting particle size ranges from 325 standard mesh screens to 100 standard mesh screens, where 1 standard mesh screen equals 7,500 microns. The received particles are further weighed in a predetermined molar ratio of copper:zinc:tin:sulfur=1.7:1.2:1.0:4.0. After confirming mesh size and molar ratio, the particles are mechanochemically compounded into CZTS and its other phases by milling. Milling time is controlled to achieve optimum properties for specific applications. It should also be appreciated that milling can be accomplished using a wet milling process by adding a suitable solvent such as glycol ether, ethylene glycol, ammonia, or other alcohols or by dry milling, which is performed in an inert gas atmosphere.

During the milling, intermittent sampling takes place to determine particle size using a particle size analyzer, and an SEM, XRD, or Raman to determine percent phase transformation. The mill ball size is important and has been shown in testing to be optimized with a ball-to-powder weight ratio (charge ratio) of at least 5:1. The milling balls are best made of steel, ceramic, zirconia or any other material which achieves the size and/or phase transformations without contaminating the final product. When wet milling is used, the CZTS is dried. The CZTS is then blended further using a ribbon blender, V-blender, or any other suitable blender in order to blend in equal portions of bentonite or zeolite and calcium hydroxide.

In accordance with the methods described above, the sorbent may be introduced into gaseous emissions where the gaseous emissions are at a temperature of approximately 750 degrees Fahrenheit or less. The sorbent may be introduced into the gaseous emissions by any one of several methods such as, but not limited to, injection, fluid beds, coated filters, and traps. The method of introduction can be chosen based on existing emissions control systems in the plant to facilitate retro-fitting. One convenient method may be where CZTS is injected into the gaseous emissions in place of activated carbon, where the same injection equipment may be used with or without modification.

In some applications, the treatment of gaseous emissions may be optimized when CZTS is blended with bentonite for effective contaminant removal. Alternatively, the treatment of non-gaseous emission application may be optimized when CZTS is blended with Zeolite. In addition to the specific material blended with CZTS, the proportions of the blend may be application specific in order to provide optimized contaminant removal capabilities.

As shown in FIGS. 18A-B, where CZTS is used to treat gaseous emissions, the fabric filter unit 50 should be placed downstream of the CZTS introduction point 55, 56 so that the fabric filter unit 50 captures sorbent particles and increases the contact time that the gaseous emissions have with the sorbent. Deposition of the sorbent on the fabric filters (i.e. bags) of the fabric filter unit 50 allows additional contact time between the gaseous emissions and the sorbent and allows the sorbent to be collected for subsequent reclamation. The small particle size of the sorbent allows the sorbent to be carried along in the flow of gaseous emissions stream like dust being carried by the wind. During the period of time that the sorbent is carried in the flow of gaseous emissions, the sorbent comes in contact with contaminants also traveling in the flow of gaseous emissions and thusly can chemically react with and bind to the sorbent. Upon reaching the fabric filter unit 50, the gaseous emissions continue to pass through the filters in the fabric filter unit 50 while the particles of combined sorbent and contaminants are sized too large to pass through the filters. When the CZTS particles are less than 10 microns, it may be necessary to pre-coat the filters in the fabric filter unit 50 with a larger size CZTS particle, activated carbon, talc, lime, or other appropriate substance so the smaller CZTS particles do not pass through the filters. Alternative, a lower micron size rated filter may be used in the fabric filter unit 50.

In other applications for non-gaseous emissions, CZTS may be introduced into the treatment tanks 67 illustrated in FIG. 20. In this configuration, the CZTS is optimally introduced into the treatment tanks 67 with good agitation for a period of time, then the non-gaseous emissions (e.g. wastewater) undergoes pH adjustment, flocculation, and filtering before discharge. Afterwards, the CZTS in the treatment tanks 67 can undergo a reclamation process where the contaminants are harvested away from the CZTS. Used CZTS can be reclaimed by either leaching mercury from the CZTS or by vacuum distillation. The harvested contaminants may then be re-used in other industries. The CZTS also provides the benefit of being able to reduce nitrate and nitride levels in the non-gaseous emissions.

The water discharge regulations established by the EPA, which become effective in 2016, are much more stringent than those for air. Some of the current EPA water regulation levels listed in nanograms/Liter (ng/L), micrograms/Liter (µg/L), and/or grams/Liter are: mercury @ 119 ng/L; arsenic (As) @ 8 µg/L; selenium (Se) @ 10 µg/L; nitrogen dioxide ($NO_2$) and nitrate ($NO_3$) @ 0.13 g/L. Other heavy metals such as lead (Pb) and cadmium (Cd) also have proposed EPA restrictive levels. In many existing plants, water with contamination levels above allowable discharge regulations are routed to holding ponds and/or other types of sludge holding reservoirs of one kind or another. CZTS can treat solids in holding ponds by the same methods as disclosed herein for treating non-gaseous emissions. Depending on the ionic form of the heavy metal, sludge composition, and/or pH, the contact time for the CZTS in the holding pond can be appropriately adjusted. Adequate pH adjustment, flocculation, and subsequent filtering will allow for normal discharge, disposal, and/or use in other industries, none of which was previously possible.

It should be appreciated that the sorbents disclosed herein do not contain any loose carbon, including the activated carbon currently used in the art. As a result, none of the metal sulfides produced as by-products of the disclosed methods are leachable. Therefore, these by-products have valuable industrial use in gypsum wallboard and cement applications. EPA leach testing on metal sulfides is well known and use in these products is well documented.

In one configuration, activated carbon may be embedded in the filters of the fabric filter unit 50. This activated carbon is not free to escape into the flow of gaseous emissions. Another limited use of activated carbon is possible where the activated carbon coats the CZTS in its crystalline form, producing CZTS with a thin layer of carbon on the order of 1.0 nanometer in thickness or less. This helps to encourage the capture of extraordinarily small metallic vapor particles of mercury. In a similar fashion, the CZTS crystalline form can be coated with a nanometer-like thin layer of zeolite or other coatings to specifically target a specific hazardous contaminant for specialized applications. In another configuration shown in FIG. 33, the reverse venturi fluidized bed apparatus includes provisions for cleaning and recycling the sorbent in the form of a series of sorbent treatment subsystems for CZTS sorbents, CZTS-Alloy sorbents, and/or carbon-based sorbents.

Figure 21:
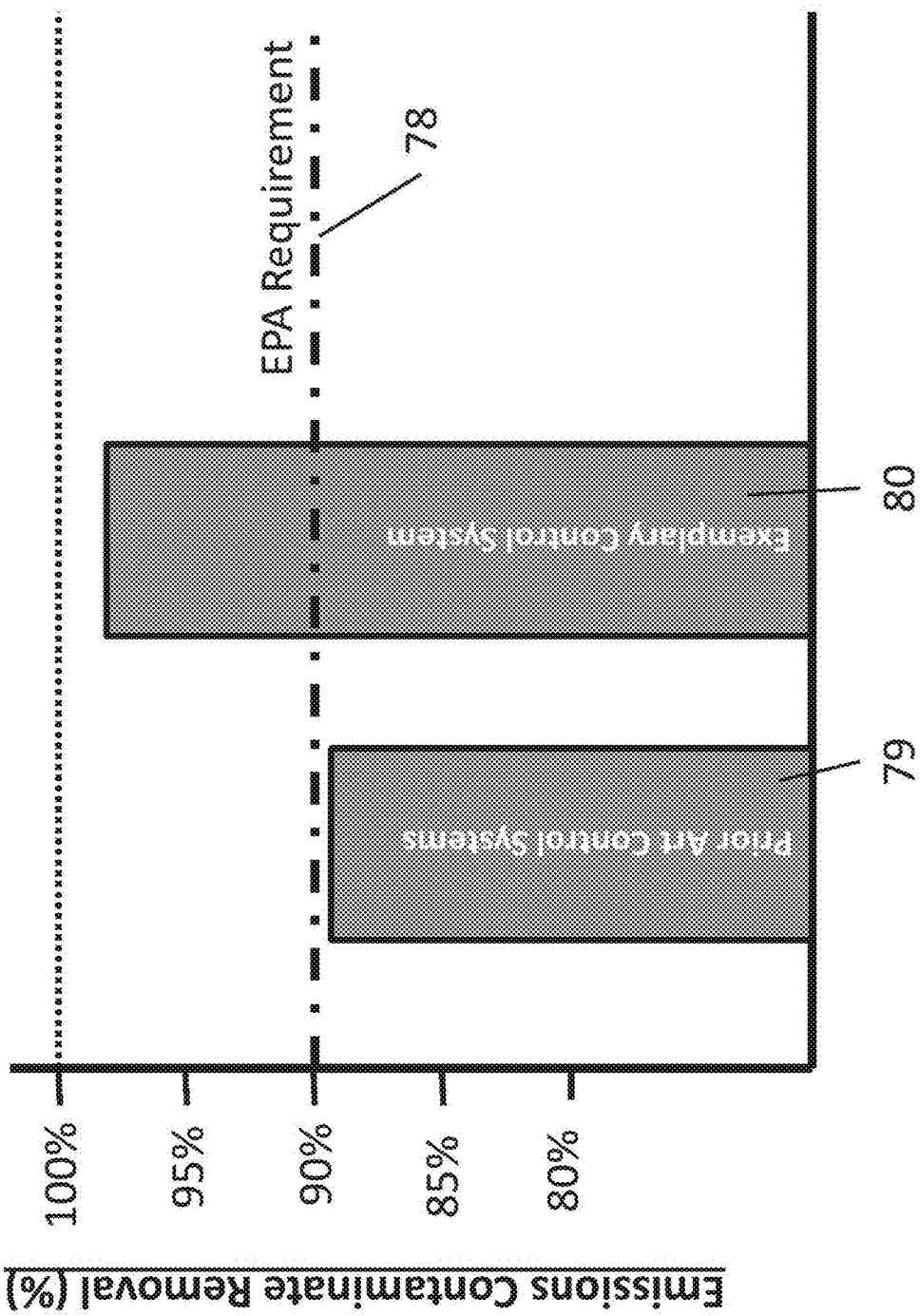
FIG. 21 is a graph illustrating the percentage of contaminants removed from emissions by known emissions control systems and the percentage of contaminants removed from emissions by the apparatus and methods disclosed herein.

Referring to FIG. 21, a graph illustrates the percentages of contaminants removed from emissions because of existing emissions control systems and the reverse venturi apparatus and the method disclosed herein. A 90% contaminant removal level 78 is currently established for gaseous emissions by the EPA. Existing emissions control systems 79 are effective to remove between 88%-90% of hazardous contaminants. However, the EPA has been raising the minimum percentage contaminant removal required over the years to the point that many existing emissions control systems are no longer able to meet the requirements and many other existing emissions control systems just meet the requirements while operating at their maximum removal capabilities available under the current technology.

Still referring to FIG. 21, the exemplary emissions control system 80 may either be a new emissions control system based upon the reverse venturi apparatus, the sorbents, and/or methods disclosed herein or it may be an existing emissions control system which has been modified and augmented to include the reverse venturi apparatus, the sorbents, and methods disclosed herein. Testing has confirmed that the exemplary emissions control system 80 is effective and capable of removing at least 98% of hazardous contaminants, which is well above the current EPA regulated levels.

Figure 22:
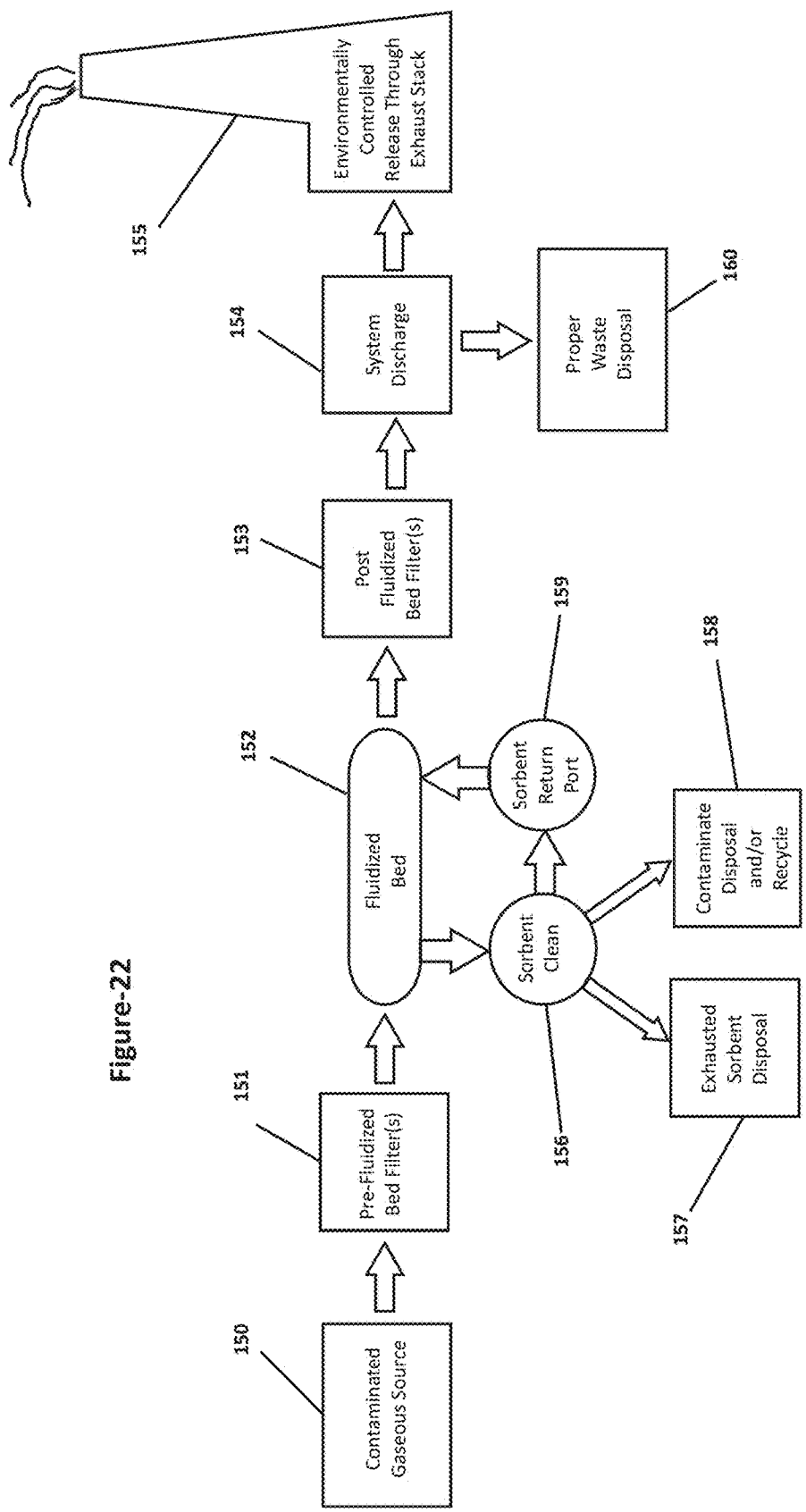
FIG. 22 is block flow diagram illustrating an exemplary method of using a reverse venturi shaped fluidized bed apparatus to remove contaminates from gaseous emissions and clean the reactive material that separates the contaminates from the gaseous emissions.
Figure 24:
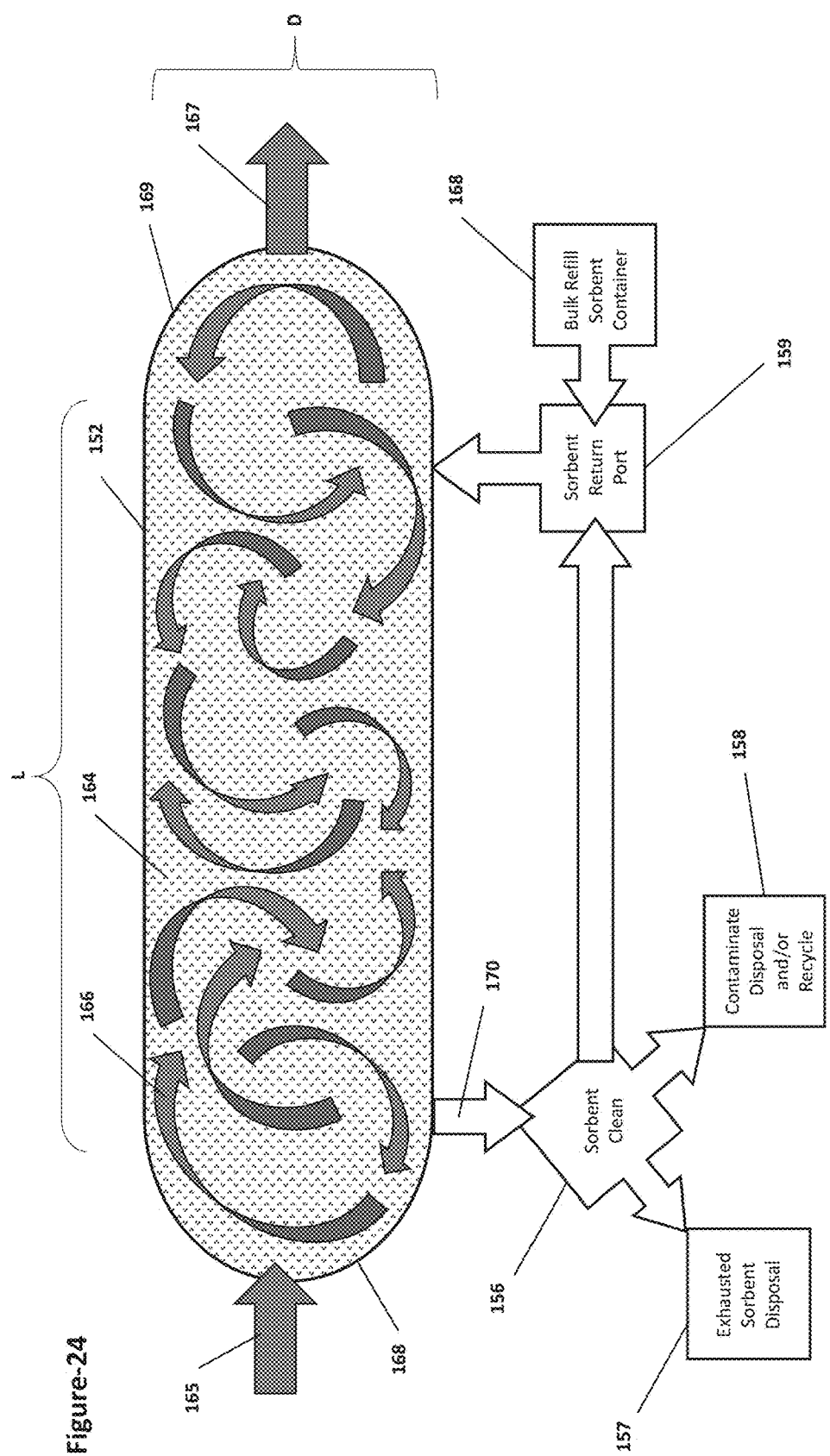
FIG. 24 is a flow diagram illustrating extended non-turbulent emissions flow through an exemplary reverse venturi shaped fluidized bed apparatus and exemplary method steps for cleaning and recycling the sorbent that separates the contaminates from the emissions.

Referring to FIG. 22 and FIG. 24, an exemplary method of emissions control is illustrated with contaminated gaseous source 150 introduced into the system through one or more pre-fluidized bed filters 151, through fluidized bed 152, through one or more post fluidized bed filters 153, and through a system discharge 154, which releases the gaseous discharge with an environmentally controlled release through a stack 155. It should be appreciated that it is not always necessary to first pass contaminated gaseous source 150 through one or more pre-fluidized bed filters 151; however, application specific requirements may dictate the need for one or more pre-fluidized bed filters 151.

Fluidized bed 152 has a reverse venturi shape, which has a specific length L to diameter D size ratio of between 2.9:1 as a minimum and 9.8:1 as a maximum. This ratio is optimized for extended residence flow time of contaminated gaseous source 150 in fluidized bed 152, which is filled with specialized sorbent such as reactive material 164. Reactive material 164 is a sorbent comprised of a copper, zinc, tin, sulfur (CZTS) compound and/or an alloy thereof. The preferred exemplary length L to diameter D ratio for fluidized bed 152 is 4.4:1, which has been determined through trial and error testing.

Preferably, the fluidized bed 152 has a predominately round cross section. While not shown in FIG. 24, one or more of the various baffles and/or other application specific flow restriction obstacles disclosed herein can be incorporated into the fluidized bed 152. Fluidized bed 152 also features predominately outward extending convex ends 168 and 169 to promote extended residence flow time with minimized turbulent flow through reactive material 164. As contaminated gaseous source 150 flow enters fluidized bed 152 at entry port 165, intimate contact with reactive material 164 is initiated, resulting in random non-turbulent flow 166. Random non-turbulent flow 166 is turned back upon itself due to predominately outward extending convex ends 168 and 169, resulting in extended residence time in fluidized bed 152 before the non-turbulent flow 166 exits from fluidized bed 152 through exit port 167. Reactive material 164 promotes random non-turbulent flow 166, which is a randomized torturous flow path for contaminated gaseous source 150. It should be appreciated that length L of the fluidized bed 152 is not inclusive of the convex ends 168 and 169.

Figure 33:
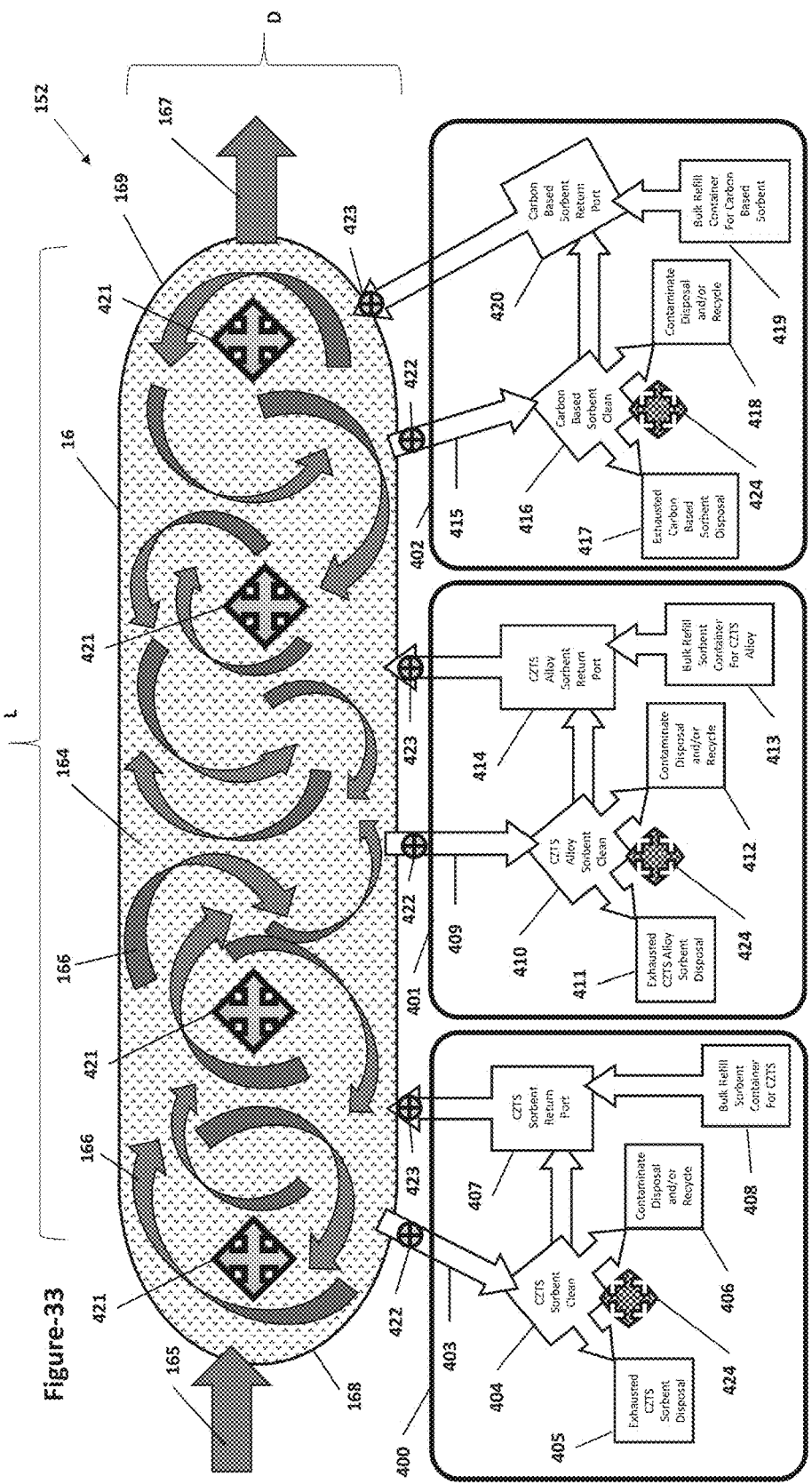
FIG. 33 is a flow diagram illustrating extended non-turbulent emissions flow through an exemplary reverse venturi shaped fluidized bed apparatus and exemplary method steps for cleaning and recycling the sorbent that separates the contaminates from the emissions by using a series of sorbent treatment subsystems for CZTS sorbents, CZTS-Alloy sorbents, and/or carbon-based sorbents.

Fluidized bed 152 has a side outlet port 170 leading to a sorbent cleaning station 156. Sorbent cleaning station 156 has an option to remove exhausted sorbent 157 from the system for disposal. In addition, captured contaminated elements 158 captured from contaminated gaseous source 150 by reactive material 164 and separated from reactive material 164 in sorbent cleaning station 156 can be disposed and/or recycled. Sorbent cleaning station 156 returns cleaned reactive material 164 back to fluidized bed 152 through sorbent return port 159. Bulk refill sorbent container 168 provides a makeup volume of reactive material 164 as necessary to replace removed exhausted sorbent 157. System discharge 154 provides a gaseous discharge through an environmentally controlled release out of exhaust stack 155. Additional discharge of captured waste 160 may also be provided by additional sorbent treatment subsystems (FIG. 33).

Figure 23:
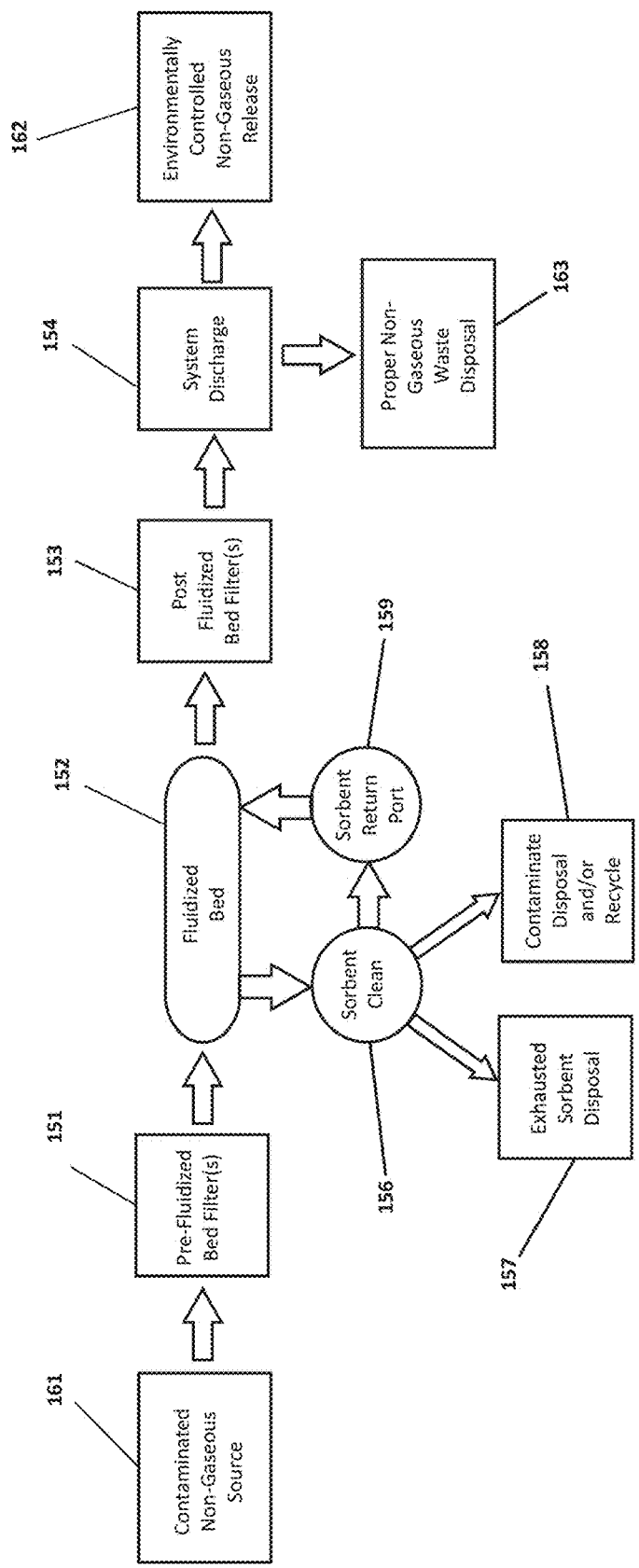
FIG. 23 is block flow diagram illustrating an exemplary method of using a reverse venturi shaped fluidized bed apparatus to remove contaminates from non-gaseous emissions and clean the reactive material that separates the contaminates from the non-gaseous emissions.

Referring to FIG. 23 and FIG. 24, an exemplary method of emissions control is illustrated with contaminated non-gaseous source 161 introduced into the system through one or more pre-fluidized bed filters 151, through fluidized bed 152, through one or more post fluidized bed filters 153, and through a system discharge 154, which releases the non-gaseous discharge with an environmentally controlled release 162. It should be appreciated that it is not always necessary to first pass contaminated non-gaseous source 161 through one or more pre-fluidized bed filters 151; however, application specific requirements may dictate the need for one or more pre-fluidized bed filters 151.

Fluidized bed 152 has a reverse venturi shape which has a specific length L to diameter D size ratio of between 2.9:1 as a minimum and 9.8:1 as a maximum, which is optimized for extended residence flow time of contaminated non-gaseous source 161 in fluidized bed 152, which is filled with specialized sorbent such as reactive material 164. Reactive material 164 is a sorbent comprised of a copper, zinc, tin, sulfur (CZTS) compound and/or an alloy thereof. The preferred exemplary length L to diameter D ratio for fluidized bed 152 is 4.4:1, which has been determined through trial and error testing.

Preferably, the fluidized bed 152 also features predominately outward extending convex ends 168 and 169 to promote extended residence flow time with minimized turbulent flow through reactive material 164. As contaminated non-gaseous source 161 flow enters fluidized bed 152 at entry port 165, intimate contact with reactive material 164 is initiated, resulting in random non-turbulent flow 166. Random non-turbulent flow 166 is turned back upon itself due to predominately outward extending convex ends 168 and 169 resulting in extended residence time in fluidized bed 152 before exiting from fluidized bed 152 through exit port 167. Reactive material 164 promotes random non-turbulent flow 166, which is a randomized torturous flow path for contaminated non-gaseous source 161. It should be appreciated that length L of the fluidized bed 152 is not inclusive of the convex ends 168 and 169.

Preferably, the fluidized bed 152 has a predominately round cross section. While not shown in FIG. 24, one or more of the various baffles and/or other application specific flow restriction obstacles disclosed herein can be incorporated into the fluidized bed 152. Fluidized bed 152 has a side outlet port 170 leading to a sorbent cleaning station 156. Sorbent cleaning station 156 has an option to remove exhausted sorbent 157 from the system for disposal. In addition, captured contaminated elements 158 captured from contaminated non-gaseous source 161 by reactive material 164 and separated from reactive material 164 in sorbent cleaning station 156 can be disposed and/or recycled. Sorbent cleaning station 156 provides return to cleaned reactive material 164 back to fluidized bed 152 through sorbent return port 159. Bulk refill sorbent container 168 provides makeup volume of reactive material 164 as necessary to replace removed exhausted sorbent 157. System discharge 154 provides a non-gaseous discharge through an environmentally controlled release 162. Additional discharge of captured waste 163 is also provided.

Figure 25:
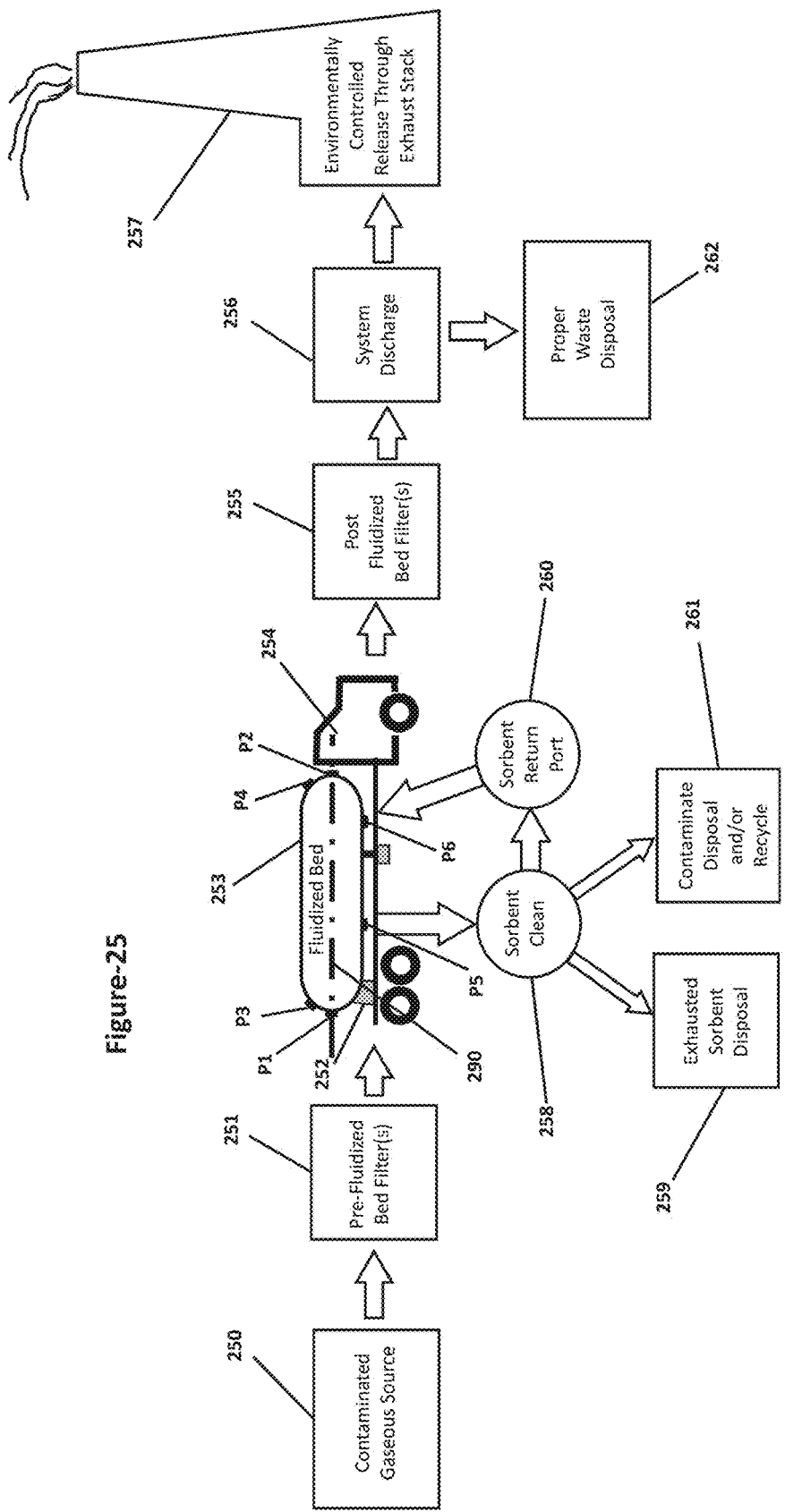
FIG. 25 is block flow diagram illustrating an exemplary method using a reverse venturi shaped fluidized bed apparatus with a tilting mechanism mounted to a transportable platform deck where the housing of the reverse venturi shaped fluidized bed apparatus is oriented relatively parallel to the platform deck in order to remove contaminates from gaseous emissions.

Referring to FIG. 25, an exemplary method is shown for passing contaminated gaseous emissions 250 through one or more pre-filters 251, through the fluidized bed 253, through one or more post filters 255, through system discharge 256, and finally released as a controlled release gaseous emission through exhaust stack 257 and/or through a waste disposal process 262. The fluidized bed 253 is bisected by longitudinal plane 290. Entry port P3 and exit port P4 are configured to receive and discharge the gaseous emissions when the fluidized bed 253 is positioned with longitudinal plane 290. Obstructions (not shown) interior to fluidized bed 253 provide a preferred torturous flow path particularly well suited for gaseous emissions when introduced through entry port P3 and discharged through exit port P4. The entry port P3 and the exit port P4 are positioned above the longitudinal plane 290 of the fluidized bed 253.

As shown in FIG. 25, the fluidized bed 253 can be mounted on truck 254 and is configured to tilt the fluidized bed 253 about a pivot point 252. When gaseous emissions are to be processed in the fluidized bed 253, the longitudinal plane 290 of the fluidized bed 253 is substantially horizontal. Sorbent cleaning station 258 is provided in fluid communication with outlet port P5 of the fluidized bed 253, where contaminated particles captured by the sorbent are removed. Removed contaminates can be recycled or disposed of through station 261. Exhausted Sorbent is disposed of through station 259 and the cleaned sorbent is recycled back to the fluidized bed 253 through return port P6 from sorbent return port 260.

Figure 26:
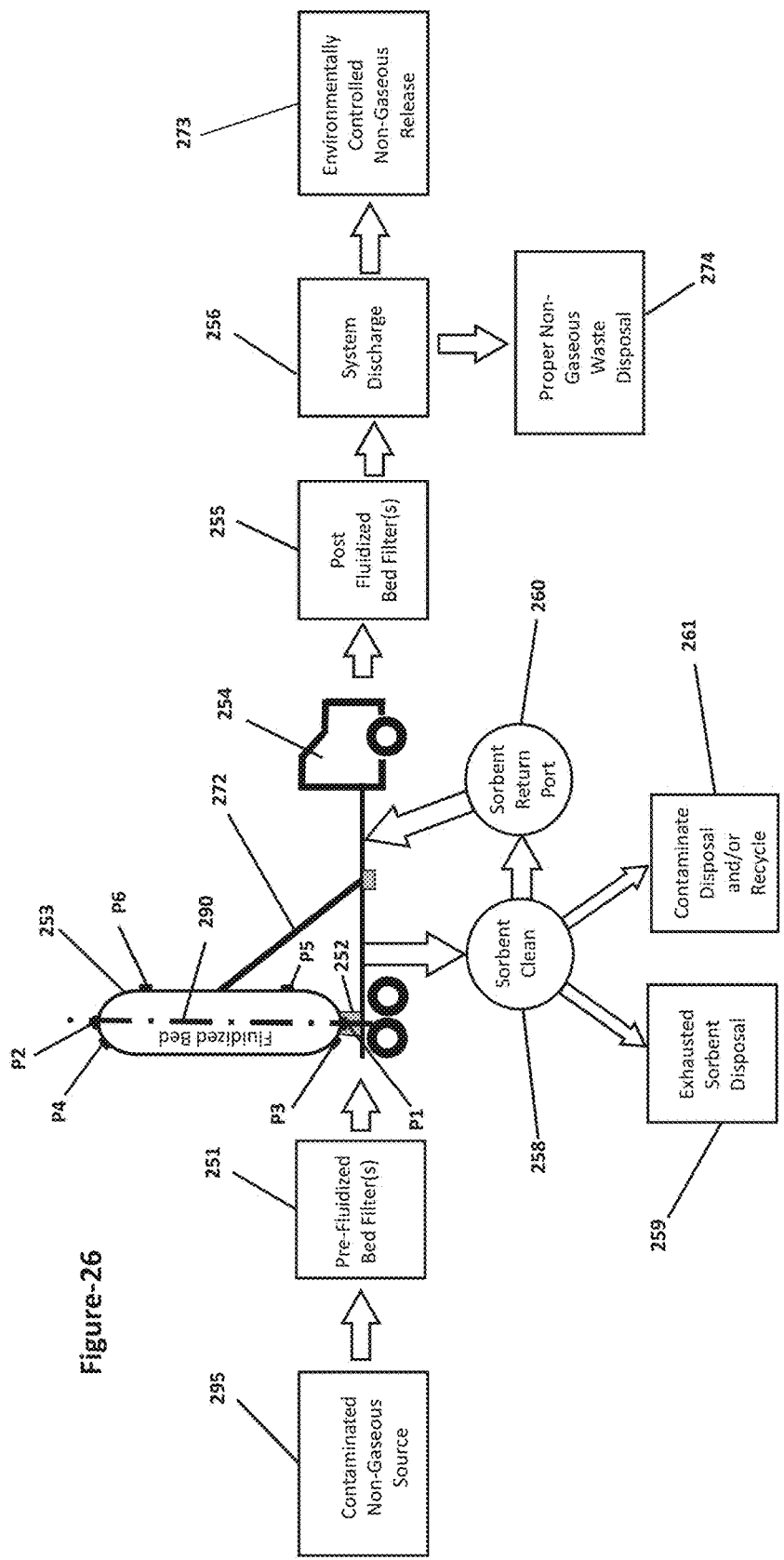
FIG. 26 is block flow diagram illustrating an exemplary method using a reverse venturi shaped fluidized bed apparatus with a tilting mechanism mounted to a transportable platform deck where the housing of the reverse venturi shaped fluidized bed apparatus is oriented relatively transverse to the platform deck in order to remove contaminates from non-gaseous emissions.

Referring to FIG. 26, an exemplary method is shown for passing contaminated non-gaseous emissions 295 through one or more pre-filters 251, through the fluidized bed 253, through one or more post filters 255, through system discharge 256, and finally released as a controlled environmental non-gaseous release 273 and/or through a waste disposal process 274. Entry port P2 and exit port P1 are configured to receive and discharge the non-gaseous emissions. Obstructions (not shown) interior to fluidized bed 253 provide a preferred torturous flow path particularly well suited for non-gaseous emissions when introduced through entry port P2 and exit port P1. The entry port P2 and the exit port P1 are bisected by the longitudinal plane 290 of the fluidized bed 253 (i.e. are aligned with longitudinal plane 290 of the fluidized bed 253).

When non-gaseous emissions are to be processed in the fluidized bed 253, the longitudinal plane 290 of the fluidized bed 253 is substantially vertical. Sorbent cleaning station 258 is provided in fluid communication with outlet port P5 of the fluidized bed 253, where contaminated particles captured by the sorbent are removed. Removed contaminates can be recycled or disposed of through station 261. Exhausted Sorbent is disposed of through station 259 and the cleaned sorbent is recycled back to the fluidized bed 253 through return port P6 from sorbent return port 260.

Referring to FIG. 27, a matrix is shown wherein the disclosed preferred reactive CZTS Alloy sorbents 341 are compared to other sorbents, including Activated Carbon 342 and Zeolite 343. Contaminates 367 are listed as predominate types, including Nitrogen 368, Phosphates 369, Heavy Metals 370, Sulfur 371, Mercury 372, and Selenate 373. Contaminates 367 are further listed with each sorbent enumerated in gaseous emissions 344, 346, and 348 compared to non-gaseous emissions 345, 347, and 349.

The reactive CZTS Alloy sorbents 341 are confirmed by testing to be effective in the capture and removal of contaminates 367 in gaseous 344 emissions and/or non-gaseous 345 emissions. In contrast, Activated Carbon 342 is not effective in the capture or removal of contaminates 367 in gaseous emissions 346 and/or non-gaseous emissions 347. Similarly, Zeolite 343 is not effective in the capture or removal of contaminates 367 in gaseous emissions 348 and/or non-gaseous emissions 349.

Referring to FIG. 28, an expanded list of sorbents is shown including the reactive CZTS Alloy sorbents 351 of the subject disclosure and other sorbents, including Caustics 350, Ferric Oxide 355, and Zeolite 356. The reactive CZTS Alloy sorbents 351 include a CZTS Alloy of Sulfur (S) 352, a CZTS Alloy of Selenate (S) 353, and a CZTS Alloy of Ferrous Oxide 354. The CZTS Alloy sorbents 351 collectively react effectively with the following groups of contaminates: Selenate 357, Total Ionized Sulfurs 358, Total Ionized Nitrogens 359, and Total Ionized Phosphates 360. The reactive CZTS Alloy sorbents 351 are able to capture and remove these contaminates from both gaseous and non-gaseous emissions.

In contrast, Caustics 350 are only effective with Total Ionized Sulfurs 358. Ferric Oxide 355 is only effective with Selenate 357 and has very slow reactive characteristics with Total Nitrogens 359 and Total Ionized Phosphates 360 (and work with non-gaseous emissions only). Zeolite 356 is only effective with Total Ionized Nitrogens 359 and Total Ionized Phosphates 360. As a result, known sorbents such as Caustics 350, Ferric Oxide 355, and Zeolite 356 have limited effective characteristics compared to the broad-spectrum characteristics of the reactive CZTS Alloy sorbents 351 disclosed herein. Even when known sorbents have a level of effectiveness, they all fall short of the effectiveness level of the reactive CZTS Alloy sorbents 351 disclosed herein.

Referring to FIG. 29, matrix 364 shows the capability of prior art sorbents 365 to be post processed after being used in emissions control systems to capture and remove contaminates 367 including Nitrogens 368, Phosphorous 369, Heavy Metals 370, Sulfurs 371, Mercury 372, and Selenates 373. The capability to separate these contaminates 367 from the prior art sorbent in gaseous emissions 374 and/or non-gaseous emissions 375 is very poor and virtually non-existent except for Nitrogens 368 in gaseous emissions 374. Similarly, matrix 364 shows the capability to reuse the prior art sorbents 366 after separation of contaminates 367 is also virtually non-existent except for gaseous emissions 376 containing Nitrogens 368.

Referring to FIG. 30, matrix 378 shows the capability of the reactive CZTS Alloy sorbents 339 disclosed herein to be post processed after being used in emissions control systems capturing and removing contaminates 367 including Nitrogens 368, Phosphorous 369, Heavy Metals 370, Sulfurs 371, Mercury 372, and Selenates 373. The capability to separate contaminates 367 in gaseous emissions 374 and/or non-gaseous emissions 375 from the disclosed reactive CZTS Alloy sorbents 339 is particularly advantageous because it means the contaminates 367 can be more readily disposed of or recycled and because the reactive CZTS Alloy sorbents 339 can be reused in emissions control systems (as shown in matrix 378). Specifically, matrix 378 shows the capability to reuse the reactive CZTS Alloy sorbents 340 disclosed herein after they are separated from contaminates 367 in gaseous emissions 376 and non-gaseous emissions 377.

Figure 31:
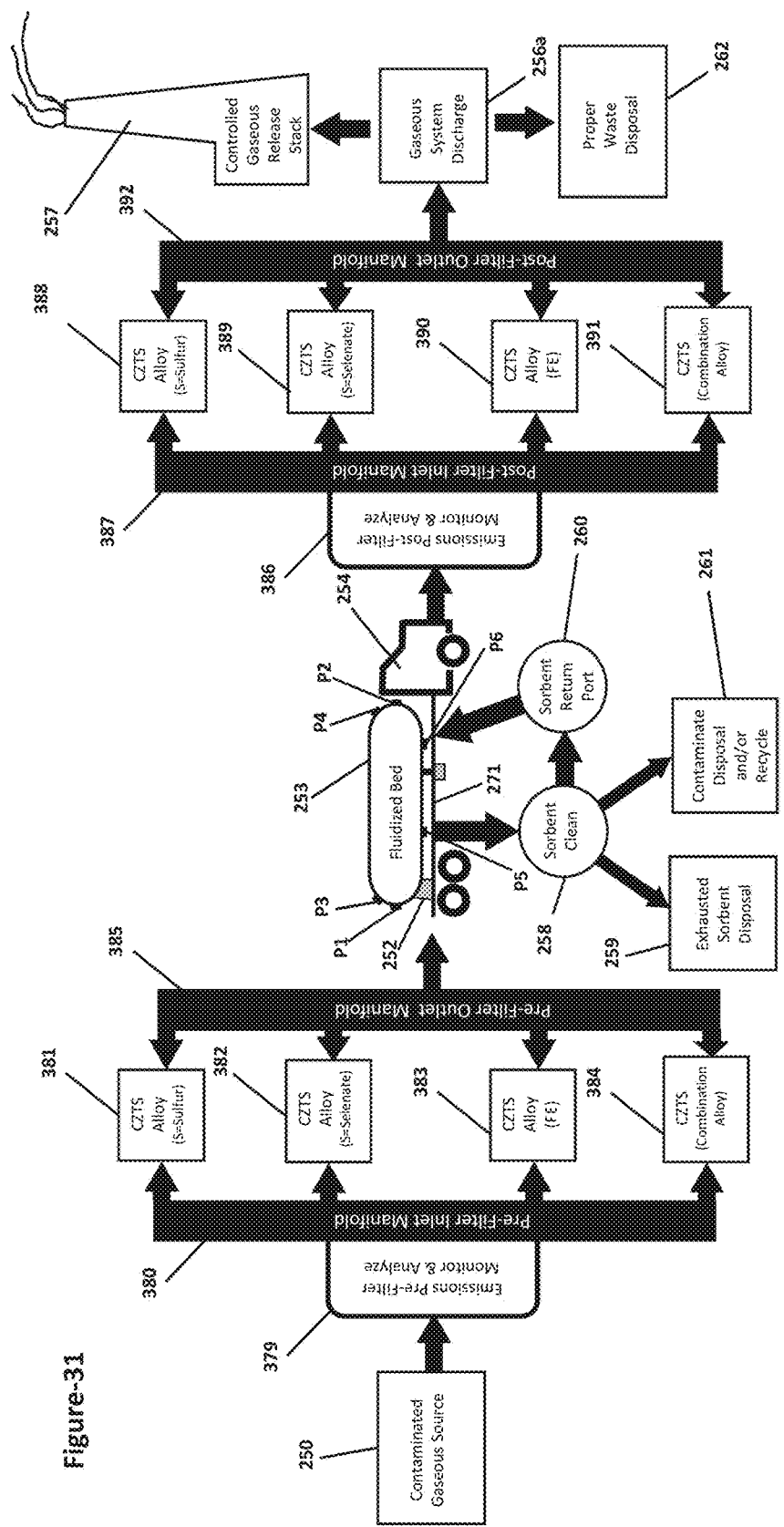
FIG. 31 is a block diagram showing a method routing contaminated gaseous emissions through different filters containing specific effective sorbents that match the types and/or levels of contaminates resident in the gaseous emissions.

Referring to FIG. 31, a block diagram shows a system and method for removing contaminates from gaseous emissions 250. Gaseous emissions 250 are monitored and analyzed in step 379 to determine the types and levels of contaminates in the gaseous emissions 250. Monitoring can be systematic intermittent spot checks at periodic intervals or continuous in-line monitoring and analysis. Based on the types and/or levels of contaminates resident in the gaseous emission 250 determined by step 379, emissions flow is routed through pre-filter inlet manifold 380 so that the gaseous emissions 250 are further routed through appropriate pre-filters 381, 382, 383, and/or 384. Selection of the appropriate pre-filters 381, 382, 383, and/or 384 is accomplished through the selection method illustrated in FIG. 28.

The pre-filters shown in FIG. 31 are filled with the reactive CZTS Alloy sorbents 351 shown in FIG. 28. For example, pre-filter 381 is filled with the CZTS Alloy of Sulfur (S) 352 shown in FIG. 28. Pre-filter 382 is filled with the CZTS Alloy of Selenate (S) 353 shown in FIG. 28. Pre-filter 383 is filled with the CZTS Alloy of Ferrous Oxide 354 shown in FIG. 28. Pre-filter 384 is filled with a combination of CZTS Alloy sorbents 352, 353, and/or 354. Additional pre-filters can be added to pre-filter inlet manifold 380, each filled with a different combination of CZTS Alloy sorbents 352, 353, and/or 354, combined to effectively treat specific levels and/or types of contaminates resident in gaseous emissions 250.

After contaminated gaseous emissions 250 are routed through appropriate pre-filters, pre-filter outlet manifold 385 routes emissions into fluidized bed 253. For gaseous emissions 250, the housing of the fluidized bed 253 is arranged in an orientation that is substantially parallel to platform 271. Contaminates are separated from the sorbent in step 258 and returned to the fluidized bed 253 through sorbent return port 260.

After gaseous emissions 250 exit fluidized bed 253, post-filter monitoring step 386 determines the new levels and/or types of contaminates remaining in the gaseous emissions 250 and routes the gaseous emissions 250 through post-filter inlet manifold 387. Selection of the appropriate post-filters 388, 389, 390, and/or 391 is accomplished through the selection method illustrated in FIG. 28. The post-filters shown in FIG. 31 are filled with the reactive CZTS Alloy sorbents 351 shown in FIG. 28. For example, post-filter 388 is filled with the CZTS Alloy of Sulfur (S) 352 shown in FIG. 28. Post-filter 389 is filled with the CZTS Alloy of Selenate (S) 353 shown in FIG. 28. Post-filter 390 is filled with the CZTS Alloy of Ferrous Oxide 354 shown in FIG. 28. Post-filter 391 is filled with a combination of CZTS Alloy sorbents 352, 353, and/or 354. Post-filter outlet manifold 392 routes the gaseous emissions 250 to gaseous system discharge 256a where some of the gaseous emissions 250 are expelled through controlled gaseous release stack 257 and some of the gaseous emissions 250 are expelled through a proper waste disposal step 262.

Additional post-filters can be added to post-filter inlet manifold 387, each filled with a different combination of CZTS Alloy sorbents 352, 353, and/or 354, combined to effectively treat specific levels and/or types of contaminates resident in gaseous emissions 250.

All the pre-filters 381, 382, 383, 384 and post-filters 388, 389, 390, 391 can be separately routed through sorbent cleaning step 258 and sorbent return port 260. Step 258 includes separating contaminates from the CZTS Alloy sorbents 351 so that the contaminates can be recycled and/or properly collected for disposal 261. Any exhausted CZTS Alloy sorbent 351 can be disposed through disposal step 259. Replacement of specific CZTS Alloy sorbents 351 to each specific pre-filter 381, 382, 383, 384 and/or post-filter 388, 389, 390, 391 may be implemented after step 258. Specific routing diagrams and/or schematics for routing sorbent from the pre-filters 381, 382, 383, 384 and/or post-filters 388, 389, 390, 391 to and from the sorbent cleaning step 258 is not shown.

Figure 32:
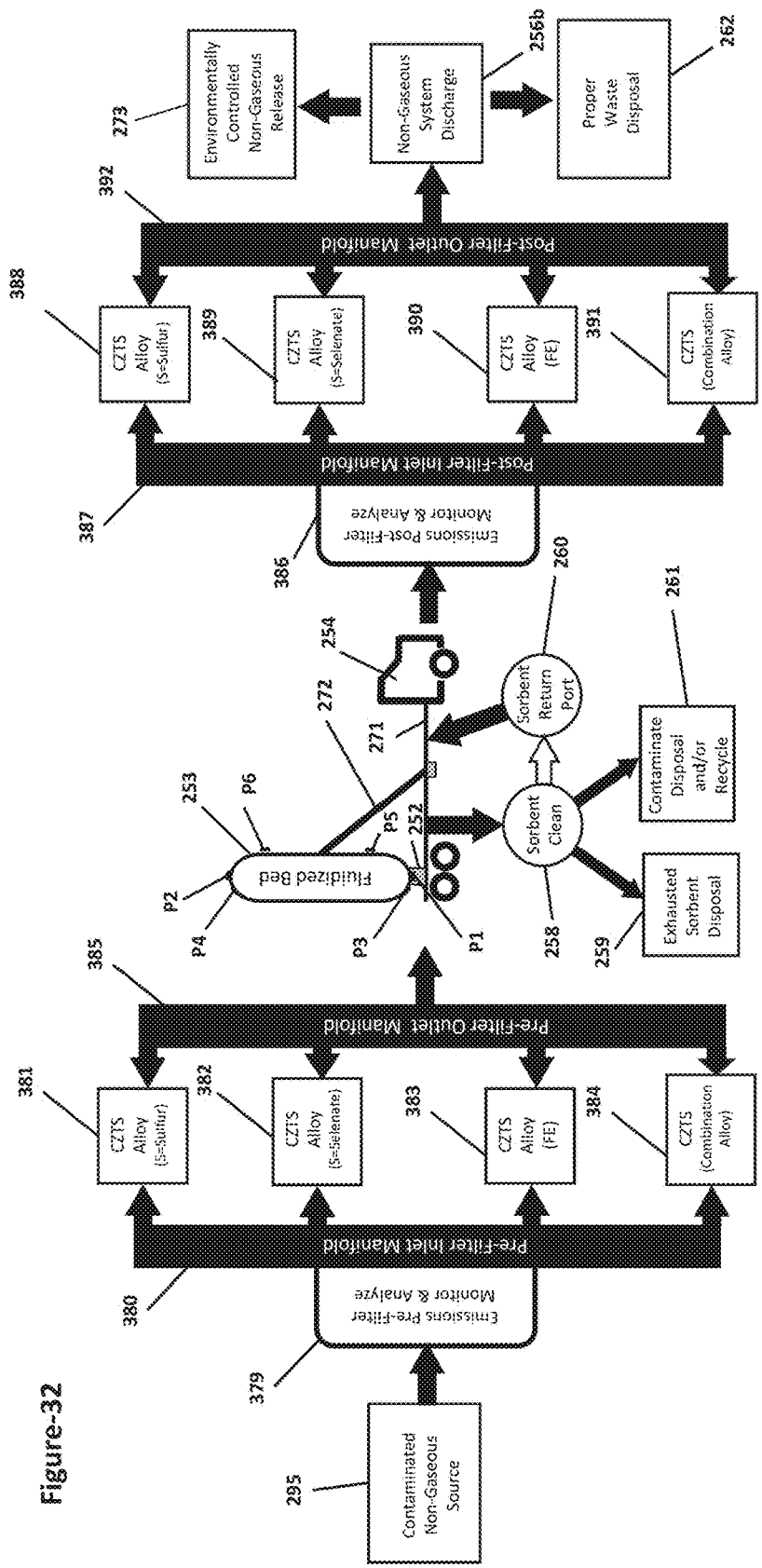
FIG. 32 is a block diagram showing a method routing contaminated non-gaseous emissions through different filters containing specific effective sorbents that match the types and/or levels of contaminates resident in the non-gaseous emissions.

Referring to FIG. 32, a block diagram shows a system and method for removing contaminates from non-gaseous emissions 295. Non-gaseous emissions 295 are monitored and analyzed in step 379 to determine the types and levels contaminates in the non-gaseous emissions 295. Monitoring can be systematic intermittent spot checks at periodic intervals and/or continuous in-line monitoring and analysis. Based on the types and/or levels of contaminates resident in the non-gaseous emission 295 determined by step 379, emissions flow is routed through pre-filter inlet manifold 380 so that the non-gaseous emissions 295 are further routed through appropriate pre-filters 381, 382, 383, and/or 384. Selection of the appropriate pre-filters 381, 382, 383, and/or 384 is accomplished through the selection method illustrated in FIG. 28.

The pre-filters shown in FIG. 32 are filled with the reactive CZTS Alloy sorbents shown in FIG. 28. For example, pre-filter 381 is filled with the CZTS Alloy of Sulfur (S) 352 shown in FIG. 28. Pre-filter 382 is filled with the CZTS Alloy of Selenate (S) 353 shown in FIG. 28. Pre-filter 383 is filled with the CZTS Alloy of Ferrous Oxide 354 shown in FIG. 28. Pre-filter 384 is filled with a combination of CZTS Alloy sorbents 352, 353, and/or 354. Additional pre-filters can be added to pre-filter inlet manifold 380, each filled with a different combination of CZTS Alloy sorbents 352, 353, and/or 354, combined to effectively treat specific levels and/or types of contaminates resident in non-gaseous emissions 295.

After contaminated non-gaseous emissions 295 are routed through appropriate pre-filters, pre-filter outlet manifold 385 routes emissions into fluidized bed 253. For non-gaseous emissions 295, the housing of the fluidized bed 253 is arranged in an orientation that is substantially perpendicular to platform 271. Contaminates are separated from the sorbent in step 258 and returned to the fluidized bed 253 through sorbent return port 260.

After non-gaseous emissions 295 exit fluidized bed 253, post-filter monitoring step 386 determines the new levels and/or types of contaminates remaining in the non-gaseous emissions 295 and routes the non-gaseous emissions 295 through post-filter inlet manifold 387. Selection of the appropriate post-filters 388, 389, 390, and/or 391 is accomplished through the selection method illustrated in FIG. 28. The post-filters shown in FIG. 32 are filled with the reactive CZTS Alloy sorbents 351 shown in FIG. 28. For example, post-filter 388 is filled with the CZTS Alloy of Sulfur (S) 352 shown in FIG. 28. Post-filter 389 is filled with the CZTS Alloy of Selenate (S) 353 shown in FIG. 28. Post-filter 390 is filled with the CZTS Alloy of Ferrous Oxide 354 shown in FIG. 28. Post-filter 391 is filled with a combination of CZTS Alloy sorbents 352, 353, and/or 354. Post-filter outlet manifold 392 routes the non-gaseous emissions 295 to non-gaseous system discharge 256b where some of the non-gaseous emissions 295 are expelled through environmentally controlled non-gaseous release 273 and some of the non-gaseous emissions 295 are expelled through a proper waste disposal step 262. Additional post-filters can be added to post-filter inlet manifold 387, each filled with a different combination of CZTS Alloy sorbents 352, 353, and/or 354, combined to effectively treat specific levels and/or types of contaminates resident in non-gaseous emissions 295.

All the pre-filters 381, 382, 383, 384 and post-filters 388, 389, 390, 391 can be separately routed through sorbent cleaning step 258 and sorbent return port 260. Step 258 includes separating contaminates from the CZTS Alloy sorbents 351 so that the contaminates can be recycled and/or properly collected for disposal 261. Any exhausted CZTS Alloy sorbents 351 can be disposed through disposal step 259. Replacement of specific CZTS Alloy sorbents 351 to each specific pre-filter 381, 382, 383, 384 and/or post-filter 388, 389, 390, 391 may be implemented after step 258.

Specific routing diagrams and/or schematics for routing sorbent from the pre-filters 388, 389, 390, 391 and/or post-filters 388, 389, 390, 391 to and from the sorbent cleaning step 258 is not shown.

Referring to FIG. 33, an exemplary emission control system is illustrated. Contaminated emissions are introduced into fluidized bed 152 via entry port 165. It should be appreciated that the emissions may first pass through one or more pre-fluidized bed filters 151 (FIGS. 22 and 23) depending on application specific requirements.

The fluidized bed 152 has a housing 16 with a reverse venturi shape, which has a specific length L to diameter D size ratio of between 2.9:1 as a minimum and 9.8:1 as a maximum. This ratio is optimized for extended residence flow time of contaminated emissions in fluidized bed 152, which is filled with specialized reactive material 164, which includes one or more sorbents. The preferred exemplary length L to diameter D ratio for fluidized bed 152 is 4.4:1, which has been determined through trial and error testing. One or more exemplary fluidized beds 152 can be linked in series or in parallel as may be required for application specific requirements.

Preferably, the fluidized bed 152 has a predominately round cross section. While not shown in FIG. 33, one or more of the various baffles and/or other application specific flow restriction obstacles disclosed herein can be incorporated into the fluidized bed 152. Fluidized bed 152 also features predominately outward extending convex ends 168, 169 to promote extended residence flow time with minimized turbulent flow through reactive material 164. As the contaminated emissions flow enters fluidized bed 152 at entry port 165, intimate contact with reactive material 164 is initiated, resulting in random non-turbulent flow 166. Random non-turbulent flow 166 is turned back upon itself due to the predominately outward extending convex ends 168, 169, resulting in extended residence time in fluidized bed 152 before the non-turbulent flow 166 exits from fluidized bed 152 through exit port 167. Reactive material 164 promotes random non-turbulent flow 166, which is a randomized torturous flow path for contaminated emissions. It should be appreciated that length L of the fluidized bed 152 is not inclusive of the convex ends 168, 169.

Fluidized bed 152 includes at least one monitoring sensor station 421 (i.e., a first monitoring sensor) that provides data, status, and feedback on the operating parameters. Monitoring sensor station(s) 421 are equipped to monitor emission flow levels, pressure, velocity, temperature, and many other relevant parameters associated with the emissions control system. Based on feedback information, some automatic adjustments can be made by the equipment, while other process and/or system parameters may require manual adjustments. Monitoring sensor stations 421 provide information about the efficiency of the sorbent inside fluidized bed 152 and help determine when it is time to clean and/or rejuvenate the sorbent.

In an exemplary embodiment of the subject disclosure, fluidized bed 152 has at least one side outlet port 403, 409, 415 leading to sorbent treatment subsystems 400, 401, 402 respectively. The sorbent treatment subsystems 400, 401, 402 shown in FIG. 33 are positioned external to fluidized bed 152, but alternatively, they can be installed inside fluidized bed 152.

Fluidized bed 152 includes at least one closed loop sorbent exit port monitoring sensor station 422 and at least one closed loop sorbent return port monitoring sensor station 423 that provide data, status, and feedback on the operating parameters. Monitoring sensor station 422 is configured to monitor emission flow levels, pressure, velocity, temperature, and many other relevant parameters associated with the emissions control system. Based on feedback information, some automatic adjustments can be made using programmable equipment, while other process and/or system parameters may require manual adjustments. Monitoring sensor 423 identifies sorbent conditions as the sorbent passes through one of the exit ports 403, 409, or 415 and into subsystem 400, 401, or 402 respectively. Monitoring sensor station 423 is configured to monitor emission flow levels, pressure, velocity, temperature, and many other relevant parameters associated with the emissions control system.

Based on feedback information, some automatic adjustments can be made using programmable equipment, while other process and/or system parameters may require manual adjustments. Monitoring sensor 423 identifies sorbent conditions as it passes through one of the return ports 407, 414, or 420 of subsystem 400, 401, or 402 respectively after cleaning and/or rejuvenation. Monitoring sensor station 424 (i.e., a second monitoring sensor) is configured to monitor emission flow levels, pressure, velocity, temperature, and many other relevant parameters associated with the emissions control system. Based on feedback information, some automatic adjustments can be made using programmable equipment, while other process and/or system parameters may require manual adjustments. Monitoring sensor 424 monitors conditions and resulting volume of sorbent as it is processed in station 404, 410, or 416 within subsystem 400, 401, or 402 respectively as the cleaning and/or rejuvenation process occurs. Monitoring sensors 421, 422, 423, 424 are configured to cooperate with each other and provide process conditions and/or parameter adjustments to establish and maintain consistency and optimum sorbent efficiency at each station in the emissions control system. Monitoring of sorbent within subsystems 400, 401, 402 will determine when and how much makeup sorbent is required from station 408, 413, and 419 respectively.

In another exemplary embodiment (not shown), cleaning and/or rejuvenation subsystems are installed and configured internal to fluidized bed 152. In this configuration, the monitoring sensors 421, 422, 423, 424 and functions of the sorbent recycling subsystems 400, 401, 402 occur internal of the fluidized bed 152.

Still referring to FIG. 33, when fluidized bed 152 is filled with reactive material 164 comprised of CTZS sorbent, then sorbent treatment subsystem 400 is used to maintain optimum process conditions for the CZTS sorbent. Sorbent discharge port 403 allows transfer of sorbent into sorbent treatment station 404. The sorbent treatment station 404 in subsystem 400 includes one or more chemical reagents that separate contaminants from the CZTS sorbent as part of a cleaning and rejuvenation process. By way of non-limiting example, the chemical reagents used in the sorbent treatment station 404 may be selected from a group of fatty alcohols. Spent and/or exhausted CZTS sorbent can be disposed of through sorbent disposal station 405. Emission contaminants removed from emissions can be recycled back into various industries through contaminant disposal port 406. Bulk refill station 408, such as a container of new/fresh sorbent, provides a makeup supply of CZTS sorbent that replaces the sorbent that has been removed and/or lost during the removal of contaminants from emissions. CZTS sorbent return port 407 completes a closed loop back into fluidized bed 152.

When fluidized bed 152 is filled with reactive material 164 comprised of CTZS-Alloy sorbent, then sorbent treatment subsystem 401 is used to maintain optimum process conditions for the CZTS-Alloy sorbent. Sorbent discharge port 409 allows transfer of sorbent into sorbent treatment station 410. The sorbent treatment station 410 in subsystem 401 includes one or more chemical reagents that separate contaminants from the CZTS-Alloy sorbent as part of a cleaning and rejuvenation process. By way of non-limiting example, the chemical reagents used in the sorbent treatment station 410 may be selected from a group of fatty alcohols. Spent and/or exhausted CZTS-Alloy sorbent can be disposed of through station 411. Emission contaminants removed from emissions can be recycled back into various industries through contaminant disposal port 412. Bulk refill station 413 provides a makeup supply of CZTS-Alloy sorbent that replaces the sorbent that has been removed and/or lost during the removal of contaminants from emissions. CZTS-Alloy sorbent return port 414 completes a closed loop back into fluidized bed 152.

When fluidized bed 152 is filled with reactive material 164 comprised of carbon-based sorbent, then sorbent treatment subsystem 402 is used to maintain optimum process conditions for the carbon-based sorbent. Sorbent discharge port 415 allows transfer of sorbent into sorbent treatment station 416. The sorbent treatment station 416 in subsystem 402 includes one or more chemical reagents that separate contaminants from the carbon-based sorbent as part of a cleaning and rejuvenation process. By way of non-limiting example, the chemical reagents used in the sorbent treatment station 416 may be solvents such as Methyl Ethyl Ketone, Methylene Chloride, and/or Methanol. Spent and/or exhausted carbon-based sorbent can be disposed of through sorbent disposal station 417. Emission contaminants removed from emissions can be recycled back into various industries through contaminant disposal port 418. Bulk refill station 419 provides a makeup supply of carbon-based sorbent that replaces the sorbent that has been removed and/or lost during the removal of contaminants from emissions. Carbon-based sorbent return port 420 completes a closed loop back into fluidized bed 152.

According to one exemplary embodiment of the subject disclosure, and as shown in FIG. 33, fluidized bed 152 can be a single unit with one or more sorbent treatment subsystems 400, 401, 402 configured for one or more sorbents. According to another exemplary embodiment (not shown), multiple fluidized beds 152 can be configured in series with each other, where each fluidized bed 152 is configured for one or more sorbent treatment subsystems 400, 401, 402. According to another exemplary embodiment (not shown), multiple fluidized beds 152 can be configured in parallel with each other, where each fluidized bed 152 is configured for one or more sorbent treatment subsystems 400, 401, 402.

Monitoring sensors 421, 422, 423, 424 are just a few non-exhaustive examples of measuring equipment that can be applied to the emissions control system. Those skilled in the art will appreciate that there may be many additional types of monitoring sensors located in many other stations of the emissions control system which have not been shown in the illustrated embodiments. The specific monitoring sensors used for gaseous contaminated emissions may be different than the specific monitoring sensors used for non-gaseous contaminated emissions. Similarly, the monitoring sensors required for one type of contaminant may be different than the monitoring sensors required for another contaminant.

In accordance with another aspect of the subject disclosure, an emissions control method is disclosed for removing contaminants from emissions. The method, which is illustrated in FIG. 33, includes the steps of routing the emissions into a treatment system comprised of a reverse venturi shaped fluidized bed apparatus 152 containing one or more sorbents that chemically binds with contaminants carried in the emissions and routing the emissions away from the reverse venturi shaped fluidized bed apparatus 152 after the contaminants bind to the sorbents. In accordance with this method, the sorbent(s) is/are selected from a group of materials comprising: copper, zinc, tin, sulfur (CZTS) sorbents, copper, zinc, tin, sulfur (CZTS) alloy sorbents, and carbon-based sorbents. The method also includes the step of routing the sorbent through one or more sorbent treatment subsystems 400, 401, 402 for cleaning and rejuvenation. This step includes separating spent and exhausted sorbent from the sorbent routed through the sorbent treatment subsystem(s) 400, 401, 402, disposing of the spent and exhaust sorbent, separating contaminants from the sorbent routed through the sorbent treatment subsystem(s) 400, 401, 402, disposing of or recycling the contaminants, and returning the recycled sorbent to the reverse venturi shaped fluidized bed apparatus 152. Optionally, the method may include the step of routing new sorbent to the reverse venturi shaped fluidized bed apparatus 152 to replace the spent and exhaust sorbent.

In embodiments where the reverse venturi shaped fluidized bed apparatus 152 includes multiple sorbent treatment subsystems 400, 401, 402, the method may further include the steps of: maintaining different sorbents separate from one another in the reverse venturi shaped fluidized bed apparatus 152, detecting at least one process parameter of the reverse venturi shaped fluidized bed apparatus with one or more monitoring sensors 421, 422, 423, 424, routing the emissions through one or more of the different sorbents based on the at least one process parameter detected by the monitoring sensor(s) 421, 422, 423, 424, and then routing the different sorbents through different sorbent treatment subsystems 400, 401, 402 that are dedicated to processing a particular type of sorbent. For example, in the illustrated embodiment, copper, zinc, tin, sulfur (CZTS) sorbents are routed through first sorbent treatment subsystem 400, copper, zinc, tin, sulfur (CZTS) alloy sorbents are routed through second sorbent treatment subsystem 401, and carbon-based sorbents are routed through third sorbent treatment subsystem 402.

One type of carbon-based sorbent, known as activated carbon, is generally manufactured from substances such as coal or coke. Another type of carbon-based sorbent, known as biochar, is generally manufactured from one of many organic substances such as wood, sugar bagasse, coconut shells and husks. The manufacturing process for both activated carbon and biochar is a near complete burning process resulting in essentially pure element carbon. Biochar is more cost effective to manufacture than activated carbon because it can be produced using any one of many organic substances or combinations of organic substances in an oxygen starved environment, which is a process called pyrolysis. Pyrolysis is a process of thermal decomposition of materials at elevated temperatures in an inert and/or oxygen starved atmosphere. Activated carbon requires additional conversion energy beyond that required for biochar in order to transform coal and/or coke into a practical and usable form. The transformation of chemical composition of the burned substances is permanent and irreversible. The permanent and irreversible nature resulting from the manufacturing burning process of carbon-based sorbents is one of the main reasons the cleaning, conditioning, and rejuvenation equipment and method of use described herein are desirable.

One of the most desirable properties of a good sorbent is surface area. Surface area is optimized in both activated-carbon and biochar by altering the burning conditions to create porosity in the carbon surface. The higher percentage of porosity in the carbon surface, the more surface area is available for the capture of contaminants. Surface areas in typical activated carbon sorbents are usually between 500 square meters per gram ($m^2/g$) and 1,500 square meters per gram ($m^2/g$). Surface areas for typical biochar are usually between 400 square meters per gram ($m^2/g$) and 800 square meters per gram ($m^2/g$). However, there are very expensive cost prohibitive manufacturing processes that can produce activated carbon surfaces with as much as 3,000 square meters per gram ($m^2/g$). Factors that affect the porosity of carbon-based sorbents are temperature, oxygen content in the burn, degassing gas (such as steam), and the initial properties of the raw material used in the burn.

Treated carbon sources also bring another desirable effect, mainly increasing the adsorption of targeted contaminants. Some of the more common surface treatments used to treat carbon surfaces are coating, impregnating, and extruding the activated carbon with metals. One metal that is commonly used is elemental ferrite (Fe). Additional treatment materials are chlorides or bromides of various metals such as lead chloride (PdCl) and copper chloride (CuCl). These metals are used to increase adsorption properties for mostly ionic contaminants. Ionic contaminants are typically difficult to remove because of their oxidative state (such as Se as selenate, N as Nitrate, and Hg as oxide or chloride). Organic contaminants are more easily removed than inorganic contaminants, but treatments are still sought by the industry to increase sorbent adsorption properties.

Carbon-based sorbents become saturated when a majority of the surface area has been exposed to contaminants. The industry has no known method of rejuvenating carbon-based sorbents such as activated carbon or biochar. There are industry methods to partially clean or recycle activated carbon in a stand-alone process, where contaminated activated carbon is placed in a furnace and some of the contaminants can be volatized off. Using such furnace burn methods results in significant carbon loses of between 10%-20%. The carbon loses are due to the generation of carbon dioxide ($CO_2$) during furnace volatilization burn off. The significant carbon loses in the furnace burn off process must be replaced with a corresponding significant amount of replacement activated carbon.

The furnace burn method for volatizing contaminants does not allow for the collection or capture of the volatized contaminants. By contrast, the present disclosure includes a sorbent treatment subsystem 402 for cleaning, conditioning, and/or rejuvenating carbon-based sorbents. Cleaning and/or rejuvenation station 416 includes disposal station 418 where contaminants that have been separated from the carbon-based sorbents can be disposed of properly and/or recycled back into appropriate industrial use.

Subsystem 402 can be configured to clean, condition, and/or rejuvenate various carbon-based sorbents in station 416 because the process is effectively the same for most carbon-based sorbents. For example, the process for cleaning, conditioning, and/or rejuvenating contaminated activated carbon is essentially the same as that required for biochar, except the chemical reagents used to rejuvenate each product can be different, as they absorb different contaminants.

The subject disclosure for cleaning, conditioning, and/or rejuvenating activated carbon and/or biochar does not use a furnace burn off process as a function of subsystem 402 and station 416. Instead, the subject disclosure includes a cleaning, conditioning, and/or rejuvenation process in which a chemical reagent removes contaminated semi-volatiles and contaminated volatiles. This is accomplished without the emission of carbon dioxide ($CO_2$), which is not possible by furnace burn processes. Because the cleaning, conditioning, and/or rejuvenation process of the subject disclosure does not emit carbon dioxide ($CO_2$), losses of carbon-based sorbent are less than 2%, which is much lower than the 10%-20% in carbon loses experienced when a furnace burn process is used.

In addition, the known furnace burn process for cleaning carbon-based sorbents is primarily limited to activated carbon sorbents. There is no known process to clean biochar sorbent. Using a furnace burn process also negatively impacts the surface area of the carbon-based sorbent, especially if the furnace conditions are not monitored and precisely controlled. If a furnace burn process is performed perfectly, the resulting surface area of the contaminated carbon-based sorbent will be improved compared to the remaining surface area in the contaminated condition. However, the resulting surface area of the carbon-based sorbent will be significantly less after the furnace burn process compared to the original surface area before first use.

The subject disclosure makes use of contact time resulting from a torturous path through the fluidized bed apparatus 152 to collect contaminants and then makes use of additional contact time resulting from a torturous path in station 416 to clean, condition, and/or rejuvenate the sorbent and separate contaminants. The longer the contaminated sorbent remains in subsystem 402, the more contaminants are separated and the more cleaned, conditioned, and/or rejuvenated the sorbent becomes.

Figure 34:
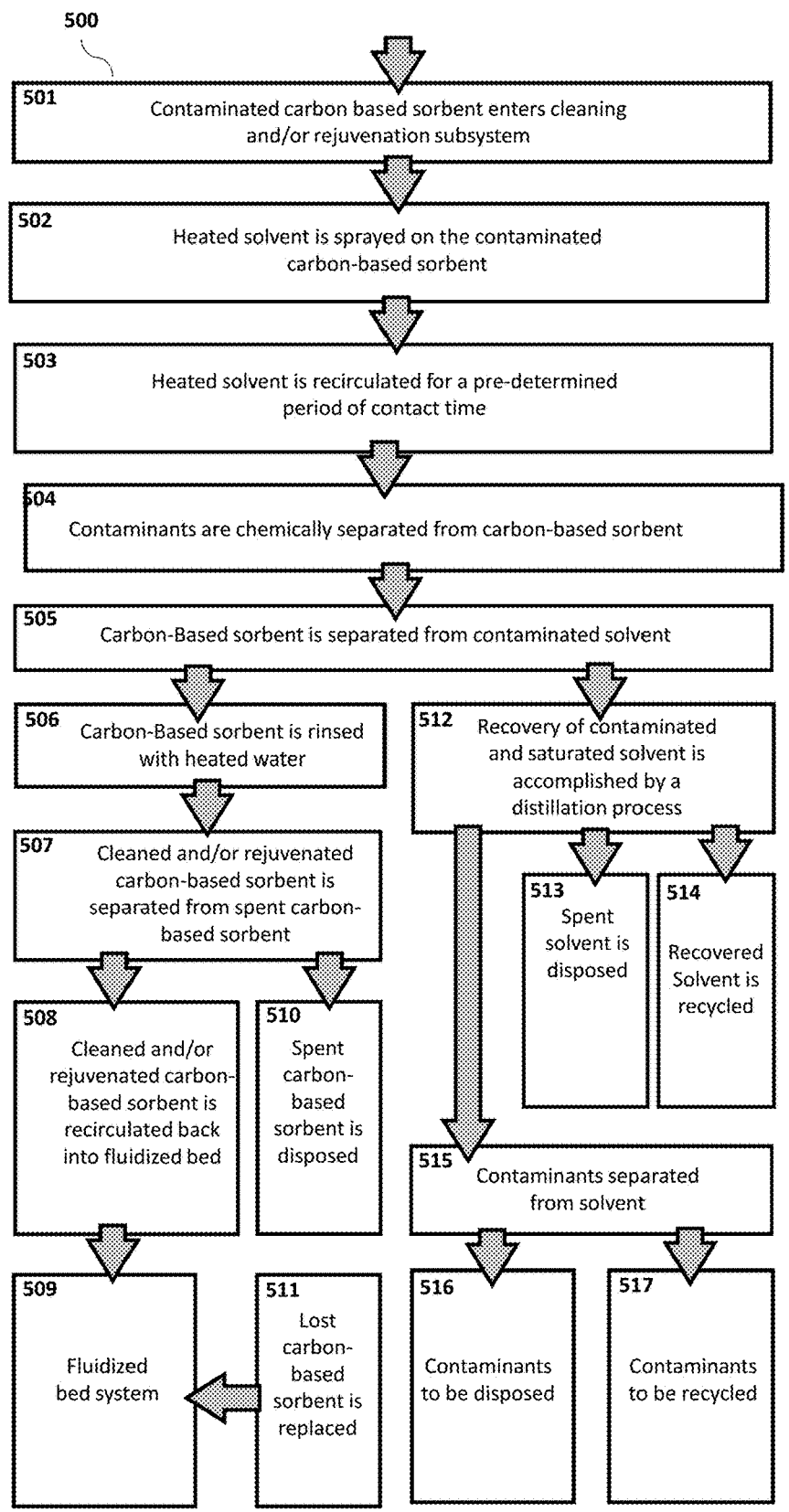
FIG. 34 is a block diagram showing a method of routing contaminated carbon-based sorbent through a sorbent treatment subsystem which separates the contaminants from the carbon-based sorbent so that the carbon-based sorbent and the spent/contaminated byproducts can be appropriately disposed of, recycled, reused, and/or replaced.

With reference to FIG. 34, a block diagram is shown describing the method steps for cleaning, conditioning, and/or rejuvenating carbon-based sorbent. This chemical cleaning, conditioning, and rejuvenation process does not involve a furnace burn process for cleaning carbon-based sorbents. Instead, one or more sorbent treatment subsystems 402 containing one or more chemical reagents are used. Therefore, the original surface area of the carbon-based sorbent can be restored using the chemical cleaning process disclosed. Testing has revealed that passing fresh unused carbon-based sorbent through subsystem 402 and method steps 500 before initial exposure to contaminants can increase the surface area of the carbon-based sorbent above that which was created by the burning process used to manufacture the carbon-based sorbent to begin with. This is especially true for biochar.

With reference to FIGS. 33 and 34, contaminated carbon-based sorbent enters the sorbent treatment subsystem 402 and station 416 in method step 501, where it is sprayed with a chemical reagent, such as a heated solvent, in method step 502. The heated solvent is recirculated for at least 45 minutes in method step 503. The heated solvent chemically strips contaminants from the carbon-based sorbent. Testing shows that an optimum effective temperature range for the heated solvent is 125 degrees Celsius (° C.) to 145 degrees Celsius (° C.) with a lower effective temperature limit of at least 5 degrees Celsius (° C.) above ambient temperature and an upper effective temperature limit of 210 degrees Celsius (° C.). Lower effective temperature limits close to 5 degrees Celsius (° C.) above ambient temperature require extended contact time for the solvent to separate contaminants from the sorbent. Higher effective upper temperature limits near 210 degrees Celsius (° C.) can be achieved by heating the solvent in a vacuum with a nitrogen ($N_2$) and argon (Ar)

environment. Solvents used in method step 502 can include, but are not limited, to methyl ethyl ketone, methylene chloride, or methanol.

After the heated solvent has been recirculated for a sufficient period of time in method step 503, the contaminants are stripped away in method step 504 from the carbon-based sorbent, which results in the carbon-based sorbent being separated in method step 505 from the solvent, which is saturated with the contaminants. Next, the carbon-based sorbent is rinsed with heated water in method step 506. Testing shows that an optimum effective temperature range for the heated water is 63 degrees Celsius (° C.) to 83 degrees Celsius (° C.) with a lower effective temperature limit of 5 degrees Celsius (° C.) above ambient temperature and an upper effective temperature limit of 98 degrees Celsius (° C.).

The cleaned, conditioned, and/or rejuvenated carbon-based sorbent is separated from any spent carbon-based sorbent in method step 507, where the cleaned, conditioned, and/or rejuvenated carbon-based sorbent is recirculated through station 420 in method step 508 and returned back to fluidized bed apparatus 152 in method step 509. Spent carbon-based sorbent is disposed of through station 417 in method step 510. The spent and/or lost carbon-based sorbent is replaced with new carbon-based sorbent by station 419 in method step 511.

The solvent that is saturated with contaminants chemically stripped away from the carbon-based sorbent in method step 505 is recovered using a distillation process as shown in method step 512. Recovered solvent is recycled in method step 514. Spent solvent is disposed of in method step 513. Separated contaminants are passed through station 418 in method step 515 with unusable contaminants being disposed of in method step 516 and usable contaminants recycled in method step 517.

It should be appreciated that other sorbents, such as CZTS, CZTS-Alloys, and/or other sorbents such as granular ferric oxide zeolite, can be cleaned, conditioned, and/or rejuvenated by passing the contaminated sorbent through subsystems similar to 400 and/or 401. The method steps and basic process for cleaning these other sorbents are similar to method steps 500, but with some minor differences in the chemicals that are used. For example, some of the chemical differences in CZTS sorbents and CZTS-Alloy sorbents require the use of hot fatty alcohol as a solvent/chemical reagent. In addition, different equipment may be used to clean, condition, and/or rejuvenate CZTS sorbents and CZTS-Alloy sorbents. For example, a rotary vacuum dryer may be used to volatize contaminants and send them to be captured in a scrubber system.

It should be appreciated that although the steps of the methods are described and illustrated herein in a particular order, the steps may be performed in a different order without departing from the scope of the subject disclosure, except where the order of the steps is otherwise noted. In the same vein, it should be appreciated that the methods described and illustrated herein may be performed without the inclusion of all the steps described above or with the addition of intervening steps that have not been discussed, all without departing from the scope of the subject disclosure.

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An emissions control system including a fluidized bed apparatus for removing contaminants from emissions, comprising:
   a housing shaped as a reverse venturi, said housing including an entry portion for receiving the emissions at a pre-determined entry flow rate, an exit portion for expelling the emissions at a pre-determined exit flow rate, and an enlarged portion disposed between said entry portion and said exit portion of said housing for trapping the contaminants in the emissions;
   said entry portion, said exit portion, and said enlarged portion of said housing being arranged in fluid communication with each other;
   a mass of reactive material disposed within said enlarged portion of said housing;
   said mass of reactive material having a reactive outer surface disposed in contact with the emissions, said mass of reactive material including a carbon-based sorbent; and
   at least one sorbent treatment subsystem disposed in fluid communication with said housing of said fluidized bed apparatus, said at least one sorbent treatment subsystem including a solvent for separating the contaminants from said carbon-based sorbent after said carbon-based sorbent has been exposed to the emissions.

2. The emissions control system as set forth in claim 1, wherein said at least one sorbent treatment subsystem is internal to said housing of said fluidized bed apparatus.

3. The emissions control system as set forth in claim 1 wherein said at least one sorbent treatment subsystem is external to said housing of said fluidized bed apparatus.

4. The emissions control system as set forth in claim 1, wherein said at least one sorbent treatment subsystem includes an entry port for receiving contaminated sorbent from said housing of said fluidized bed apparatus, a cleaning and rejuvenation station, a sorbent disposal station, a contaminant disposal station, a bulk refill station, and a return port for returning clean sorbent to said housing of said fluidized bed apparatus.

5. The emissions control system as set forth in claim 1, wherein said solvent includes at least one of: methyl ethyl ketone, methylene chloride, and ethanol.

6. The emissions control system as set forth in claim 1, wherein said at least one sorbent treatment subsystem is configured to heat said solvent to a temperature within an optimum effective temperature range of 125 degrees Celsius to 145 degrees Celsius.

7. The emissions control system as set forth in claim 1, wherein said at least one sorbent treatment subsystem is configured to heat said solvent to a temperature that is at least 5 degrees Celsius above ambient temperature and no greater than 210 degrees Celsius.

8. The emissions control system as set forth in claim 1, wherein said at least one sorbent treatment subsystem includes water for rinsing said carbon-based sorbent to separate said carbon-based sorbent from said solvent which contains contaminants.

9. The emissions control system as set forth in claim 8, wherein said at least one sorbent treatment subsystem is configured to heat said water to a temperature within an optimum effective temperature range of 63 degrees Celsius to 83 degrees Celsius.

10. The emissions control system as set forth in claim 8, wherein said at least one sorbent treatment subsystem is configured to heat said water to a temperature that is at least 5 degrees Celsius above ambient temperature and no greater than 98 degrees Celsius.

11. The emissions control system as set forth in claim 1, wherein said at least one sorbent treatment subsystem does not include a furnace burn station.

12. The emissions control system as set forth in claim 1, wherein said at least one sorbent treatment subsystem does not emit carbon dioxide during the cleaning and rejuvenation of said carbon-based sorbent.

13. The emissions control system as set forth in claim 1, wherein said carbon-based sorbent includes at least one of activated carbon and biochar.

14. An emissions control system including a fluidized bed apparatus for removing contaminants from emissions, comprising:
a housing shaped as a reverse venturi, said housing including an entry portion for receiving the emissions at a pre-determined entry flow rate, an exit portion for expelling the emissions at a pre-determined exit flow rate, and an enlarged portion disposed between said entry portion and said exit portion of said housing for trapping the contaminants in the emissions;
said entry portion, said exit portion, and said enlarged portion of said housing being arranged in fluid communication with each other;
a mass of reactive material disposed within said enlarged portion of said housing;
said mass of reactive material having a reactive outer surface disposed in contact with the emissions, said mass of reactive material including a carbon-based sorbent; and
at least one sorbent treatment subsystem including a solvent for treating said carbon-based sorbent before said carbon-based sorbent has been exposed to the emissions.

15. The emissions control system as set forth in claim 14, wherein said solvent chemically interacts with said carbon-based sorbent and increases a porosity of said reactive outer surface of said mass of reactive material.

16. An emissions control method for removing contaminants from emissions comprising the steps of:
routing the emissions through at least one pre-filter containing a pre-filter sorbent;
routing the emissions away from the at least one pre-filter and into a treatment system having a reverse venturi shaped fluidized bed apparatus containing a reactive material that chemically binds with the contaminants carried in the emissions;
selecting a carbon-based sorbent as the reactive material in the reverse venturi shaped fluidized bed apparatus;
trapping the contaminants in the reactive material contained in the reverse venturi shaped fluidized bed apparatus; and
routing the carbon-based sorbent through at least one sorbent treatment subsystem containing a solvent that cleans and conditions the carbon-based sorbent.

17. The method as set forth in claim 16, further comprising the steps of:
heating the solvent in the sorbent treatment subsystem; and
spraying the heated solvent on the carbon-based sorbent to clean and condition the carbon-based sorbent.

18. The method as set forth in claim 17, wherein the solvent is heated to a temperature within an optimum effective temperature range of 125 degrees Celsius to 145 degrees Celsius.

19. The method as set forth in claim 17, wherein the solvent is heated to a temperature that is at least 5 degrees Celsius above ambient temperature and no greater than 210 degrees Celsius.

20. The method as set forth in claim 17, further comprising the step of:
recirculating the heated solvent in the sorbent treatment subsystem for at least 45 minutes.

21. The method as set forth in claim 16, further comprising the step of:
rinsing the carbon-based sorbent in the sorbent treatment subsystem with water to clean the carbon-based sorbent.

22. The method as set forth in claim 21, further comprising the step of:
heating the water in the sorbent treatment subsystem to a temperature within an optimum effective temperature range of 63 degrees Celsius to 83 degrees Celsius.

23. The method as set forth in claim 21, further comprising the step of:
heating the water in the sorbent treatment subsystem to a temperature that is at least 5 degrees Celsius above ambient temperature and no greater than 98 degrees Celsius.

24. The subsystem as set forth in claim 16, further comprising the steps of:
separating cleaned carbon-based sorbent from spent carbon-based sorbent;
disposing of the spent carbon-based sorbent; and
routing the cleaned sorbent back to the reverse venturi shaped fluidized bed apparatus.

25. The method as set forth in claim 24, further comprising the step of:
replacing the spent carbon-based sorbent with new carbon-based sorbent and routing the new carbon-based sorbent to the reverse venturi shaped fluidized bed apparatus.

26. The subsystem as set forth in claim 16, further comprising the step of:
separating the contaminants from the solvent using a distillation process and recycling the solvent.

* * * * *